(12) United States Patent
Koosmann et al.

(10) Patent No.: US 11,691,688 B2
(45) Date of Patent: *Jul. 4, 2023

(54) DISPLAY SYSTEMS AND METHODS FOR A RECREATIONAL VEHICLE

(71) Applicant: Indian Motorcycle International, LLC, Medina, MN (US)

(72) Inventors: Adam C. Koosmann, Osceola, WI (US); Ryan P. Lenton, Buffalo, MN (US)

(73) Assignee: Indian Motorcycle International, LLC, Medina, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/575,030

(22) Filed: Jan. 13, 2022

(65) Prior Publication Data
US 2022/0135166 A1 May 5, 2022

Related U.S. Application Data

(63) Continuation of application No. 15/161,720, filed on May 23, 2016, now Pat. No. 11,400,997.

(51) Int. Cl.
*G06F 3/0484* (2022.01)
*B62J 50/22* (2020.01)
(Continued)

(52) U.S. Cl.
CPC .............. *B62J 50/22* (2020.02); *B60K 35/00* (2013.01); *B62J 99/00* (2013.01); *B62K 11/04* (2013.01);
(Continued)

(58) Field of Classification Search
CPC .......... B62J 50/22; B62J 99/00; B62J 50/225; B60K 35/00; B60K 2370/11;
(Continued)

(56) References Cited

U.S. PATENT DOCUMENTS 3,861,229 A 1/1975 Domaas
4,675,865 A 6/1987 Devries et al.
(Continued)

FOREIGN PATENT DOCUMENTS

CN 1716418 A 1/2006
CN 102742265 A 10/2012
(Continued)

OTHER PUBLICATIONS

2004 Engine Preview—Valve Penta, www.powerandmotoryacht.com/engines/0104preview/index.html; printed Jun. 30, 2005, 2 pages.
(Continued)

*Primary Examiner* — Hassan Mrabi
(74) *Attorney, Agent, or Firm* — Faegre Drinker Biddle & Reath LLP

(57) ABSTRACT

The present application discloses systems and methods to present information to recreational vehicle riders and to provide customizable visual information to recreational vehicle riders. The present application further discloses systems and methods to connect and transmit audio information between a driver portable communication device and a driver audio interface device through the recreational vehicle and audio information between a passenger portable communication device and a passenger audio interface device.

4 Claims, 51 Drawing Sheets

(51) Int. Cl.
*B60K 35/00* (2006.01)
*B62J 99/00* (2020.01)
*B62K 11/04* (2006.01)
*B62K 11/12* (2006.01)
*G06F 3/0482* (2013.01)
*G06F 3/04845* (2022.01)
*G06F 3/0485* (2022.01)
*G06F 3/16* (2006.01)
*B60W 50/14* (2020.01)
*G06F 3/14* (2006.01)
*G09G 5/14* (2006.01)
*B62J 50/21* (2020.01)

(52) U.S. Cl.
CPC .......... *B62K 11/12* (2013.01); *G06F 3/0482* (2013.01); *G06F 3/0485* (2013.01); *G06F 3/04845* (2013.01); *G06F 3/16* (2013.01); *B60K 2370/11* (2019.05); *B60K 2370/151* (2019.05); *B60K 2370/152* (2019.05); *B60K 2370/154* (2019.05); *B60K 2370/155* (2019.05); *B60K 2370/157* (2019.05); *B60K 2370/1534* (2019.05); *B60K 2370/182* (2019.05); *B60K 2370/52* (2019.05); *B60K 2370/563* (2019.05); *B60K 2370/736* (2019.05); *B60W 2050/146* (2013.01); *B60Y 2200/12* (2013.01); *B62J 50/225* (2020.02); *G06F 3/14* (2013.01); *G06F 2203/04803* (2013.01); *G09G 5/14* (2013.01); *G09G 2340/045* (2013.01); *G09G 2340/0464* (2013.01); *G09G 2340/14* (2013.01); *G09G 2354/00* (2013.01); *G09G 2380/10* (2013.01)

(58) Field of Classification Search
CPC ........ B60K 2370/151; B60K 2370/152; B60K 2370/1534; B60K 2370/154; B60K 2370/155; B60K 2370/157; B60K 2370/182; B60K 2370/52; B60K 2370/563; B60K 2370/736; B62K 11/04; B62K 11/12; G06F 3/0482; G06F 3/04845; G06F 3/0485; G06F 3/16; G06F 3/14; G06F 2203/04803; B60W 2050/146; B60Y 2200/12; G09G 5/14; G09G 2340/045; G09G 2340/0464; G09G 2340/14; G09G 2354/00; G09G 2380/10
See application file for complete search history.

(56) References Cited

U.S. PATENT DOCUMENTS

| | | | |
|---|---|---|---|
| 4,715,031 A | 12/1987 | Crawford et al. | |
| 4,745,596 A | 5/1988 | Sato | |
| 5,040,168 A | 8/1991 | Maue et al. | |
| 5,081,586 A | 1/1992 | Barthel et al. | |
| 5,174,263 A | 12/1992 | Meaney | |
| 5,311,514 A | 5/1994 | Cook | |
| 5,418,526 A | 5/1995 | Crawford | |
| 5,491,631 A | 2/1996 | Shirane et al. | |
| 5,826,205 A | 10/1998 | Koelle et al. | |
| 5,856,976 A | 1/1999 | Hirano | |
| 5,869,907 A | 2/1999 | Marler | |
| 5,970,251 A | 10/1999 | Zimmermann et al. | |
| 6,108,598 A | 8/2000 | Sumitani | |
| 6,120,399 A | 9/2000 | Okeson et al. | |
| 6,176,796 B1 | 1/2001 | Lislegard | |
| 6,370,456 B2 | 4/2002 | Eiting et al. | |
| 6,407,663 B1 | 6/2002 | Huggett | |
| 6,411,880 B1 | 6/2002 | McKee et al. | |
| 6,430,478 B2 | 8/2002 | Heckmann et al. | |
| 6,430,673 B1 | 8/2002 | De et al. | |
| 6,445,989 B2 | 9/2002 | Nishimura et al. | |
| 6,501,368 B1 | 12/2002 | Wiebe et al. | |
| 6,505,280 B2 | 1/2003 | Terada et al. | |
| 6,553,297 B2 | 4/2003 | Tashiro et al. | |
| 6,595,811 B2 | 7/2003 | Dagenais et al. | |
| 6,611,201 B1 | 8/2003 | Bishop et al. | |
| 6,694,235 B2 | 2/2004 | Akiyama | |
| 6,697,966 B1 | 2/2004 | Smuk et al. | |
| 6,744,985 B1 | 6/2004 | Smuk et al. | |
| 6,756,697 B2 | 6/2004 | Mizutani et al. | |
| 6,784,569 B1 | 8/2004 | Peller | |
| 6,795,754 B2 | 9/2004 | Sunami et al. | |
| 6,799,101 B2 | 9/2004 | Hawig et al. | |
| 6,806,590 B1 | 10/2004 | Smuk et al. | |
| 6,860,826 B1 | 3/2005 | Johnson | |
| 6,871,250 B2 | 3/2005 | Froeschl et al. | |
| 6,898,500 B2 | 5/2005 | Kobayashi | |
| 6,898,656 B2 | 5/2005 | Griessbach et al. | |
| 6,917,890 B2 | 7/2005 | Davis et al. | |
| 6,928,362 B2 | 8/2005 | Meaney | |
| 6,938,508 B1 | 9/2005 | Saagge | |
| 6,944,649 B1 | 9/2005 | Suzuki | |
| 6,967,136 B2 | 11/2005 | Akatsu et al. | |
| 7,092,803 B2 | 8/2006 | Kapolka et al. | |
| 7,286,921 B2 | 10/2007 | Kobayashi | |
| 7,801,673 B2 | 9/2010 | Suzuki et al. | |
| 7,950,486 B2 | 5/2011 | Van et al. | |
| 9,216,789 B2 | 12/2015 | Hamlin et al. | |
| 11,400,997 B2 | 8/2022 | Koosmann et al. | |
| 2001/0025216 A1 | 9/2001 | Nishimura et al. | |
| 2001/0044677 A1 | 11/2001 | Bauer et al. | |
| 2002/0008718 A1 | 1/2002 | Obradovich | |
| 2002/0042670 A1 | 4/2002 | Diaz et al. | |
| 2002/0059064 A1 | 5/2002 | Tabata et al. | |
| 2002/0059075 A1 | 5/2002 | Schick et al. | |
| 2002/0067638 A1 | 6/2002 | Kobayashi et al. | |
| 2002/0161496 A1 | 10/2002 | Yamaki | |
| 2002/0171291 A1 | 11/2002 | Wayne et al. | |
| 2003/0009271 A1 | 1/2003 | Akiyama | |
| 2003/0070020 A1 | 4/2003 | Kondo et al. | |
| 2003/0097211 A1 | 5/2003 | Carroll et al. | |
| 2003/0105567 A1 | 6/2003 | Koenig et al. | |
| 2003/0160686 A1 | 8/2003 | Uno | |
| 2003/0195666 A1 | 10/2003 | Mactavish et al. | |
| 2004/0002793 A1 | 1/2004 | Tachibana et al. | |
| 2004/0003153 A1 | 1/2004 | Froeschl et al. | |
| 2004/0015603 A1 | 1/2004 | Griessbach et al. | |
| 2004/0048598 A1 | 3/2004 | Gagnon | |
| 2004/0083043 A1 | 4/2004 | Akiyama et al. | |
| 2004/0097263 A1 | 5/2004 | Katayama et al. | |
| 2004/0186929 A1 | 9/2004 | Salerno | |
| 2004/0215861 A1 | 10/2004 | Beaudoin et al. | |
| 2004/0235429 A1 | 11/2004 | Garavaglia et al. | |
| 2004/0254689 A1 | 12/2004 | Blazic et al. | |
| 2004/0254690 A1 | 12/2004 | Hasegawa et al. | |
| 2005/0125565 A1 | 6/2005 | Ying | |
| 2005/0206113 A1 | 9/2005 | Delaney et al. | |
| 2005/0216903 A1 | 9/2005 | Schaefer | |
| 2005/0288837 A1 | 12/2005 | Wiegand et al. | |
| 2006/0069499 A1 | 3/2006 | Suzuki et al. | |
| 2007/0050095 A1 | 3/2007 | Nelson et al. | |
| 2007/0100513 A1 | 5/2007 | Asano | |
| 2007/0126698 A1 | 6/2007 | Iwamoto et al. | |
| 2011/0196578 A1 | 8/2011 | Strohmaier et al. | |
| 2011/0319142 A1 | 12/2011 | Chen et al. | |
| 2013/0190977 A1* | 7/2013 | Onaka ................... G06F 3/0484 701/36 |
| 2013/0293364 A1 | 11/2013 | Ricci et al. | |
| 2014/0125018 A1 | 5/2014 | Brady et al. | |
| 2014/0298259 A1* | 10/2014 | Meegan ............... G06F 3/04817 715/810 |
| 2014/0365120 A1* | 12/2014 | Vulcano ............... G01C 21/3611 701/532 |
| 2015/0057885 A1 | 2/2015 | Brady et al. | |
| 2015/0197215 A1* | 7/2015 | Koenig ................. B60R 25/302 180/287 |
| 2015/0291032 A1 | 10/2015 | Lyu et al. | |
| 2015/0358471 A1 | 12/2015 | Roth et al. | |
| 2016/0004418 A1 | 1/2016 | Lee et al. | |

(56) References Cited

U.S. PATENT DOCUMENTS

| | | | |
|---|---|---|---|
| 2016/0090044 A1* | 3/2016 | Watanabe | B60R 1/006 348/148 |
| 2017/0123423 A1 | 5/2017 | Sako et al. | |
| 2017/0230795 A1* | 8/2017 | Rentz | G06Q 10/06311 |
| 2017/0334500 A1 | 11/2017 | Jarek et al. | |

FOREIGN PATENT DOCUMENTS

| | | |
|---|---|---|
| CN | 103068616 A | 4/2013 |
| CN | 104679404 A | 6/2015 |
| CN | 204518050 U | 7/2015 |
| CN | 104969286 A | 10/2015 |
| DE | 4326328 A1 | 11/1994 |
| EP | 0723892 A2 | 7/1996 |
| EP | 0978433 A2 | 2/2000 |
| EP | 2873546 A1 | 5/2015 |
| EP | 2878478 A2 | 6/2015 |
| GB | 2232272 A | 12/1990 |
| JP | 2001-148657 | 5/2001 |
| JP | 2001-148657 A | 5/2001 |
| JP | 2002-274466 A | 9/2002 |
| JP | 2003-252271 A | 9/2003 |
| JP | 2013-169799 A | 9/2013 |
| JP | 2015-085852 A | 5/2015 |
| JP | 2015-184870 A | 10/2015 |
| JP | 2019-517949 A | 6/2019 |
| WO | 2009/145786 | 12/2009 |
| WO | 2009/145786 A1 | 12/2009 |
| WO | 2014/134148 A2 | 9/2014 |
| WO | 2017/205322 A2 | 11/2017 |

OTHER PUBLICATIONS

2015 Boom! Box Owner's Manual, Harley-Davidson Motor Company; 244 pages.

2016 Boom! Box Owner's Manual, Harley-Davidson Motor Company; 248 pages.

BMW Motorrad Article, Single Wire System and CAN bus, www.bmw-motorrad.com/technology, printed Jul. 8, 2005, 1 page.

BMW Motorrand of South Africa; The Motorcycles, R1200GS SA Road Test, www.mbwmotorrad.co.za/bikes/tests/display.asp?Id 100, dated Feb. 2004; printed Jul. 8, 2005, 3 pages.

BMW of Santa Cruz On-Line Article, Electrics and Electronics, www.bmwscruz.com/motorcycles/K1200S/K12200SF4.html, printed Jul. 8, 2005, 3 pages.

Boom! (Trademark) Box Infotainment System Quick Start Guide; Harley-Davidson Motor Company, 22 pages.

International Preliminary Report on Patentability received for PCT Patent Application No. PCT/US2017/033918, dated Dec. 6, 2018, 14 pages.

International Search Report issued by the European Patent Office for International Application No. PCT/US2006/031678, dated Feb. 7, 2007, 3 pages.

International Search Report of the Patent Cooperation Treaty for PCT/US2017/033918 to Indian Motorcycle International, LLC, dated Dec. 5, 2017, 7 pages.

John Valk MBW Article—The New BMW R 1200 RT, www.johnvalkbmw.ca/2005/BMW/R1200RT/General-R1200RT-More.html, printed Jul. 8, 2005, 11 pages.

Overall Concept and Model Features, BMW Motorrad Media Release, www.motorcycles.bmw.com/au/scripts/main.asp, dated Jul. 14, 2004, 3 pages.

Sport Rider Online Magazine; 2005 BMW K1200S Electronics, www.sportrider.com/bikes/2005/146_05_bmw k12selectronics; printed Aug. 31, 2005, 4 pages.

Sport Rider Online Magazine; 2005 MBW K1200S, www.sportrider.com/bikes/2005/146_05_bmw_k12s; printed Jun. 30, 2005, 5 pages.

Written Opinion issued by the European Patent Office for International Application No. PCT/US2006/031678, dated Nov. 11, 2007, 6 pages.

Extended Search Report issued by the European Patent Office, dated Feb. 17, 2022, for European Patent Application No. 21204353.3; 9 pages.

\* cited by examiner

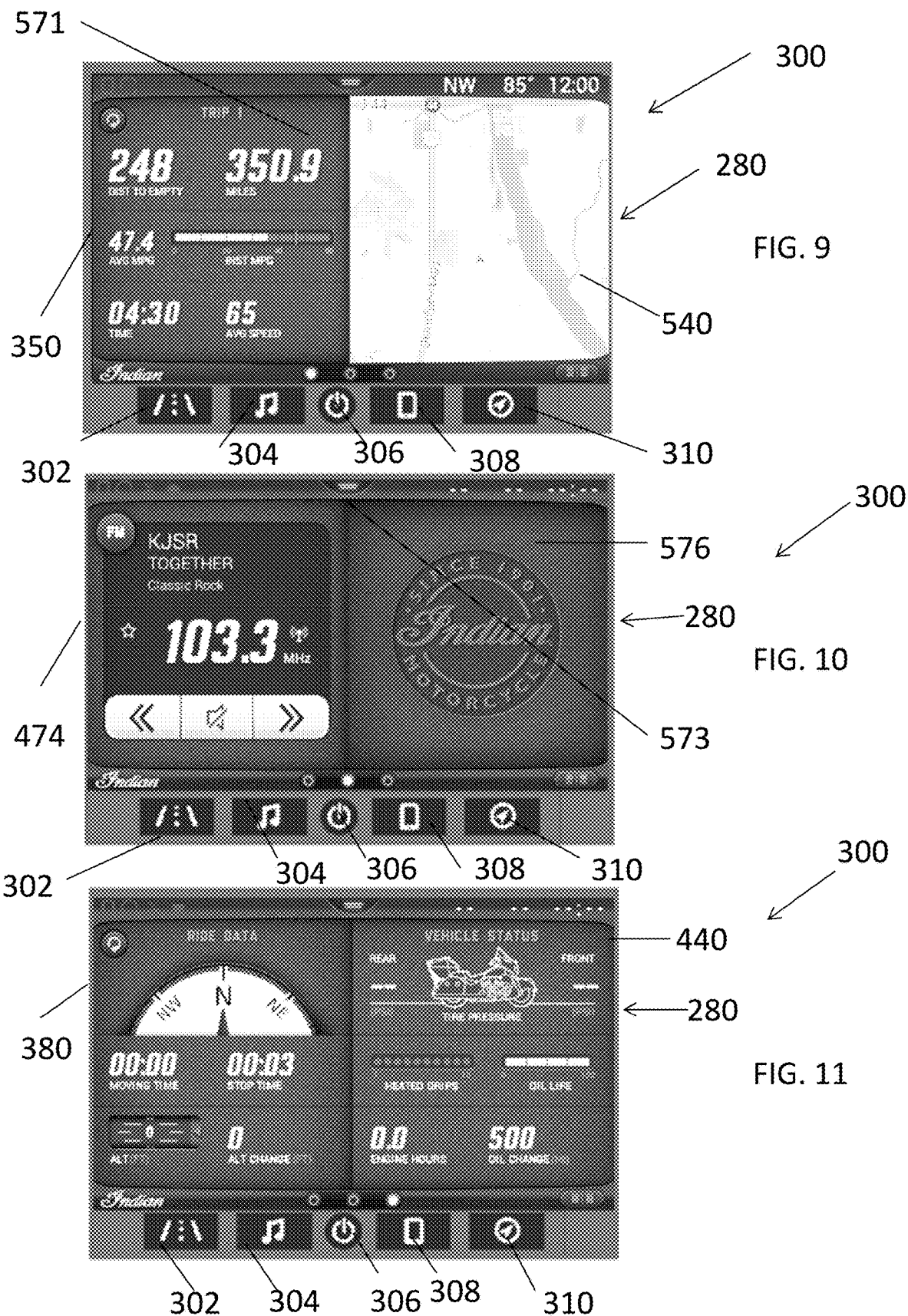

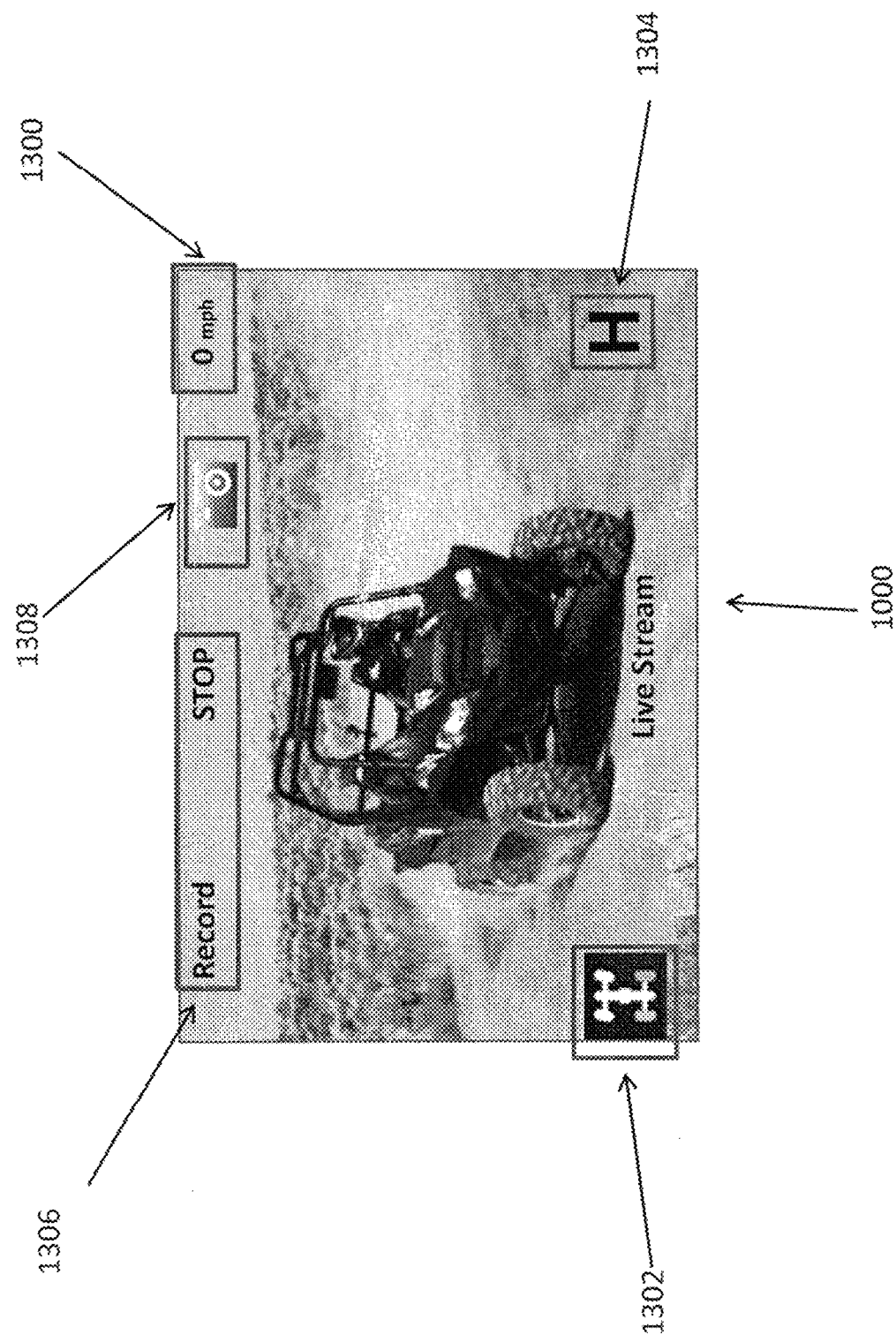

DISPLAY SYSTEMS AND METHODS FOR A RECREATIONAL VEHICLE

RELATED APPLICATION

This application is a continuation of U.S. patent application Ser. No. 15/161,720, filed May 23, 2016, titled DISPLAY SYSTEMS AND METHODS FOR A RECREATIONAL VEHICLE, the entire disclosure of which is expressly incorporated by reference herein.

BACKGROUND AND SUMMARY

The present disclosure relates to systems and methods which display information regarding a recreational vehicle to a rider, and in particular to systems and methods which provide customized information regarding a recreational vehicle and/or a rider portable communication device to a rider.

Recreational vehicles, such as motorcycles, all-terrain vehicles (ATVs), side-by-side vehicles, utility vehicles, and snowmobiles, are widely used for recreational purposes. These vehicles might be used on both roads and trails, or only on trails.

The present application discloses systems and methods to present information to recreational vehicle riders and to provide customizable visual information to recreational vehicle riders. The present application further discloses systems and methods to connect and transmit audio information between a driver portable communication device and a driver audio interface device through the recreational vehicle and audio information between a passenger portable communication device and a passenger audio interface device.

In one embodiment of the present disclosure, a recreation vehicle for operation by an operator comprises a plurality of ground engaging members, a frame supported by the plurality of ground engaging members, a prime mover supported by the frame and operatively coupled to at least one of the plurality of ground engaging members to power movement of the recreational vehicle, and a steering system supported by the frame and operatively coupled to at least a portion of the plurality of ground engaging members to move the portion of the plurality of ground engaging members relative to the frame. The steering system includes a steering member adapted to be grasped by the operator of the recreational vehicle and the steering member is movable relative to the frame. The recreational vehicle further comprises a user interface system supported by the frame. The user interface system includes a display which is configurable to display a first screen layout which includes at least a first region having a first region layout selected from at least one pre-defined groups of region layouts. The display also is configurable to display a second screen layout which has a second region layout selected from the at least one predefined groups of region layouts.

In another embodiment of the present disclosure, a method of communicating information to a rider of a recreational vehicle comprises the step of providing a display supported by a frame of the recreational vehicle. The display is configurable to display a first screen layout and the first screen layout includes at least a first region having a first region layout selectable from at least one pre-defined groups of region layouts. The display also is configurable to display a second region having a second region layout selectable from the at least one predefined groups of region layouts. The method also comprises receiving a first selection for the first region layout, receiving a second selection for the second region layout, and storing the first selection and the second selection in a memory associated with the recreational vehicle.

In a further embodiment of the present disclosure, a recreational vehicle for operation by an operator comprises a plurality of ground engaging members, a frame supported by the plurality of ground engaging members, a prime mover supported by the frame and operatively coupled to at least one of the plurality of ground engaging members to power movement of the recreational vehicle, and a steering system supported by the frame and operatively coupled to at least a portion of the plurality of ground engaging members to move the portion of the plurality of ground engaging members relative to the frame. The steering system includes a steering member adapted to be grasped by the operator of the recreational vehicle, the steering member being movable relative to the frame. Additionally, the recreational vehicle comprises a user interface system supported by the frame, the user interface system including a plurality of user inputs supported by the steering member and a display spaced apart from the steering member. The display is configurable to sequentially provide at least three different screen layouts in response to at least two actuations of a first user input of the plurality of user inputs.

In one embodiment of the present disclosure, a method of communicating information to a rider of a recreational vehicle comprises the step of providing a display supported by a frame of the recreational vehicle. The display is configured to provide at least three screen layouts. The method also comprises the step of providing a plurality of user inputs supported by a steering member of a steering system of the recreational vehicle. The steering member is moveable relative to the frame. Additionally, in response to at least two actuations of a first user input of the plurality of user inputs, the method comprises the step of sequentially cycling through the at least three screen layouts configured for display on the display.

In a further embodiment of the present disclosure, a recreational vehicle for use by a driver and at least a first passenger is disclosed. The driver has a driver portable communication device and a driver audio interface device having a microphone and a speaker. The first passenger has a first passenger portable communication device and a first passenger audio interface device having a microphone and a speaker. The recreational vehicle comprises a plurality of ground engaging members, a frame supported by the plurality of ground engaging members, a prime mover supported by the frame and operatively coupled to at least one of the plurality of ground engaging members to power movement of the recreational vehicle, and a steering system supported by the frame and operatively coupled to at least a portion of the plurality of ground engaging members to move the portion of the plurality of ground engaging members relative to the frame. The steering system includes a steering member adapted to be grasped by the operator of the recreational vehicle, the steering member being movable relative to the frame. The vehicle further comprises at least one controller supported by the frame. The at least one controller is adapted to be operatively coupled to the driver portable communication device, the driver audio interface device, the passenger portable communication device, and the passenger audio interface device. The at least one controller is configured to communicate audio information between the driver portable communication device and the driver audio interface device through the at least one controller and to communicate audio information between the passenger portable communication device and the passenger audio interface device through the at least one controller.

In another embodiment of the present disclosure, a method of communicating information to a driver and at least a first passenger of a recreational vehicle is disclosed. The driver has a driver portable communication device and a driver audio interface device having a microphone and a speaker. The first passenger has a first passenger portable communication device and a first passenger audio interface device having a microphone and a speaker. The method comprises the step of operatively coupling at least one controller of the recreational vehicle with the driver portable communication device, the driver audio interface device, the first passenger portable communication device, and the first passenger audio interface device. The method also comprises the step of routing audio information through the at least one controller of the recreational vehicle between one of (a) the driver portable communication device and the driver audio interface device and (b) the first passenger portable communication device and the passenger audio interface device, wherein audio information is routed between the driver portable communication device and the driver audio interface device in response to a driver call being established with the driver portable communication device and wherein audio information is routed between the first passenger portable communication device and the first passenger audio interface device in response to a first passenger call being established with the first passenger portable communication device.

Additional features of the present disclosure will become more apparent to those skilled in the art upon consideration of the following detailed descriptions of illustrative embodiments exemplifying the best mode of carrying out the invention as presently perceived.

BRIEF DESCRIPTION OF THE DRAWINGS

Advantages and features of the embodiments of this disclosure will become more apparent from the following detailed description of exemplary embodiments when viewed in conjunction with the accompanying drawings, wherein:

FIG. 9 is a first exemplary riding screen layout for a display of the user interface system of FIG. 8;

FIG. 10 is a second exemplary riding screen layout for a display of the user interface system of FIG. 8;

FIG. 11 is a third exemplary riding screen layout for a display of the user interface system of FIG. 8;

FIG. 48A is an illustrative embodiment of options shown on the display of FIG. 41 when a camera on the vehicle is taking static or live images;

DETAILED DESCRIPTION OF THE DRAWINGS

Figure 1:
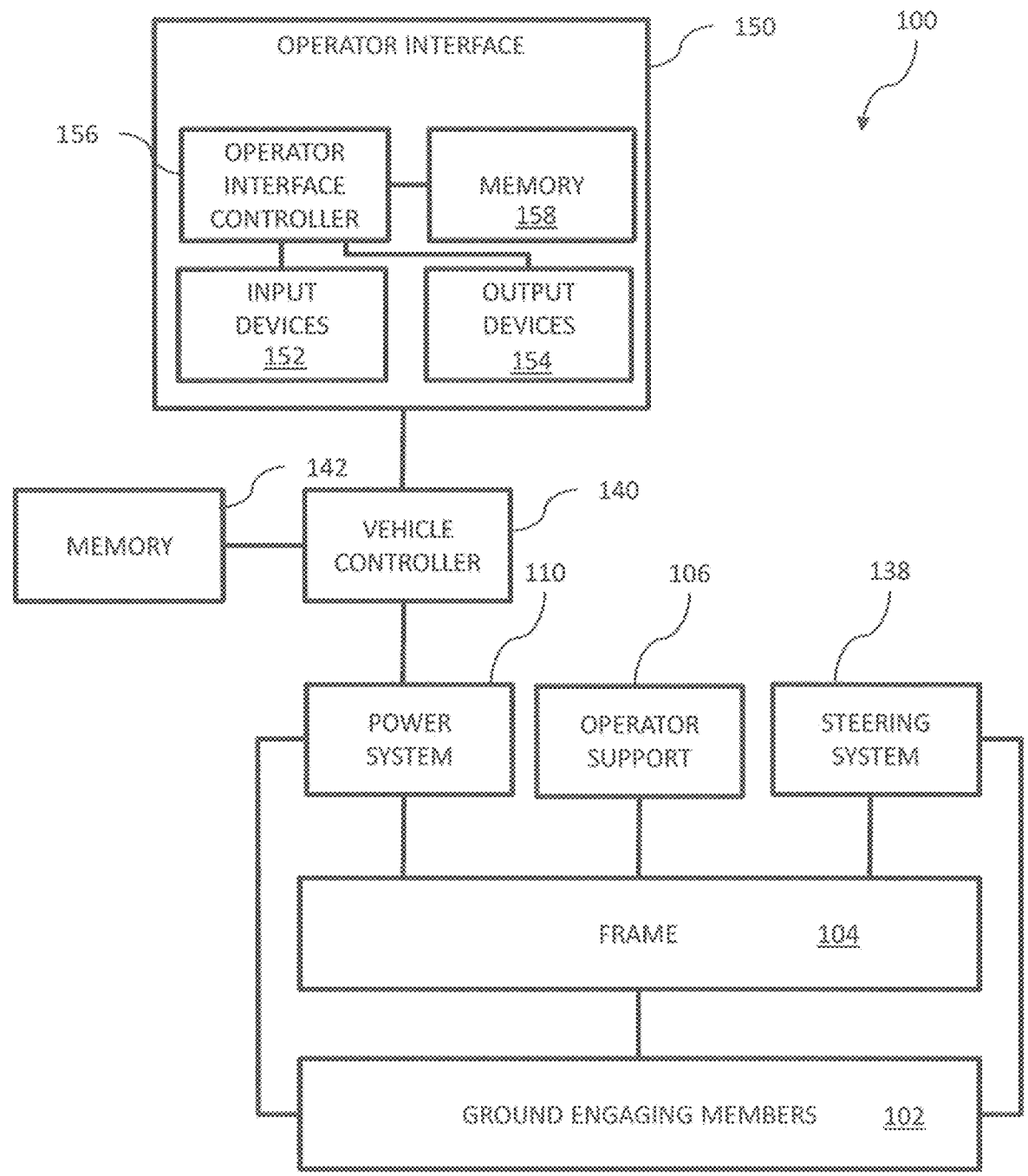
FIG. 1 is a representative view of an exemplary vehicle.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIG. 1, a recreational vehicle 100 is represented. Recreational vehicle 100 includes a plurality of ground engaging members 102. Exemplary ground engaging members include skis, endless tracks, wheels, and other suitable devices which support vehicle 100 relative to the ground. Recreational vehicle 100 further includes a frame 104 supported by the plurality of ground engaging members 102. In one embodiment, frame 104 includes cast portions, weldments, tubular components or a combination thereof. In one embodiment, frame 104 is a rigid frame. In one embodiment, frame 104 has at least two sections which are moveable relative to each other.

An operator support 106 is supported by frame 104. Exemplary operator supports include straddle seats, bench seats, bucket seats, and other suitable support members. In addition to operator support 106, recreational vehicle 100 may further include a passenger support. Exemplary passenger supports include straddle seats, bench seats, bucket seats, and other suitable support members.

A power system 110 is supported by frame 104. Power system 110 provides the motive force and communicates the same to at least one of the ground engagement members 102 to power movement of recreational vehicle 100.

Figure 2:
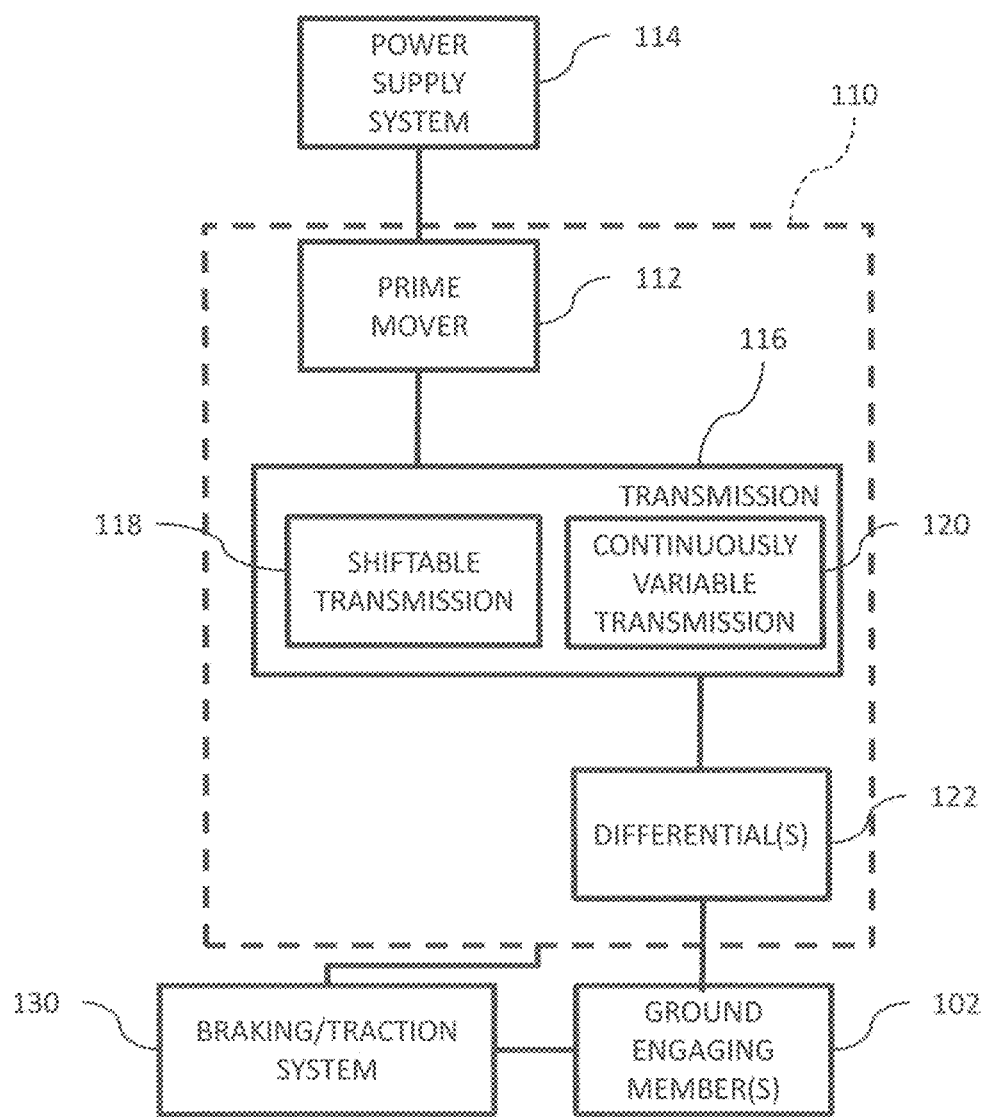
FIG. 2 is a representative view of an exemplary power system of the vehicle of FIG. 1.

Referring to FIG. 2, one embodiment of power system 110 is illustrated. Power system 110 includes a prime mover 112. Exemplary prime movers 112 include internal combustion engines, two stroke internal combustion engines, four stroke internal combustion engines, diesel engines, electric motors, hybrid engines, and other suitable sources of motive force. To start the prime mover 112, a power supply system 114 is provided. The type of power supply system 114 depends on the type of prime mover 112 used. In one embodiment, prime mover 112 is an internal combustion engine and power supply system 114 is one of a pull start system and an electric start system. In one embodiment, prime mover 112 is an electric motor and power supply system 114 is a switch system which electrically couples one or more batteries to the electric motor.

A transmission 116 is coupled to prime mover 112. Transmission 116 is illustrated as having a shiftable transmission 118 and a continuously variable transmission ("CVT") 120. CVT 120 is coupled to prime mover 112. Shiftable transmission 118 is in turn coupled to CVT 120. In one embodiment, shiftable transmission 118 includes a forward high setting, a forward low setting, a neutral setting, a park setting, and a reverse setting. The power communicated from prime mover 112 to CVT 120 is provided to a drive member of CVT 120. The drive member in turn provides power to a driven member through a belt. Exemplary CVTs are disclosed in U.S. Pat. Nos. 3,861,229; 6,176,796; 6,120,399; 6,860,826; and 6,938,508, the disclosures of which are expressly incorporated by reference herein. The driven member provides power to an input shaft of shiftable transmission 118. Although transmission 116 is illustrated as including both shiftable transmission 118 and CVT 120, transmission 116 may include only one of shiftable transmission 118 and CVT 120.

In the illustrated embodiment, transmission 116 is further coupled to at least one differential 122 which is in turn coupled to at least one ground engaging members 102. Differential 122 may communicate the power from transmission 116 to one of ground engaging members 102 or multiple ground engaging members 102. In an ATV embodiment, one or both of a front differential and a rear differential are provided. The front differential powering at least one of two front wheels of the ATV and the rear differential powering at least one of two rear wheels. In a utility vehicle embodiment, one or both of a front differential and a rear differential are provided. The front differential powering at least one of two front wheels of the utility vehicle and the rear differential powering at least one of multiple rear wheels of the utility vehicle. In one example, the utility vehicle has three axles and a differential is provided for each axle. In a motorcycle embodiment, a differential 122 and CVT 120 are not generally included. Rather, shiftable transmission 118 is coupled to at least one rear wheel through a chain or belt. In another motorcycle embodiment, a differential 122 is not included. Rather, CVT 120 is coupled to at least one rear wheel through a chain or belt. In a snowmobile embodiment, a differential 122 is not included. Rather, CVT 120 is coupled to an endless track through a chain case. In one golf cart embodiment, a transmission is not included. Rather, an electric motor is coupled directly to a differential 122. An exemplary differential is a helical gear set. The motor can be run in a first direction for forward operation of the golf cart and in a second direction for reverse operation of the golf cart. Although mentioned in connection with a golf cart, the concepts described herein may be used in connection with any electric vehicle.

Recreational vehicle 100 further includes a braking/traction system 130. In one embodiment, braking/traction system 130 includes anti-lock brakes. In one embodiment, braking/traction system 130 includes active descent control and/or engine braking. In one embodiment, braking/traction system 130 includes a brake and in some embodiments a separate parking brake. Braking/traction system 130 may be coupled to any of prime mover 112, transmission 116, differential 122, and ground engaging members 102 or the connecting drive members therebetween.

Returning to FIG. 1, recreational vehicle 100 further includes a steering system 138. Steering system 138 is coupled to at least one of the ground engagement members 102 to direct recreational vehicle 100. Steering system 138 generally includes a steering member adapted to be grasped by an operator of vehicle 100. Exemplary steering members include handlebars and steering wheels.

Further, recreational vehicle 100 includes a vehicle controller 140 having at least one associated memory 142. Vehicle controller 140 provides the electronic control of the various components of recreational vehicle 100. Further, vehicle controller 140 is operatively coupled to a plurality of sensors 144 (see FIG. 3) which monitor various parameters of recreational vehicle 100 or the environment surrounding vehicle 100. Vehicle controller 140 performs certain operations to control one or more subsystems of other vehicle components, such as one or more of a fuel system 110, an air handling system 115, CVT 120, shiftable transmission 118, prime mover 112, differentials 122 and other systems. In certain embodiments, controller 140 forms a portion of a processing subsystem including one or more computing devices having memory, processing, and communication hardware. Controller 140 may be a single device or a distributed device, and the functions of controller 140 may be performed by hardware and/or as computer instructions on a non-transient computer readable storage medium, such as memory 142.

Vehicle controller 140 also interacts with an operator interface 150 which includes at least one input device 152 and at least one output device 154. Exemplary input devices 152 include levers, buttons, switches, soft keys, and other suitable input devices. Exemplary output devices include lights, displays, audio devices, tactile devices, and other suitable output devices. Operator interface 150 further includes an interface controller 156 and an associated memory 158. Interface controller 156 performs certain operations to control one or more subsystems of operator interface 150 or of other vehicle components, such as one or more of input devices 152 and output devices 154. In one example, operator interface 150 includes a touch screen display and interface controller 156 interprets various types of touches to the touch screen display as inputs and controls the content displayed on touch screen display. In certain embodiments, interface controller 156 forms a portion of a processing subsystem including one or more computing devices having memory, processing, and communication hardware. The interface controller 156 may be a single device or a distributed device, and the functions of the interface controller 156 may be performed by hardware and/or as computer instructions on a non-transient computer readable storage medium, such as memory 158.

Figure 3:
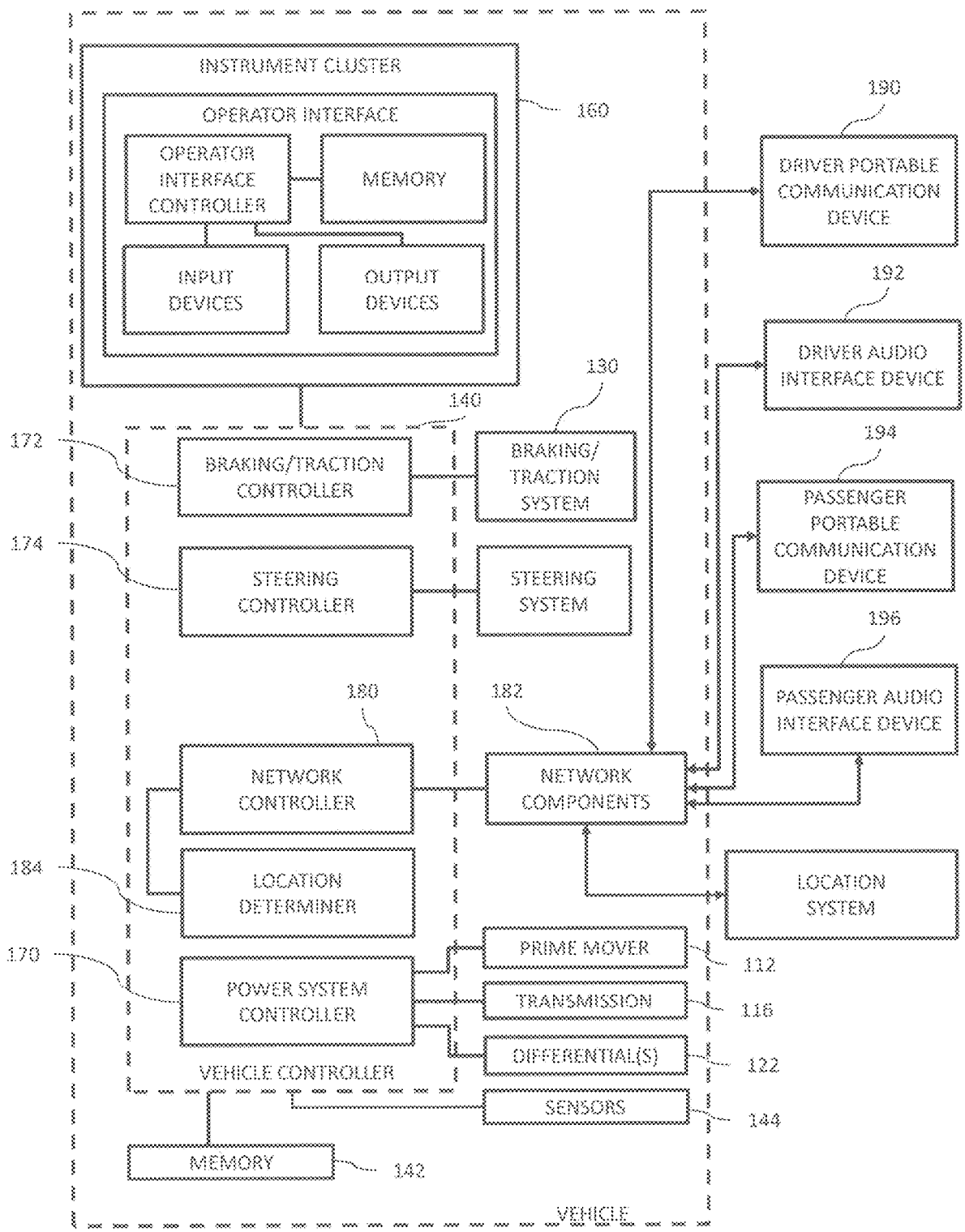
FIG. 3 is a representative view of exemplary components of the vehicle of FIG. 1 operatively coupled to a group management master controller.
Figure 4:
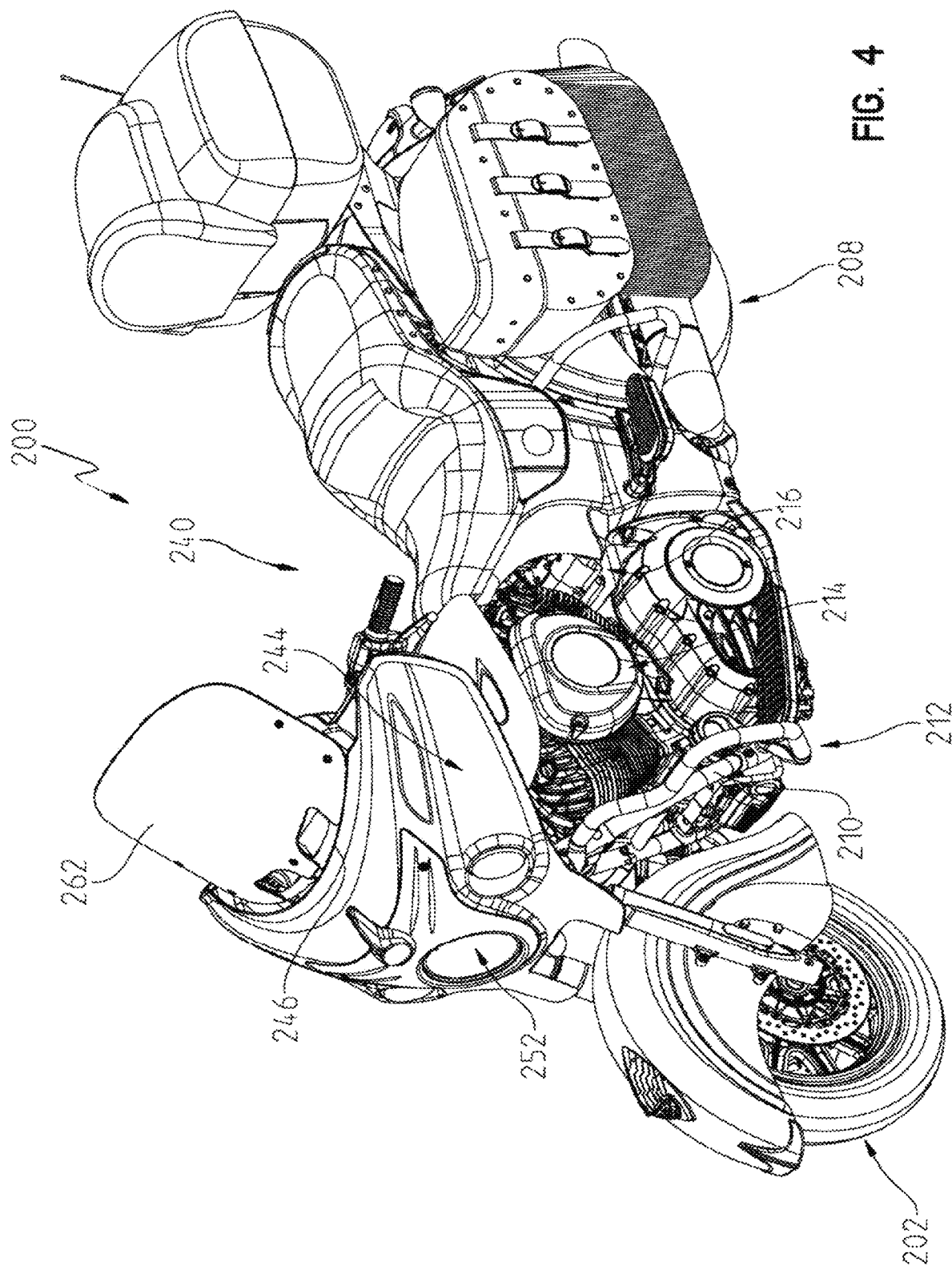
FIG. 4 is a front, left side, perspective view of an exemplary motorcycle.
Figure 5:
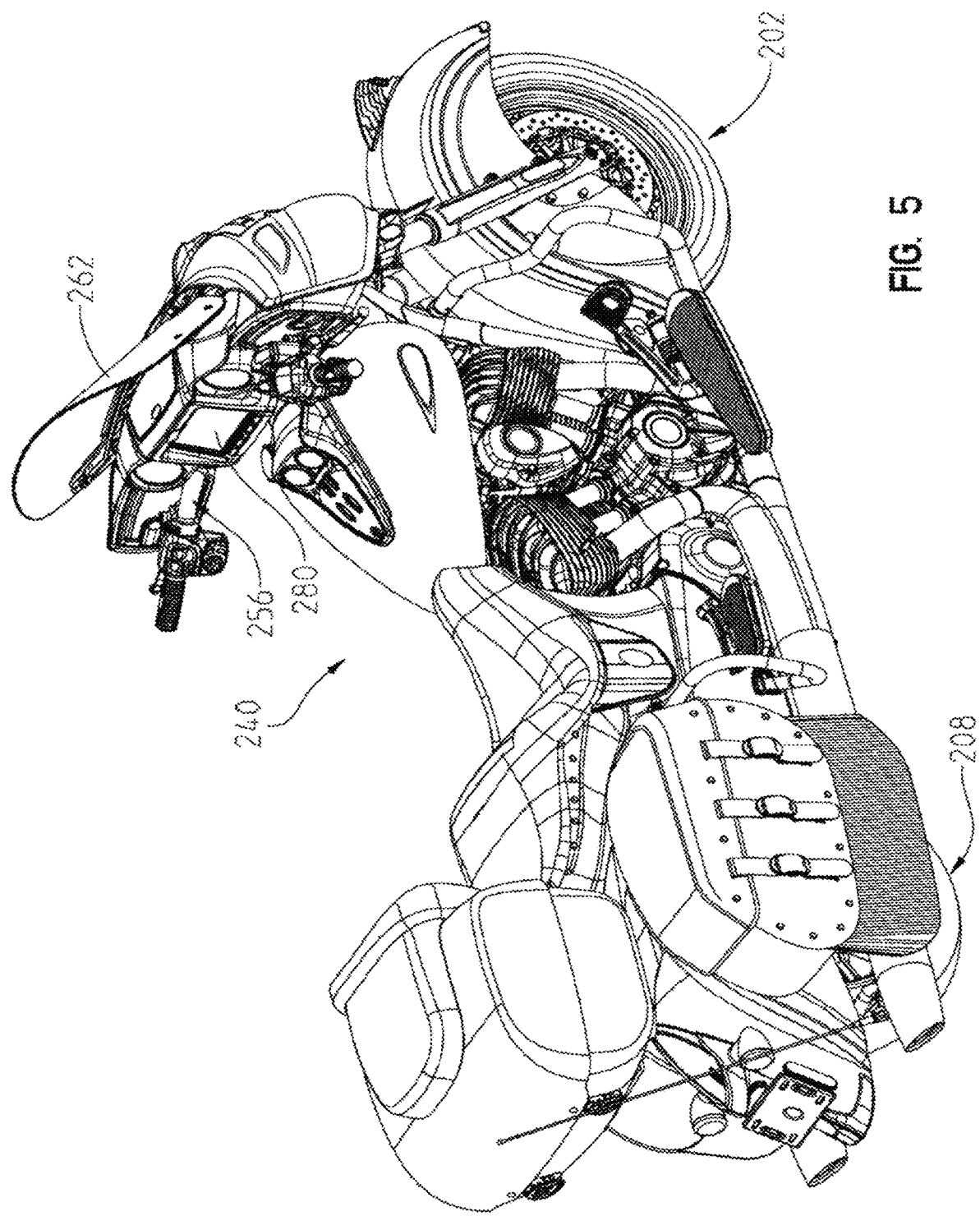
FIG. 5 is a rear, right side, perspective view of the motorcycle of FIG. 4.
Figure 6:
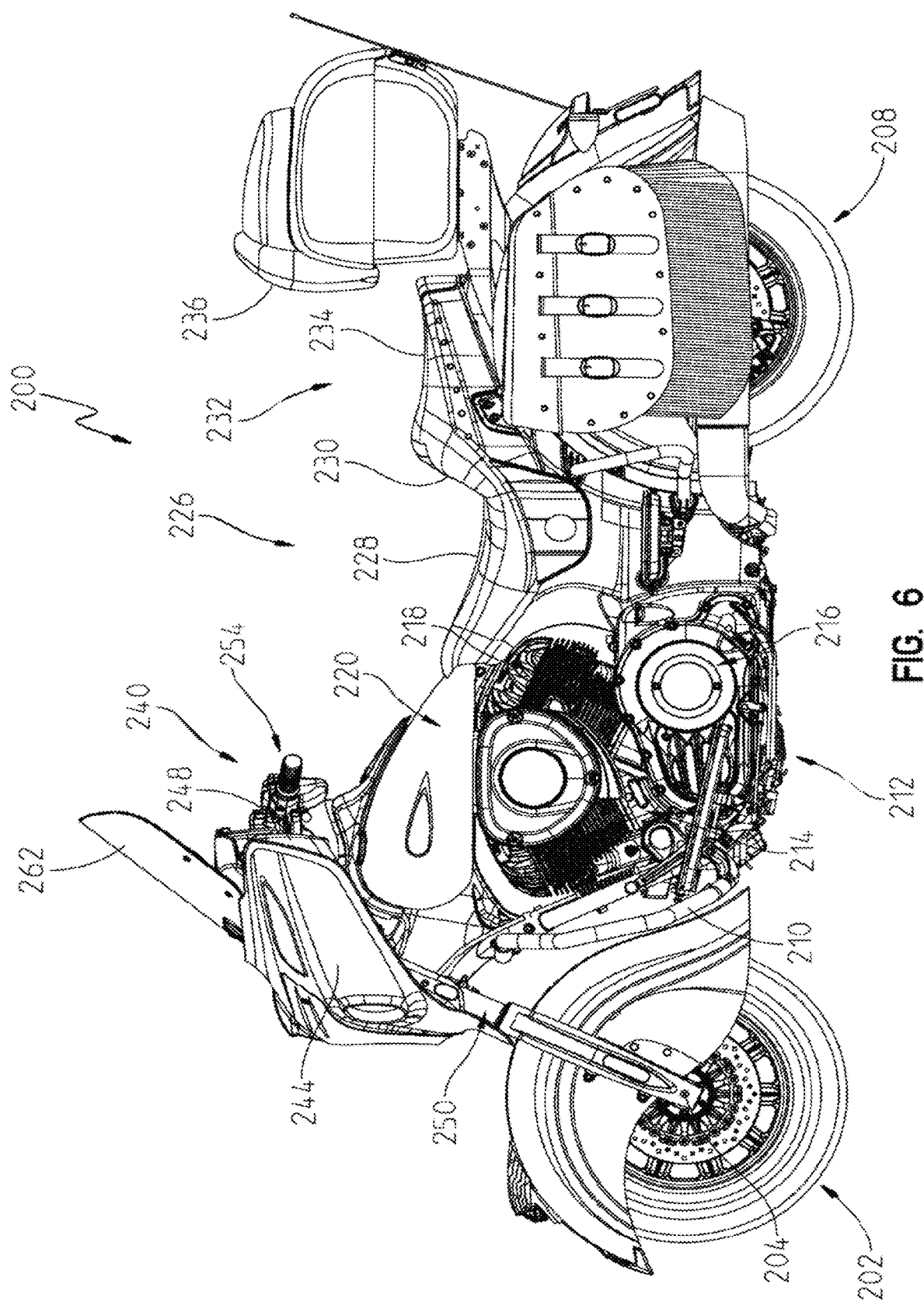
FIG. 6 is a left side view of the motorcycle of FIG. 4.

Referring to FIG. 3, operator interface 150 is included as part of an instrument cluster 160. Interface controller 156 controls the operation of output devices 154 and monitors the actuation of input devices 152. In one embodiment, output devices 154 include a display and interface controller 156 formats information to be displayed on the display and displays the information. In one embodiment, output devices 154 include a touch display and interface controller 156 formats information to be displayed on the touch display, displays the information, and monitors the touch display for operator input. Exemplary operator inputs include a touch, a drag, a swipe, a pinch, a spread, and other known types of gesturing.

As illustrated in the embodiment of FIG. 3, vehicle controller 140 is represented as including several controllers. These controllers may each be single devices or distributed devices or one or more of these controllers may together be part of a single device or distributed device. The functions of these controllers may be performed by hardware and/or as computer instructions on a non-transient computer readable storage medium, such as memory 142.

In one embodiment, vehicle controller 140 includes at least two separate controllers which communicate over a network. In one embodiment, the network is a CAN network. In one embodiment, the CAN network is implemented in accord with the J1939 protocol. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, a two wire serial communication is used.

Referring to FIG. 3, controller 140 includes a power system controller 170 which controls the operation of at least one of prime mover 112, transmission 116, and differentials 122 (if included). In one example, prime mover 112 is an internal combustion engine and power system controller 170 controls the provision of fuel, provision of spark, engine performance, reverse operation of vehicle, locking differential, all wheel drive, ignition timing, electrical power distribution, and transmission control. Further, power system controller 170 monitors a plurality of sensors. Exemplary sensors include a temperature sensor which monitors the temperature of a coolant which circulates through the engine, throttle position sensor (TPS), exhaust gas temperature sensor (EGT), crank position sensor (CPS), detonation sensor (DET), airbox pressure sensor, intake air temperature sensor, and other parameters as required to control the engine performance.

Controller 140 further includes a braking/traction controller 172 which controls the operation of braking/traction system 130. In one example, braking/traction controller 172 controls pressure and frequency of the actuation of the brake caliper. Further, braking/traction controller 172 monitors a plurality of sensors. Exemplary sensors include a vehicle speed sensor which monitors vehicle speed relative to the ground, an altitude sensor, and an engine RPM sensor.

Controller 140 further includes a steering controller 174 which controls the operation of steering system 138. In one example, steering controller 174 controls an amount of assist provided by a power steering unit of recreational vehicle 100. Further, power steering controller 174 monitors a plurality of sensors. Exemplary sensors and electronic power steering units, including speed profiles, examples of which are provided in U.S. patent application Ser. No. 12/135,107, assigned to the assignee of the present application, titled VEHICLE, the disclosure of which is expressly incorporated by reference herein.

Controller 140 further includes a network controller 180 which controls communications between recreational vehicle 100 and other devices through one or more network components 182. In one embodiment, network controller 180 of recreational vehicle 100 communicates with paired devices over a wireless network (e.g., via a wireless or wifi chip). An exemplary wireless network is a radio frequency network utilizing a BLUETOOTH protocol. In this example, network components 182 include a radio frequency antenna. Network controller 180 controls the pairing of devices to recreational vehicle 100 and the communications between recreational vehicle 100 and the remote devices. An exemplary remote device is a driver portable communication device 190, a driver audio interface device 192, a passenger portable communication device 194, and a passenger audio interface device 196. Exemplary portable communication devices include cellular telephones, satellite telephones, and other devices capable of sending and receiving communications through external networks. Exemplary cellular phones include both IOS and android devices, for example the IPHONE brand cellular phone sold by Apple Inc., located at 1 Infinite Loop, Cupertino, Calif. 95014 and the GALAXY brand cellular phone sold by Samsung Electronics Co., Ltd, respectively. Exemplary communications include audio calls, short message system texts, and other types of communication. Exemplary audio interface devices include headsets including a microphone to receive audio and convert the audio to electronic signals and a speaker to convert electronic signals into audio.

Controller 140 further includes a location determiner 184 which determines a current location of recreational vehicle 100. An exemplary location determiner 184 is a GPS unit which determines the position of recreational vehicle 100 based on interaction with a global satellite system.

Although vehicle controller 140 and interface controller 156 are illustrated separately in FIG. 3, their functionality may be combined. Further, a portion or all of the functionality of one or more of network controller 180 and location determiner 184 may be included as part of interface controller 156. In one embodiment, it is desired to include the functionality of network controller 180 and location determiner 184 as part of interface controller 156 to provide an instrument cluster 160 that is easily replaceable or upgradable. Throughout this application, various features and functionality are described in connection with vehicle controller 140, interface controller 156, or generally a vehicle associated controller. Either one or both of vehicle controller 140 and interface controller 156 may provide the described features and functionality.

Memory 142 (FIG. 1) may be representative of multiple memories which are provided locally with power system controller 170, braking/traction controller 172, steering controller 174, network controller 180, and location determiner 184. The information recorded or determined by one or more of power system controller 170, braking/traction controller 172, steering controller 174, network controller 180, and location determiner 184 may be stored on memory 142. Memory 158 (FIG. 1) is one or more non-transitory computer readable medium. Memory 158 may be representative of multiple memories which are provided locally with interface controller 156, and one or more of network controller 180 and location determiner 184 when included as part of interface controller 156. The information recorded or determined by one or more of interface controller 156, network controller 180 and location determiner 184 may be stored on memory 158.

Figure 7:
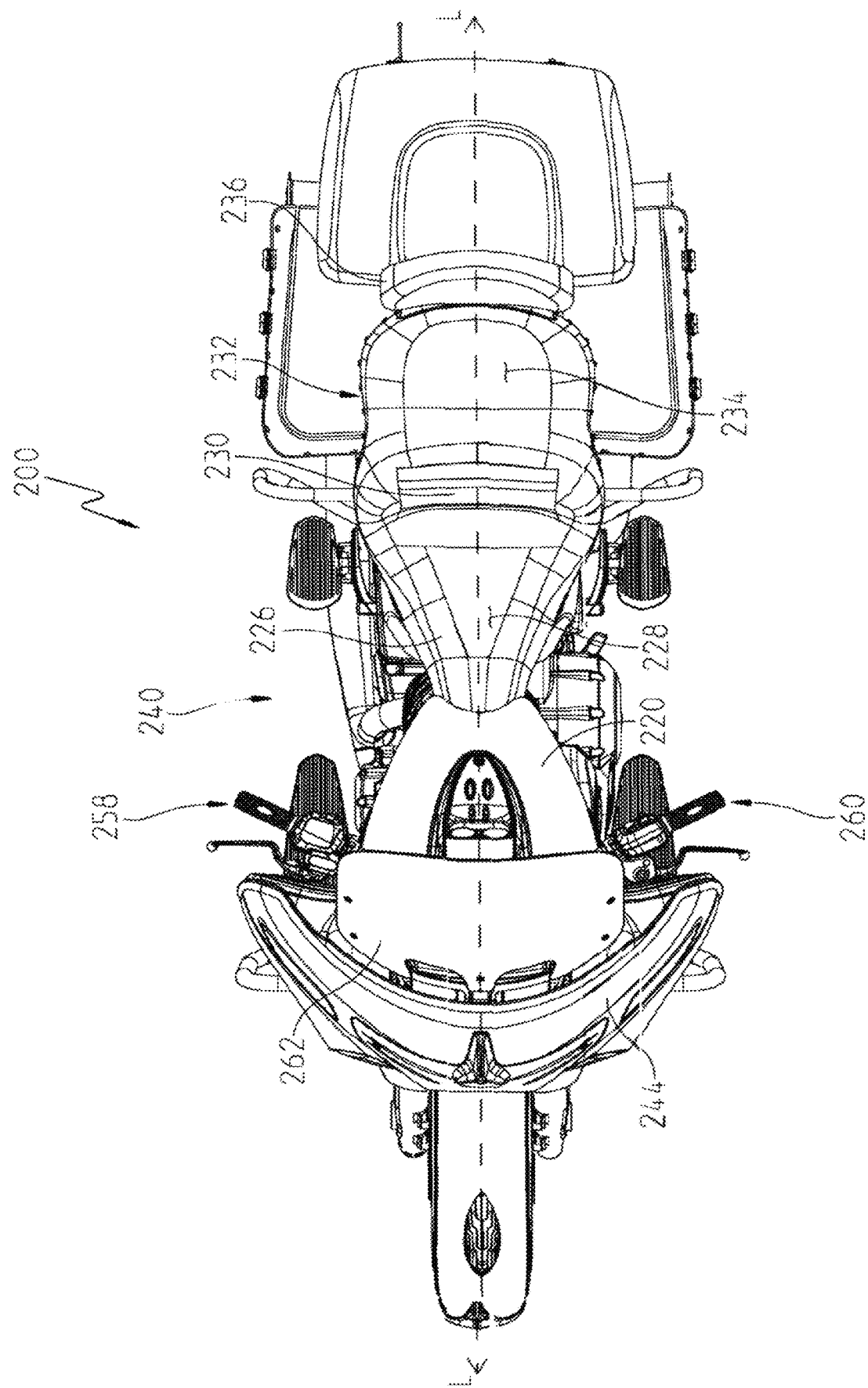
FIG. 7 is a top view of the motorcycle of FIG. 4.

Referring to FIGS. 4-8, an exemplary motorcycle 200 is shown. Motorcycle 200 includes a front ground-engaging member 202 with a front axis of rotation 204 (FIG. 6), a rear ground-engaging member 208 with a rear axis of rotation (not shown), a frame assembly 210 supported by ground-engaging members 202, 208 and extending longitudinally between the ground engaging members 202, 208. Referring to FIG. 7, front ground-engaging member 202 and rear ground-engaging member 208 are inline and centered along a longitudinal centerline plane (L) of motorcycle 200. Motorcycle 200 further includes a powertrain assembly 212 supported by frame assembly 210. Powertrain assembly 212 includes an engine 214 and a transmission 216. Transmission 216 may be a shiftable transmission or a continuously-variable transmission or both. Engine 214 is operably coupled to transmission 216 and includes at least one cylinder 218 and, illustratively, includes two cylinders 218. A fuel tank 220 is fluidly coupled to engine 214 and positioned generally above cylinders 218.

Referring to FIGS. 4-8, a seat assembly 224 is coupled to frame assembly 210 and is positioned generally above at least a portion of powertrain assembly 212. Seat assembly 224 includes an operator seat 226, defined by a seat bottom 228 and a seat back 230, and a passenger seat 232, defined by a seat bottom 234 and a seat back 236.

Referring to FIGS. 4-7, vehicle 200 includes an operator area 240 positioned generally forward of seat assembly 224 and rearward of at least a portion of a front fairing 244 of vehicle 200. Fairing 244 includes an upper extent defined by an upper lip 246. A center point of upper lip 246 aligns with longitudinal centerline plane (L). Fairing 244 extends rearwardly to a rear extent 248 which is positioned generally above an upper extent of fuel tank 220. Fairing 244 is coupled to a front fork assembly 250 of vehicle 200 and supports a headlight 252 forward of front fork assembly 250.

Front fork assembly 250 is operably coupled to a steering assembly 254. Additional details of fairing 244 and front fork assembly 250 are disclosed in U.S. patent application Ser. No. 14/077,037, the complete disclosure of which is expressly incorporated by reference herein.

Operator area 240 includes steering assembly 254 including a handlebar 256 which moves with the front fork, a right hand grip 258, and a left hand grip 260. Operator area 240 is protected by a windshield 262.

Operator area 240 further includes a user interface assembly 270. User interface assembly 270 includes a first portion 272 supported by faring 244, a second portion 274 supported by handlebar 256 and positioned adjacent left hand grip 260, a third portion 276 supported by handlebar 256 and positioned adjacent right hand grip 258, and a fourth portion 278 supported by fuel tank 220. Second portion 274 and third portion 276 move with handlebar 256. Thus, when a driver of motorcycle 200 rotates handlebar 256, front fork assembly 250, front ground-engaging member 202, second portion 274, and third portion 276 all rotate with handlebar 256. In one embodiment, faring 244 and hence first portion 272 of user interface assembly 270 also rotates with handlebar 256 due to faring 244 being supported by front fork assembly 250.

User interface assembly 270 includes a plurality of input devices and output devices. Exemplary input devices include buttons, switches, touch displays, dials, and other devices which receive input from a driver of motorcycle 200. Exemplary output devices include gauges, displays, touch displays, lights, and other devices that provide one or more of a visual output, an audio output, and a tactile output to a driver of motorcycle 200.

First portion 272 of user interface assembly 270 includes a first display 280, a second display or gauge 282, and a third display or gauge 284. In one embodiment, displays 280, 282, 284 may be movable or configured to tilt between upper and lower positions to accommodate the preferences of the operator. First display 280 is positioned intermediate second and third displays 282, 284 and is positioned along longitudinal centerline plane (L) of motorcycle 200. Display 280, along with display 282, display 284, and along with display or gauge 286 of fourth portion 278 and display or gauge 288 of fourth portion 278 are configured to display various data or information about the operating conditions of vehicle 200, ambient conditions, infotainment (e.g., GPS, radio, wireless connectivity, Bluetooth® connectivity, audio settings), and/or any other information that may be useful to the driver during operation of motorcycle 200.

In one embodiment, at least display 280 is a touch-screen display with a plurality of pixels configured to change in response to an operator input. For example, the operator may use his/her finger to select options on first display 280 and receive information about motorcycle 200, ambient conditions, etc. In one embodiment, first display 280 has a generally rectangular cross-section defined by a width 78 and a height 80. Illustratively, width 78 may be approximately 5-7 inches, for example 6.2 inches, and height 80 may be approximately 3-5 inches, for example 3.8 inches. Second and third displays 282 and 284 also may define a rectangle in cross-section, however, illustrative first and second displays 282 and 284 define a circle in cross-section.

Additional details regarding motorcycle 200 are provided in U.S. patent application Ser. No. 14/985,673, filed Dec. 31, 2015, titled TWO-WHEELED VEHICLE, the entire disclosure of which is expressly incorporated by reference herein.

Figure 8:
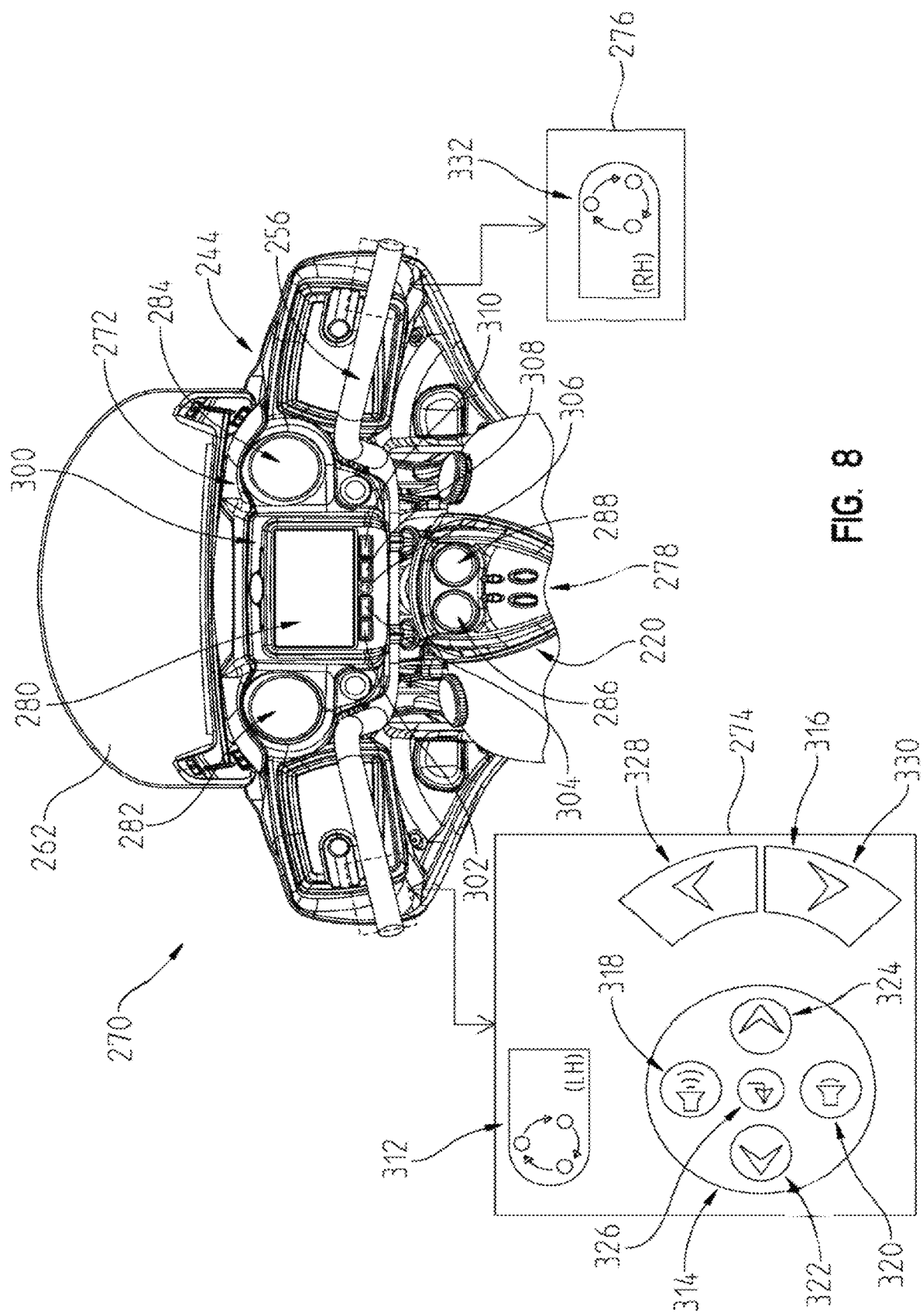
FIG. 8 is a partial view of the motorcycle of FIG. 4 from a driver location on the motorcycle illustrating a user interface system of the motorcycle of FIG. 4.

Referring to FIG. 8, display 280 is part of an instrument cluster 300. Instrument cluster 300 additionally includes a riding screen input button 302, an audio selection input button 304, a power button 306, a connectivity button 308, a navigation button 310, and a configuration button 311 (FIG. 9). Although described or illustrated as buttons 302-311, other input devices may be used including switches, touch screen regions of display 280, and other suitable devices for providing an input to instrument cluster 300. By selecting any one of input buttons 302-311, the operator interface controller 156 of instrument cluster 300 changes the layout presented on display 280. In addition to input buttons 302-311, operator interface controller 156 additionally may change the screen layout presented on display 280 in response to inputs provided as part of second portion 274 of user interface assembly 270 and inputs that are part of third portion 276 of user interface assembly 270.

As illustrated in FIG. 8, second portion 274 of user interface assembly 270 includes a left-hand trigger input button 312, a plurality of audio inputs 314, and a plurality of toggle inputs 316. The plurality of audio inputs 314 includes a volume up input 318, a volume down input 320, a scroll back input 322, a scroll forward input 324, and an accept selection input 326. Alternatively, in one embodiment, accept selection input 326 may be an audio input selection to control various audio options, for example a sound-mute option and/or an option to play/pause the audio. When accept selection input 326 controls audio input, accept selection functions may be controlled through additional inputs, as disclosed further herein. The plurality of toggle inputs 316 includes a toggle up input 328 and a toggle down input 330. Additional details regarding the use of left-hand trigger input button 312, audio inputs 314, and toggle inputs 316 are provided herein. The third portion 276 of user interface assembly 270 includes a right-hand trigger input button 332. When accept selection input 326 controls audio input, accept selection functions may be controlled through inputs any of 312, 314, 316, 332. Additional details regarding the interaction between the inputs of third portion 276, user interface assembly 270, and instrument cluster 300 are disclosed herein.

Figure 16:
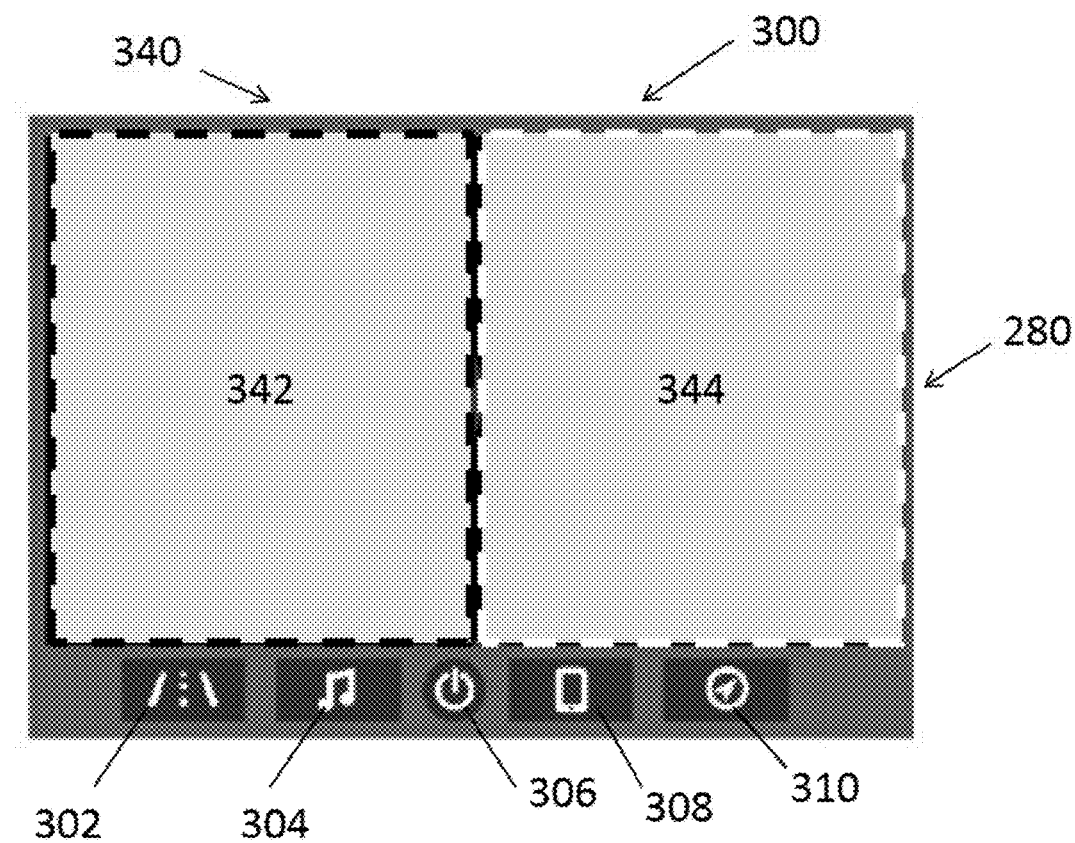
FIG. 16 is an exemplary layout of customizable regions for the riding screens of FIGS. 9-11.

Referring to FIGS. 9-11, three riding screen layouts 571, 573, and 575 are illustrated for display screen 280. Each riding screen layout is a customized screen selected by an operator of vehicle 200. Referring to FIG. 16, a representation of a first screen layout 340 is shown. Screen layout 340 includes a first region 342 and a second region 344. Regions 342, 344 are positioned side by side in a non-overlapping arrangement on display 280. In other embodiments, region 342 is positioned above 344 on display 280. Each of region 342 and region 344 are customizable by the operator of vehicle 200. The operator can select the information to be displayed in each of region 342 and 344 from a preset list of options. In one embodiment, the predefined of options for regions 342 and 344 include a trip 1 screen layout, a trip 2 screen layout, a ride data screen layout, a vehicle status screen layout, a vehicle information screen layout, an audio screen layout, a connectivity status screen layout, a map/navigation screen layout, and a custom image screen layout.

Figure 17:
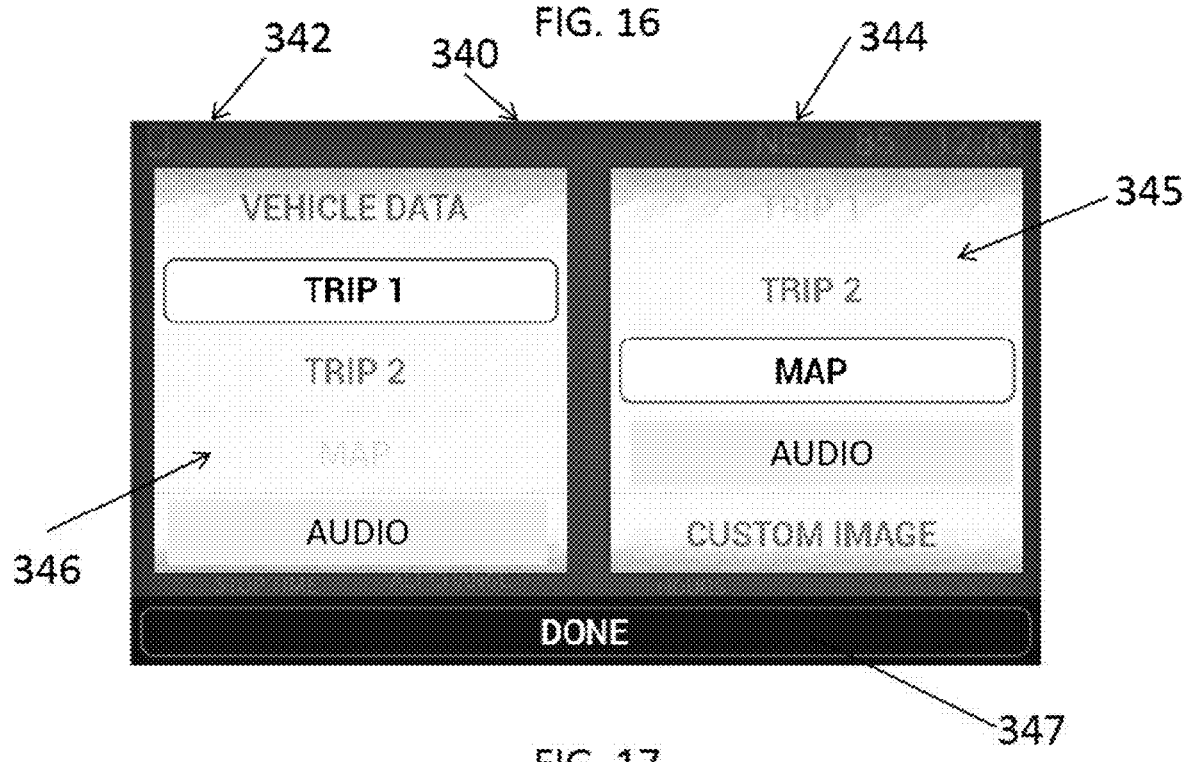
FIG. 17 is an exemplary selection inputs for the customizable regions illustrated in FIG. 16.

Referring to FIG. 17, a selection screen layout 343 is shown. The selection screen layout 342 provides the various options for regions 342 and 344 to the operator of vehicle 200 for selection. An operator of vehicle 200 navigates to first region 342 by selecting configuration button 311 (FIG. 9). In one embodiment, the operator may scroll through a left-hand list of selections 345 which correspond to region 342 and a right-hand list of selections 346 which correspond to region 344 by swiping their finger on the touch screen of display 280. The operator than selects by touch the desired option screen to be shown in regions 342 and 344, as indicated by the outlined options shown in second region 344 and selections 345. Once the selections are made, the operator will touch the done region 347 of first region 342 to select the highlighted options. The selected options are stored in memory 158 of instrument cluster 300.

Figure 18A:
FIG. 18A is a first exemplary trip screen layout for display on a display of the user interface system of FIG. 8 in one of the customizable regions of FIG. 16.

Referring to FIG. 18A, a first trip option screen layout 350 is shown. This screen layout may be used for both a trip 1 option and a trip 2 option. As shown in FIG. 18A, first trip option screen layout 350 includes an indication 352 of a distance traveled since the trip odometer was set, a distance to empty indicator 354 which provides an indication of the remaining miles that may be traveled based on fuel levels in fuel tank 220, an average miles per gallon indicator 356, an instantaneous miles per gallon indicator 358, a time elapsed indicator 360, and an average speed indicator 362. In addition, a reset input 364 is provided in the upper left corner of first trip option screen layout 350. It will be understood by one of skill in the art the values reported in indicators 352-362 are based on computations made by one or more of the controllers of vehicle 200 based on sensor values received from one or more sensors 144 of vehicle 200.

Figure 18B:
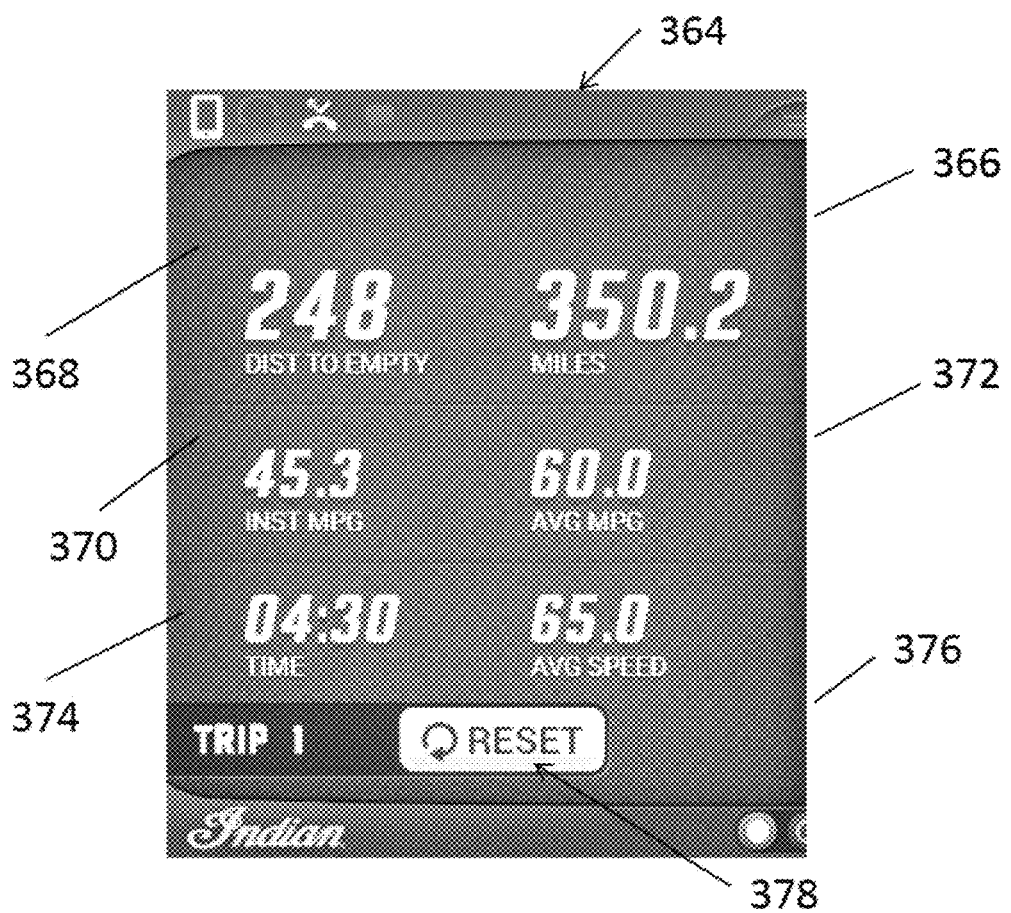
FIG. 18B is a second exemplary trip screen layout for display on a display of the user interface system of FIG. 8 in one of the customizable regions of FIG. 16.

Referring to FIG. 18B, a second trip option screen layout 364 is shown. This screen layout may be used for both a trip 1 option and a trip 2 option. As shown in FIG. 18B, second trip option screen layout 364 includes an indication 366 of a distance traveled since the trip odometer was set, a distance to empty indicator 368 which provides an indication of the remaining miles that may be traveled based on fuel levels in fuel tank 220, an average miles per gallon indicator 370, an instantaneous miles per gallon indicator 372, a time elapsed indicator 374, and an average speed indicator 376. In addition, a reset input 378 is provided in the lower center portion of reset input 378. It will be understood by one of skill in the art the values reported in indicators 352-362 are based on computations made by one or more of the controllers of vehicle 200 based on sensor values received from one or more sensors 144 of vehicle 200.

Figure 19A:
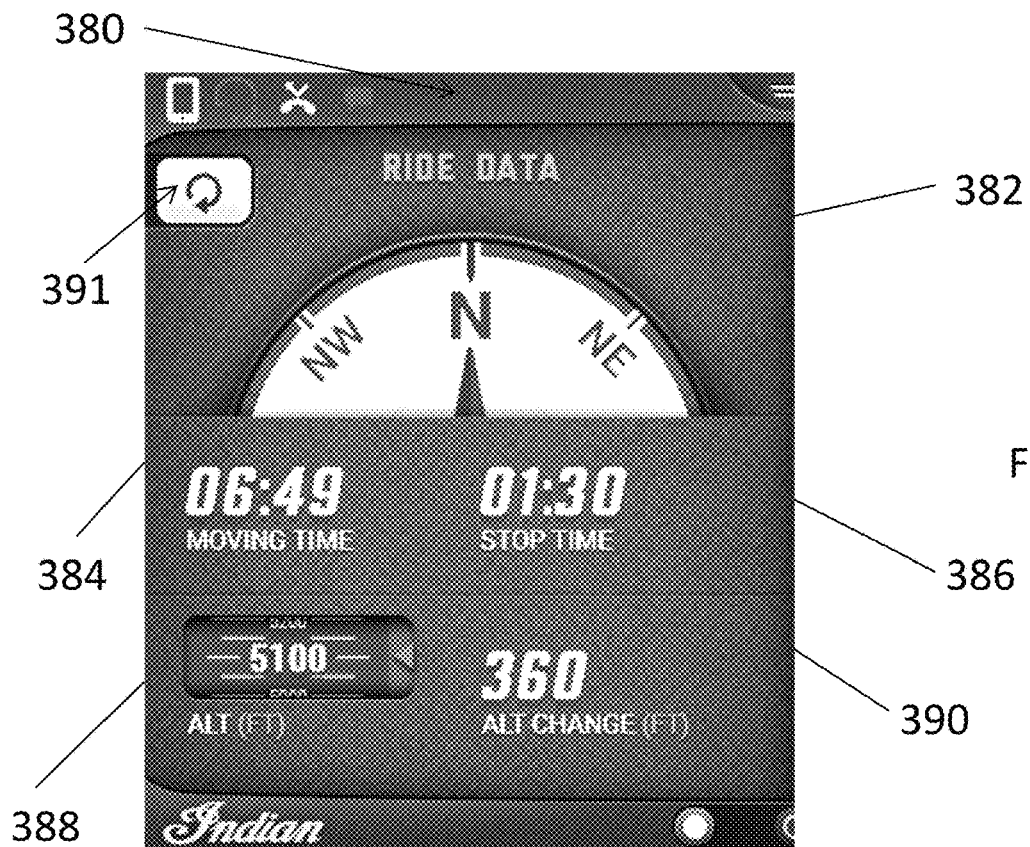
FIG. 19A is a first exemplary ride data screen layout for display on a display of the user interface system of FIG. 8 in one of the customizable regions of FIG. 16.

Referring to FIG. 19A, a first exemplary screen layout 380 of a ride data screen is shown. First exemplary screen layout 380 includes a heading indicator 382, a moving time indicator 384, a stop time indicator 386, an altitude indicator 388, and an altitude change indicator 390. Moving time indicator 384 provides an indication of the elapsed time that vehicle 200 has been in motion. Stop time indicator 386 provides an elapsed time of the amount of time that vehicle 200 has been stopped. Altitude change indicator 390 provides an indication of the change between the highest and lowest altitude readings of vehicle 200 during the current power on of vehicle 200. In addition, a reset input 391 is provided in the upper left corner of first trip option screen layout 350. It will be understood by one of skill in the art the values reported in indicators 352-362 are based on computations made by one or more of the controllers of vehicle 200 based on sensor values received from one or more sensors 144 of vehicle 200.

Figure 19B:
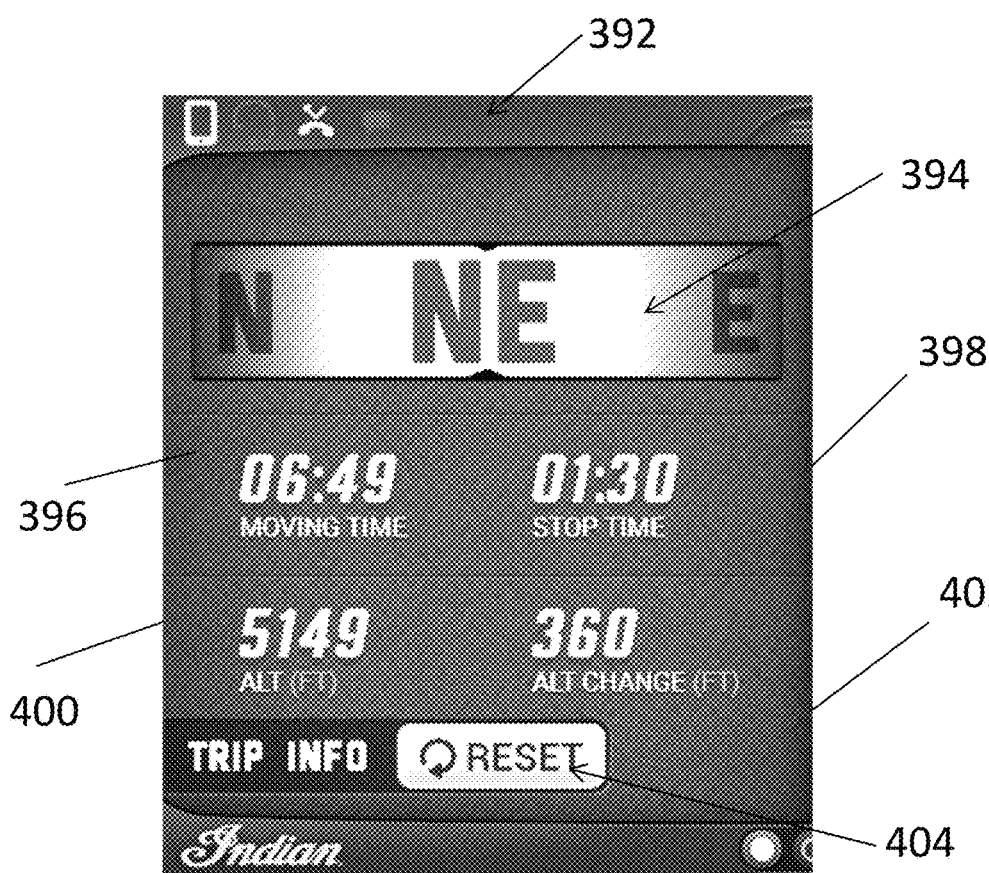
FIG. 19B is a second exemplary ride data screen layout for display on a display of the user interface system of FIG. 8 in one of the customizable regions of FIG. 16.

Referring to FIG. 19B, a first exemplary screen layout 392 of a ride data screen is shown. First exemplary screen layout 380 includes a heading indicator 394, a moving time indicator 396, a stop time indicator 398, an altitude indicator 400, and an altitude change indicator 402. Moving time indicator 384 provides indication of the elapsed time that vehicle 200 has been in motion. Stop time indicator 386 provides an elapsed time of the amount of time that vehicle 200 has been stopped. Altitude change indicator 390 provides an indication of the change between the highest and lowest altitude readings of vehicle 200 during the current power on of vehicle 200. In addition, a reset input 391 is provided in the upper left corner of first trip option screen layout 350. In addition, a reset input 404 is provided in the lower center portion of reset input 404. It will be understood by one of skill in the art the values reported in indicators 352-362 are based on computations made by one or more of the controllers of vehicle 200 based on sensor values received from one or more sensors 144 of vehicle 200.

Figure 20A:
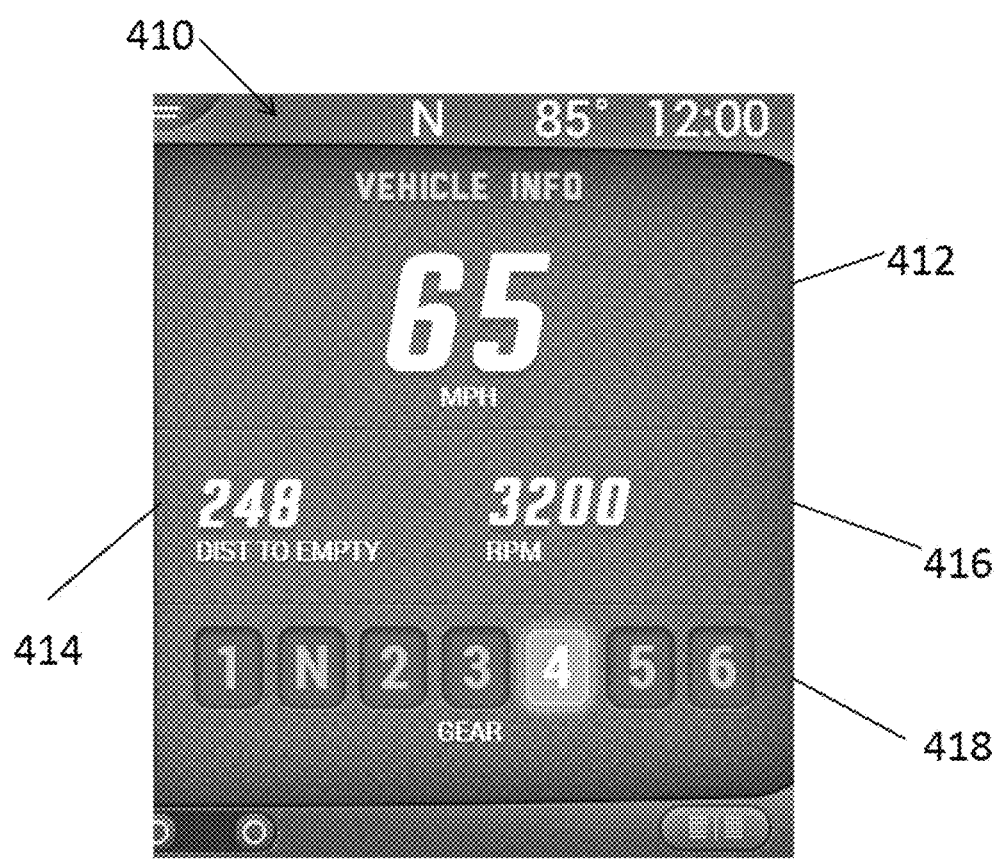
FIG. 20A is a first exemplary vehicle information screen layout for display on a display of the user interface system of FIG. 8 in one of the customizable regions of FIG. 16.

Referring to FIG. 20A, a first exemplary vehicle information screen layout 410 is shown. The vehicle information screen layout 410 includes miles per hour indicator 412, a distance to empty indicator 414, a rpm indicator 416, and a gear indicator 418. Gear indicator 418 provides an indication of the current gear setting for the transmission 216 of vehicle 200. The current gear is a different color than the remaining gear indicators. It will be understood by one of skill in the art the values reported in indicators 352-362 are based on computations made by one or more of the controllers of vehicle 200 based on sensor values received from one or more sensors 144 of vehicle 200.

Figure 20B:
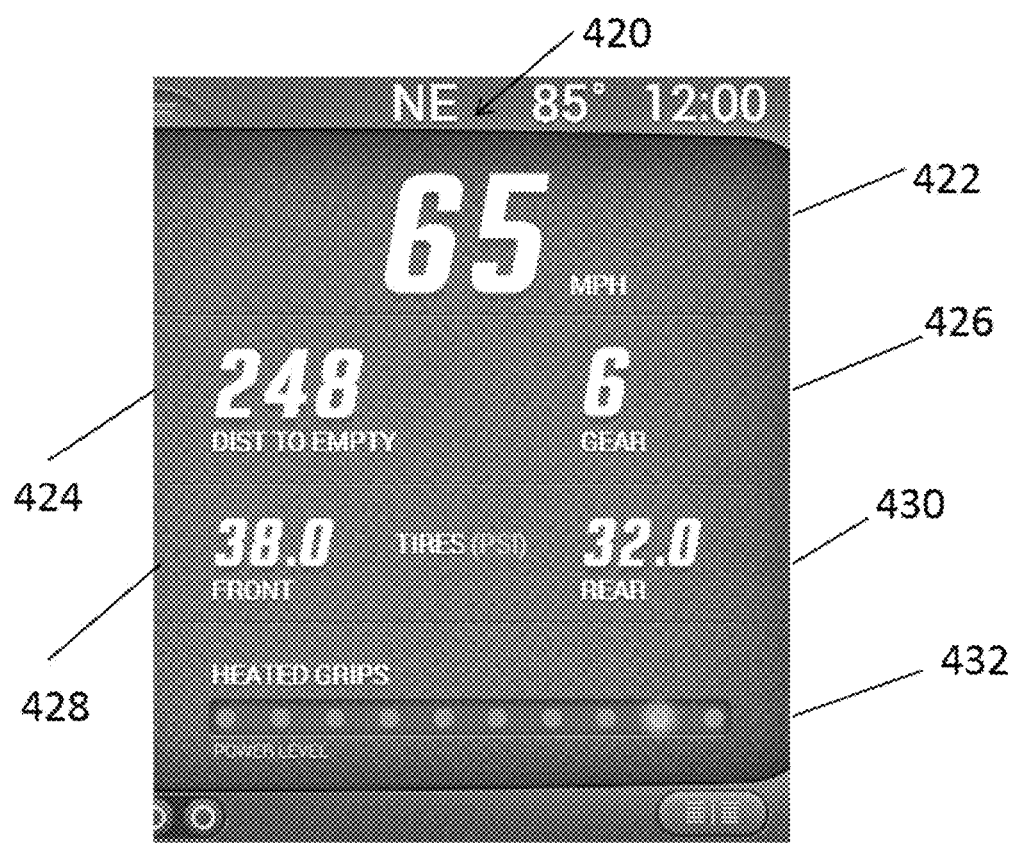
FIG. 20B is a second exemplary vehicle information screen layout for display on a display of the user interface system of FIG. 8 in one of the customizable regions of FIG. 16.

Referring to FIG. 20B, a second exemplary vehicle information screen layout 420 is shown. Screen layout 420 includes miles per hour indicator 422, a distance to empty indicator 424, a current gear indicator 426, a front tire pressure indicator 428, a rear tire pressure indicator 430, and a power level indicator 432 for an accessory of vehicle 200. Exemplary accessories include heated grips provided for right hand grip 258 and left hand grip 260 of vehicle 200 and a heater for seat bottom 228. In one embodiment, screen layout 420 may display controls and inputs for managing operation of the heated grips and/or the heater for seat bottom 228. It will be understood by one of skill in the art the values reported in indicators 422-432 are based on computations made by one or more of the controllers of vehicle 200 based on sensor values received from one or more sensors 144 of vehicle 200.

Figure 21A:
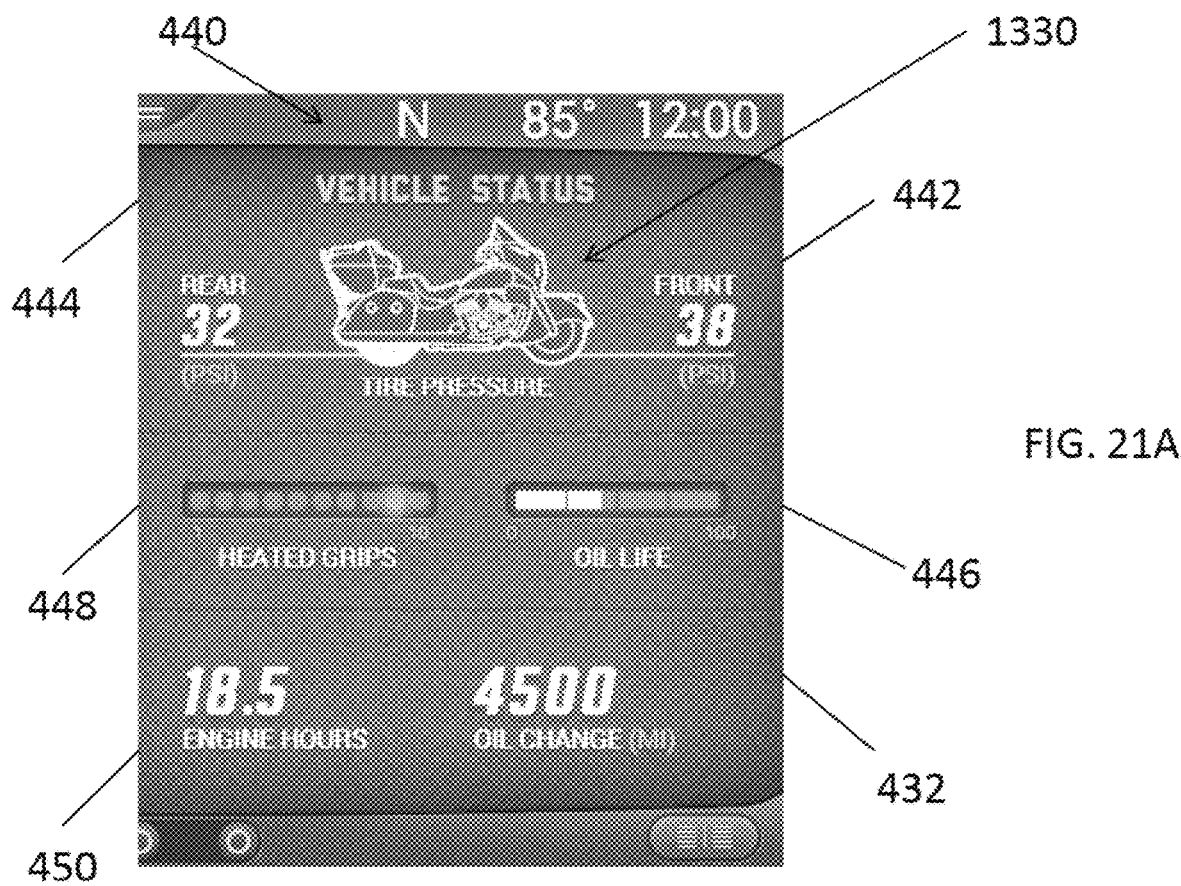
FIG. 21A is a first exemplary vehicle status screen layout for display on a display of the user interface system of FIG. 8 in one of the customizable regions of FIG. 16.

Referring to FIG. 21A, a first exemplary vehicle status screen layout 440 includes a front tire pressure indicator 442, a rear tire pressure indicator 444, an oil life indicator 446, a vehicle accessory status indicator 448, a lapse engine hours indicator 450, and a miles to oil change indicator 452. Exemplary vehicle accessories include heated grips for right hand grip 258 and left hand grip 260. The miles to oil change indicator 452 provides an indication of the expected number of miles that vehicle 200 may travel prior to needed its next oil change. It will be understood by one of skill in the art the values reported in indicators 442-452 are based on computations made by one or more of the controllers of vehicle 200 based on sensor values received from one or more sensors 144 of vehicle 200. As shown in FIG. 21A, screen layout 440 may further display an image of vehicle 200 at 1330. In one embodiment, image 1330 of vehicle 200 shown in screen layout 440 changes with each vehicle 200 to correctly identify the type of vehicle the user is operating (e.g., a touring motorcycle, a cruiser motorcycle, a utility vehicle, etc.). For example, image 1330 may be changed by sending a CAN or other signal to VCU 111 or another component of vehicle 200 to identify the type of vehicle the user is operating. Once the vehicle identifying information has been obtained, the correct image will be shown in screen layout 440 to match vehicle 200.

Figure 21B:
FIG. 21B is a second exemplary vehicle status screen layout for display on a display of the user interface system of FIG. 8 in one of the customizable regions of FIG. 16.

Referring to FIG. 21B, a second exemplary vehicle status screen layout 460 is shown. Vehicle status layout 460 includes a front tire pressure indicator 462, a rear tire pressure indicator 464, a vehicle accessory status indicator 466, an oil life indicator 468, and a miles to oil change indicator 470. Exemplary vehicle accessories include heated grips. The miles to oil change indicator 470 provides an indication of the expected number of miles that vehicle 200 may travel prior to needed its next oil change. It will be understood by one of skill in the art the values reported in indicators 462-470 are based on computations made by one or more of the controllers of vehicle 200 based on sensor values received from one or more sensors 144 of vehicle 200.

Figure 22A:
FIG. 22A is a first exemplary audio screen layout for display on a display of the user interface system of FIG. 8 in one of the customizable regions of FIG. 16.

Referring to FIG. 22A, a first exemplary audio screen layout 474 is shown. Audio screen layout 474 includes an audio band indicator 476, a station indicator 478, a song indicator 480, a genre indicator 482, a frequency indicator 484, a mute input 486, a previous stored favorite input 488, and a next stored preset input 490. In one embodiment, audio band indicator 476 allows the operator to change audio sources when display 280 displays multiple layouts or regions of information.

Figure 22B:
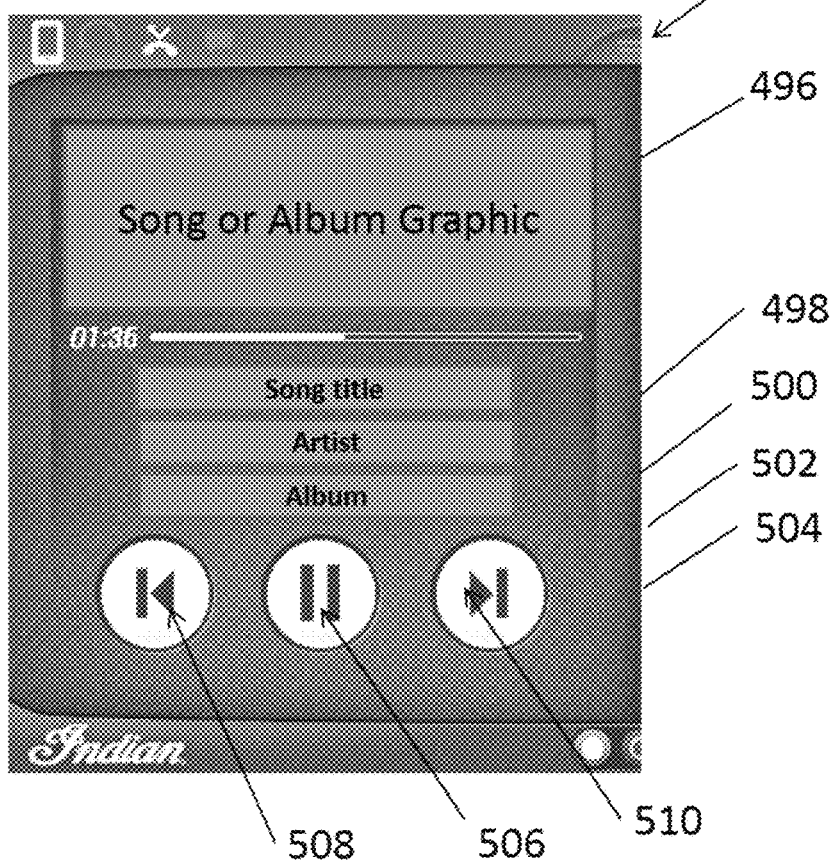
FIG. 22B is a second exemplary audio screen layout for display on a display of the user interface system of FIG. 8 in one of the customizable regions of FIG. 16.

Referring to FIG. 22B, a second exemplary audio screen layout 494 is shown. Audio screen layout 494 includes a song or album graphic indicator 496, a song duration indicator 498, a song title indicator 500, an artist indicator 502, an album indicator 504, and a pause input 506.

Figure 23:
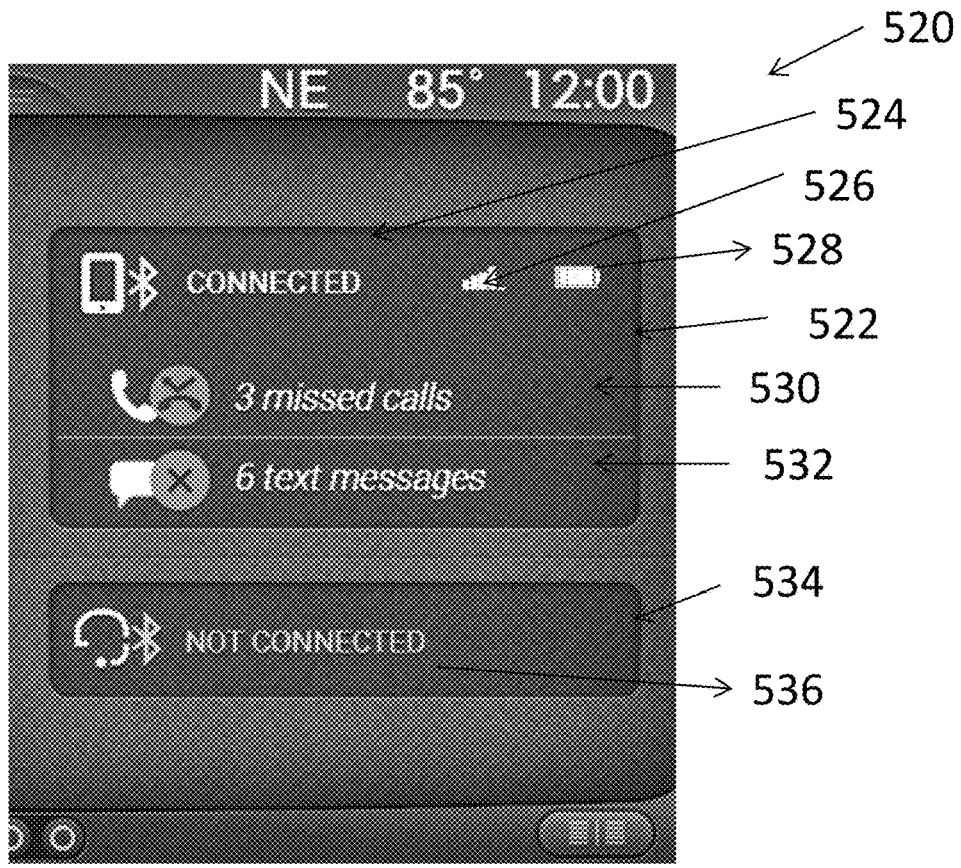
FIG. 23 is an exemplary connectivity screen layout for display on a display of the user interface system of FIG. 8 in one of the customizable regions of FIG. 16.

Referring to FIG. 23, an exemplary connectivity screen layout 520 is shown. Connectivity screen layout 520 includes a first region 522 and a second region 534. First region 522 includes a driver portable communication device connection status indicator 524 for the driver portable communication device 190, a signal strength indicator 526 for the driver portable communication device 190, a battery life indicator 528 for the driver portable communication device 190, a call status indicator 530 for the driver portable communication device 190, and a text message status indicator 532 for the driver portable communication device 190. Second region 534 provides a driver audio interface device connection status indicator 536 for the driver audio interface device 192. In one embodiment, connectivity screen layout 520 further includes indicators for passenger portable communication device 194 and passenger audio interface device 196. It will be understood by one of skill in the art the values reported in indicators for regions 522 and 534 are received from the respective driver portable communication device 190 and driver audio interface device 192 by one or more of the controllers of vehicle 200. Driver portable communication device 190, driver audio interface device 192, passenger portable communication device 194, and passenger audio interface device 196 may be connected to motorcycle 200 through one or more wired connections or through one or more wireless connections. Exemplary wired connections include through one or more USB inputs on motorcycle 200. Exemplary wireless connections include through a BLUETOOTH protocol over a radio frequency network.

Figure 24:
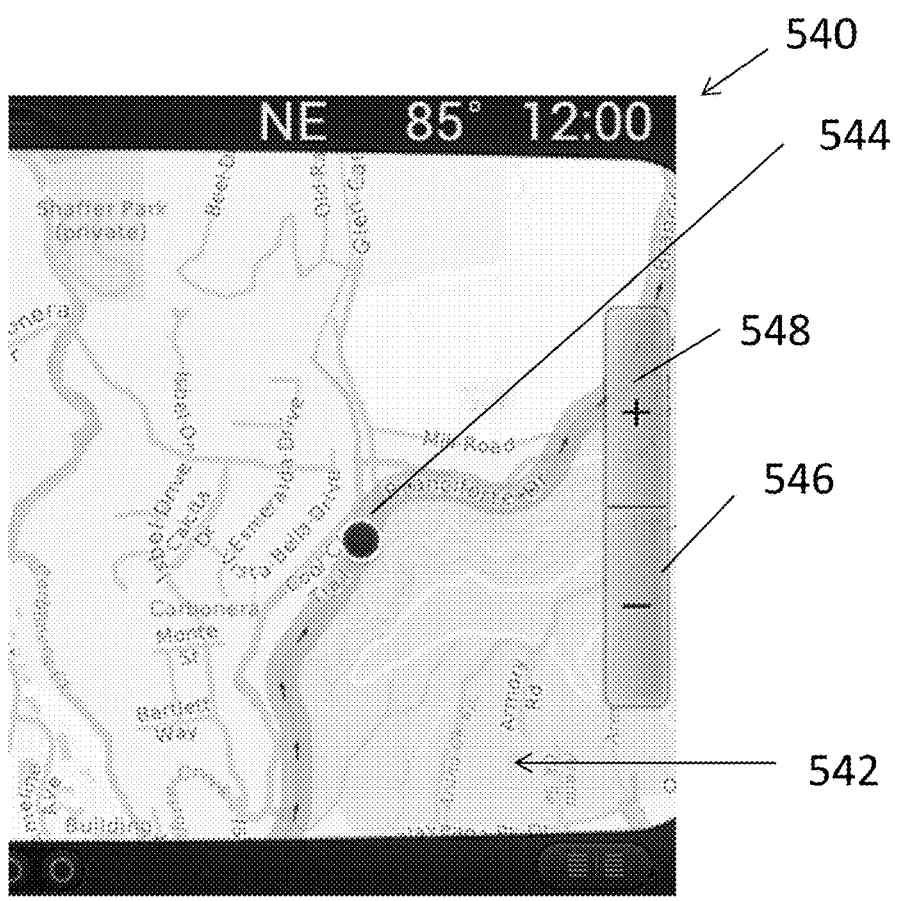
FIG. 24 is an exemplary maps/navigation screen layout for display on a display of the user interface system of FIG. 8 in one of the customizable regions of FIG. 16.

Referring to FIG. 24, an exemplary map/navigation screen layout 540 is shown. Map/navigation screen layout 540 includes a map 542, a vehicle location indicator 544, a zoom out input 546, and a zoom in input 548. It will be understood by one of skill in the art that the location indicator 544 is based on information received by one or more of the controllers of vehicle 200 from location determiner 184. Further, the zoom out and in inputs 546 and 548 control the zoom level associated with map 542. Map 542 may display additional information including points of interest information, traffic information, and other types of information. Exemplary information for presentation through map/navigation screen layout 540 is disclosed in International Patent Application No. PCT/US2014/018638, filed on Feb. 26, 2014, entitled "RECREATIONAL VEHICLE INTERACTIVE TELEMETRY, MAPPING, AND TRIP PLANNING SYSTEM", the entire disclosure of which is expressly incorporated by reference herein. Further, motorcycle 200 may be associated with a group of other recreational vehicles and information regarding the group may be presented through map/navigation screen layout 540. Exemplary group information is disclosed in U.S. Provisional Patent Application No. 62/293,471, filed Feb. 10, 2016, titled RECREATIONAL VEHICLE GROUP MANAGEMENT SYSTEM, the entire disclosure of which is expressly incorporated by reference herein.

Figure 25:
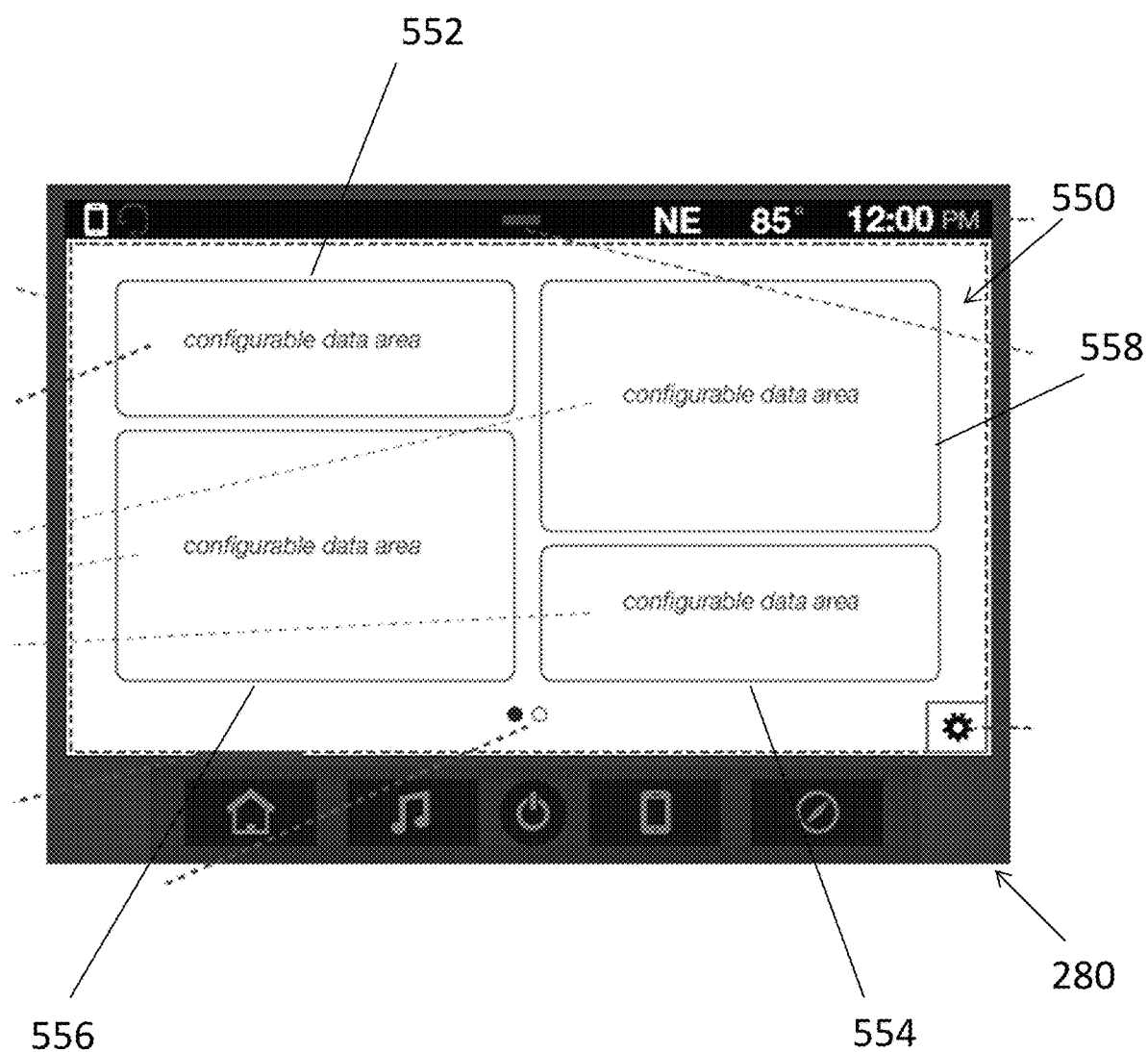
FIG. 25 is another exemplary layout of customizable regions for the riding screens of FIGS. 9-11.

Referring to FIG. 25, a representation of a first screen layout 550 for display 280 is shown. Screen layout 550 includes a first region 552, a second region 554, a third screen region 556, and a fourth screen region 558. Regions 552-558 are positioned in a non-overlapping arrangement on display 280. Each of regions 552-558 are customizable by the operator of vehicle 200. The operator can select the information to be displayed in each of regions 552-558 from a preset list of options.

Figure 27:
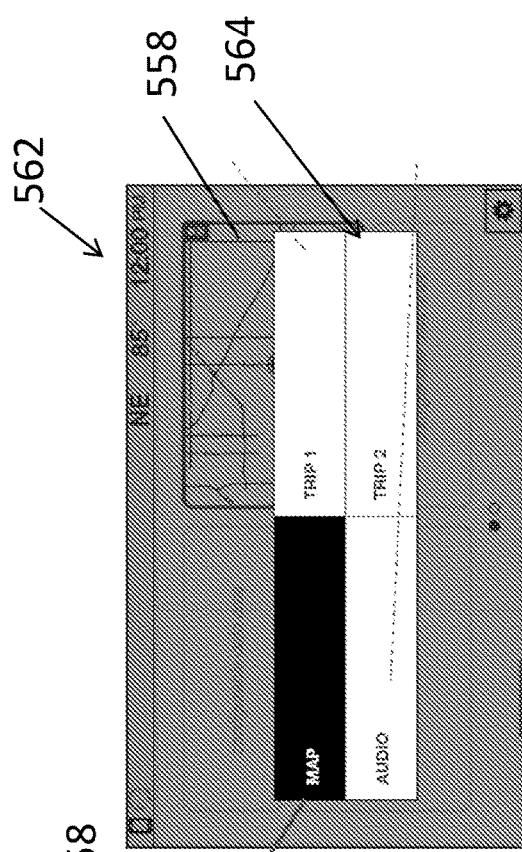
FIG. 27 is an exemplary selection inputs for the larger customizable regions illustrated in FIG. 26.
Figure 29:
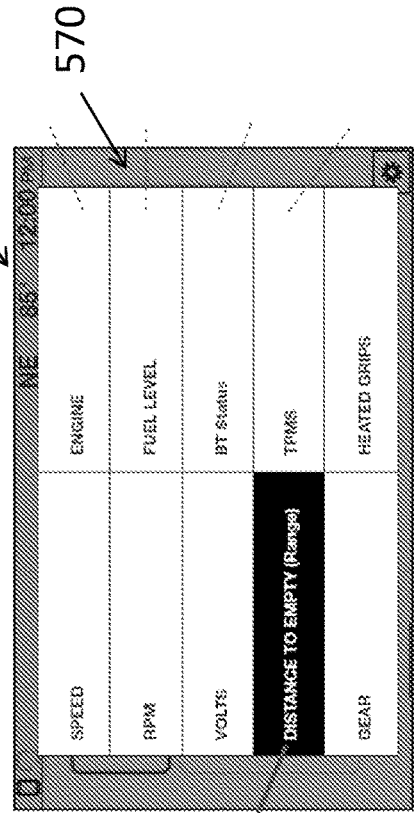
FIG. 29 is an exemplary selection inputs for the smaller customizable regions illustrated in FIG. 28.
Figure 26:
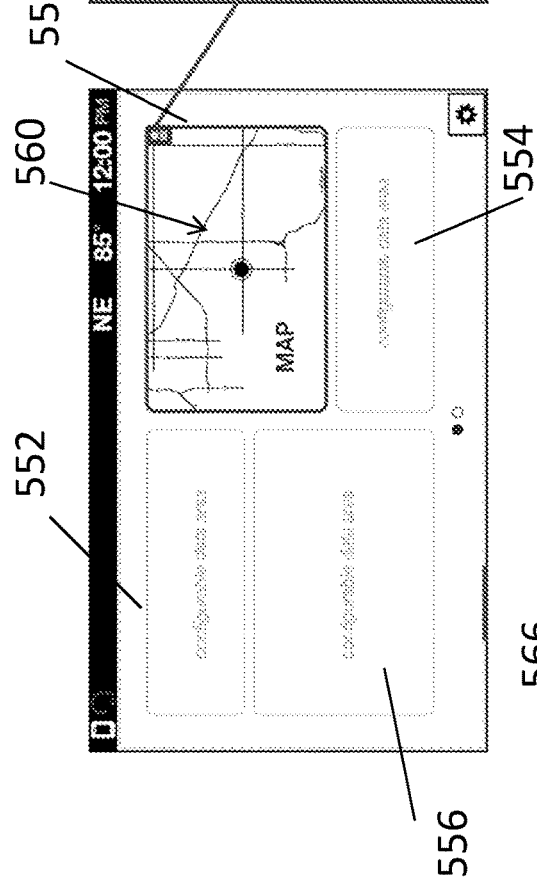
FIG. 26 is an exemplary map screen layout positioned in one of customizable regions of FIG. 25.

In one embodiment, the predefined of options for regions 556 and 558 include a map screen layout, a trip 1 screen layout, a trip 2 screen layout, and an audio screen layout. FIG. 26 illustrates the selection of a map screen layout 560 for region 558. FIG. 27 illustrates a selection screen layout 562 for one of regions 556 and 558. An operator selects region 588 through the touch screen of display 280 and sub-menu 564 is presented on display 280. The operator then selects through the touch screen of display 280 the desired screen layout. The selected options are stored in memory 158 of instrument cluster 300.

Figure 28:
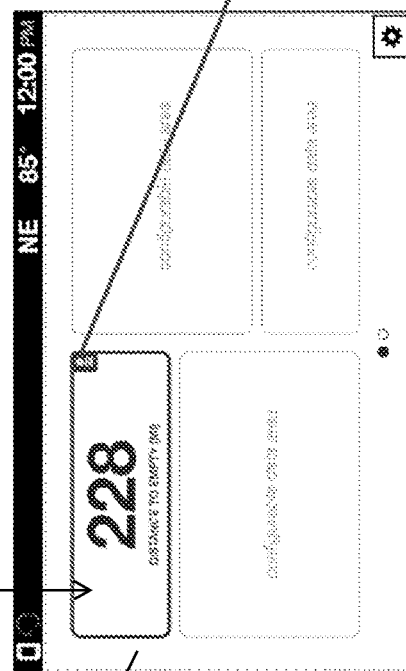
FIG. 28 is an exemplary range screen layout positioned in one of customizable regions of FIG. 25.

In one embodiment, the predefined of options for regions 552 and 554 include a vehicle speed screen layout, a vehicle rpm screen layout, a vehicle battery volt screen layout, a distance to empty screen layout, a gear indicator screen layout, an engine status screen layout, a fuel level screen layout, a connectivity screen layout, a tire pressure screen layout, and a vehicle accessory screen layout. FIG. 28 illustrates the selection of a distance to empty screen layout 566 for region 552. FIG. 27 illustrates a selection screen layout 568 for one of regions 552 and 554. An operator selects region 552 through the touch screen of display 280 and sub-menu 570 is presented on display 280. The operator then selects through the touch screen of display 280 the desired screen layout. The selected options are stored in memory 158 of instrument cluster 300.

Returning to FIGS. 9-11, the first riding screen layout 571 (FIG. 9) includes first trip option screen layout 350 for first region 342 and map/navigation screen layout 540 for second region 344, the second riding screen layout 573 (FIG. 10) includes first exemplary audio screen layout 474 for first region 342 and a custom image screen layout 576 for second region 344, and the third riding screen layout 575 (FIG. 11) includes first exemplary screen layout 380 for first region 342 and first exemplary vehicle status screen layout 440 for second region 344. The custom image screen layout 576 displays either a present image stored in memory 158 or a user supplied image which is also stored in memory 158. An operator can sequentially cycle through the three riding screens 571, 573, 575 presented in FIGS. 9-11 by repeatably selecting riding screen input button 302 of instrument cluster 300.

Figure 12:
FIG. 12 is an exemplary audio screen layout for a display of the user interface system of FIG. 8.

Referring to FIG. 12, an audio screen layout 580 for display 280 of instrument cluster 300 is shown. Audio screen layout 580 is presented on display 280 when the operator selects audio selection input button 304 of instrument cluster 300. Audio screen layout 580 includes an audio source selection input 582 wherein the operator may select between an FM band, an AM band, a weather source, an audio source from a Bluetooth connected device, and an audio source from a USB connected device. Audio screen layout 580 further includes a volume down input 584, a volume up input 586, and a mute input 588. Further, audio screen layout 580 includes a plurality of favorites 590 listed across a bottom portion of audio screen layout 580. Additional favorites may be displayed through selection input 592 of audio screen layout 580. Audio screen layout 580 further presents a genre selection input 594 and a discovery input 596. By selecting a specific genre through input 594 and selecting discovery input 596, the controller of vehicle 200 scans the FM frequency band to discover radio stations matching the selected genre. In this way, an operator of vehicle 200 can populate their presets with stations corresponding to a desired genre when they are located outside of their home traveling area.

Figure 13:
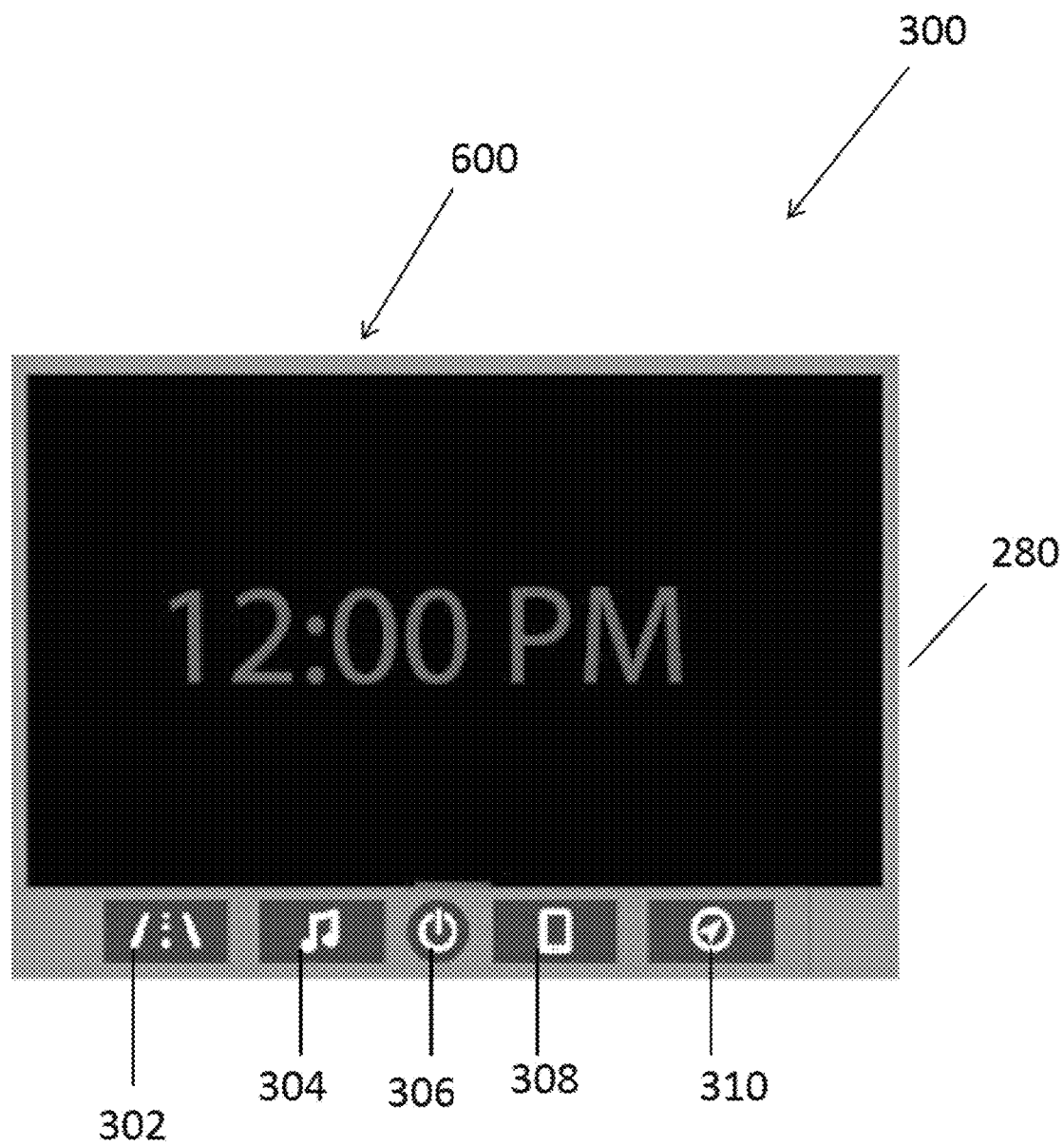
FIG. 13 is an exemplary power off screen layout for a display of the user interface system of FIG. 8.

Referring to FIG. 13, a power off screen layout 600 for display 280 of instrument cluster 300 is illustrated. Power off screen layout 600 is displayed in response to an operator selecting power button 306 of instrument cluster 300. A selection of power button 306 for a first duration results in power off screen layout 600 being displayed. Additionally, a selection of power button 306 for a second, longer duration results in display 280 being turned off (i.e., a black screen) however audio may be still be played or otherwise distributed to the user. This allows a user to turn off display 280, for example at night to avoid glare, while still allowing the user to have music, phone, or other audio input. Also, a selection of power button 306 for a third and still longer duration results in display 280 of instrument cluster 300 being completely turned off, including both display 280 and all audio input. In this way, power off screen layout 600 allows the operator to have three different power off options. Further, as illustrated in FIG. 13, power off screen layout 600 includes an indication of the current time.

Figure 14:
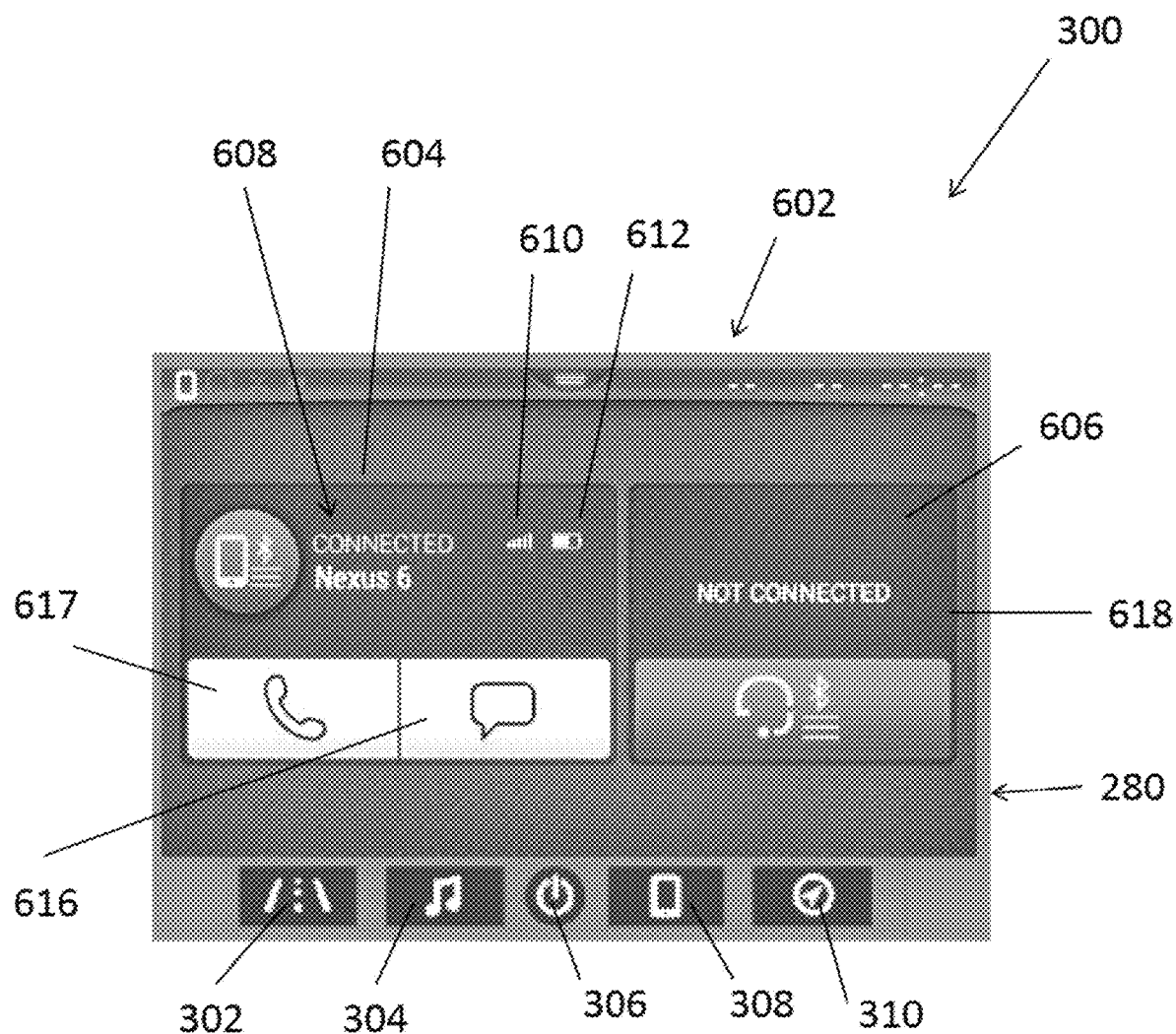
FIG. 14 is an exemplary connectivity screen layout for a display of the user interface system of FIG. 8.

Referring to FIG. 14, an exemplary connectivity screen layout 602 is shown. Connectivity screen layout 602 includes a first region 604 and a second region 606. First region 604 includes a driver portable communication device connection status indicator 608 for the driver portable communication device 190, a signal strength indicator 610 for driver portable communication device 190, a battery life indicator 612 for driver portable communication device 190, a place call selection input 614, and a compose text message input 616. The place call input 614 sends instructions to driver portable communication device 190 requesting that a call be placed. In a similar fashion, selection of compose text message input 616 sends a request to driver portable communication device 190 to begin a new text message. Second region 606 provides a driver audio interface connection status identifier 618 for driver audio interface device 192. In one embodiment, connectivity screen layout 602 further includes indicators for passenger portable communication device 194 and passenger audio interface device 196. It will be understood by one of skill in the art that the values reported in the indicators for regions 604 and 606 are received from the respective driver portable communication device 190 and driver audio interface device 192 by one or more controllers of vehicle 200.

Figure 15:
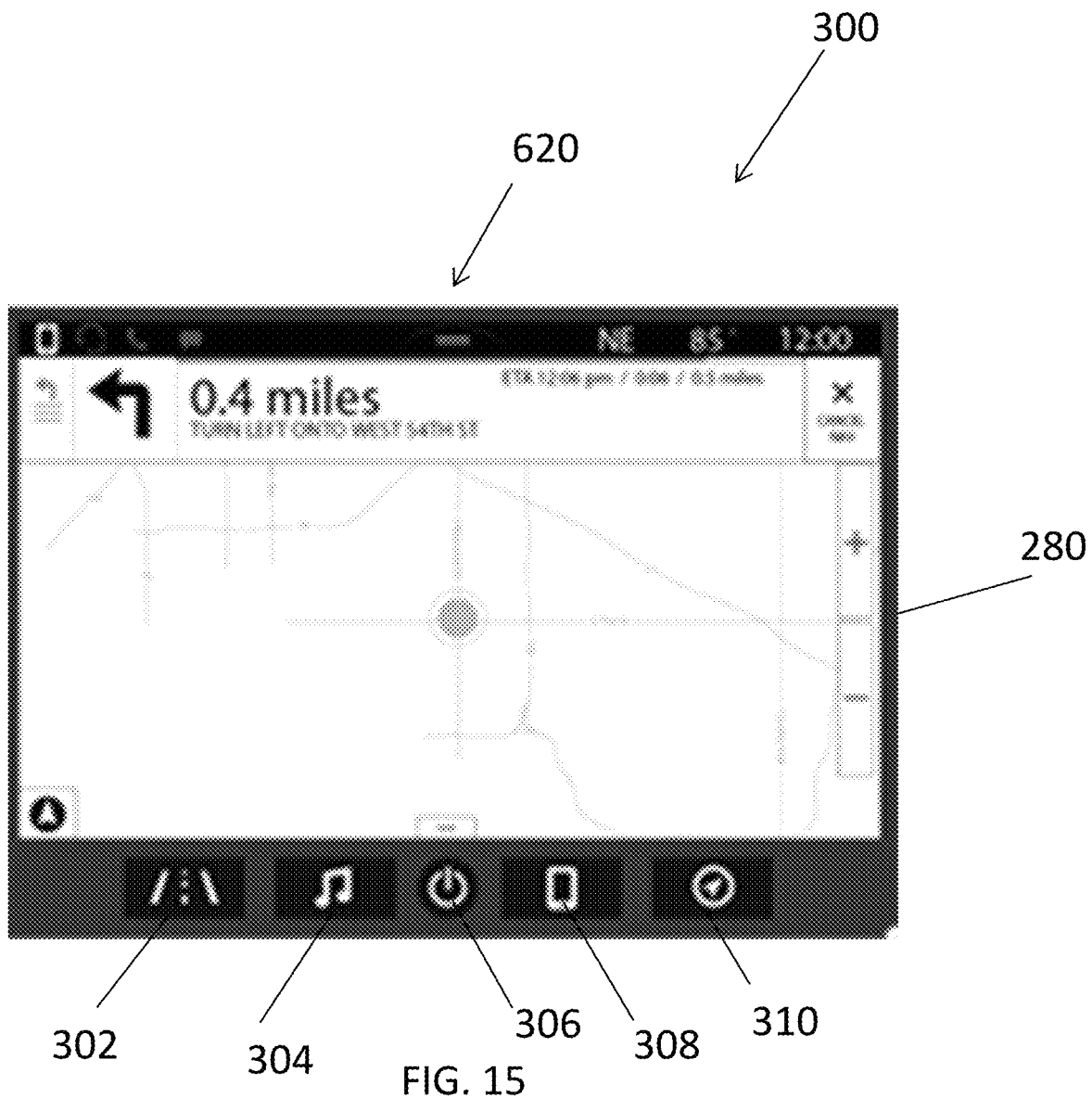
FIG. 15 is an exemplary maps/navigation screen layout for a display of the user interface system of FIG. 8.

Referring to FIG. 15, an exemplary map/navigation screen layout 620 for display 280 of instrument cluster 300 is shown. The map/navigation screen layout is presented on display 280 in response to the user selecting navigation button 310 of instrument cluster 300. Through the map/navigation screen layout 620, an operator may be provided turn by turn navigation instructions, point of interest and address lookup functionality, and pinch to zoom functionality.

In addition to being able to navigate between first riding screen layout 571, second riding screen layout 573, third riding screen layout 575, audio screen layout 580, connectivity screen layout 602, and map/navigation screen layout 620 through the use of riding screen input button 302, audio selection input button 304, connectivity button 308, and navigation button 310, an operator of motorcycle 200 may further cycle through the screens through inputs provided as part of second portion 274 of user interface assembly 270 and/or third portion 276 of user interface assembly 270.

Figure 30:
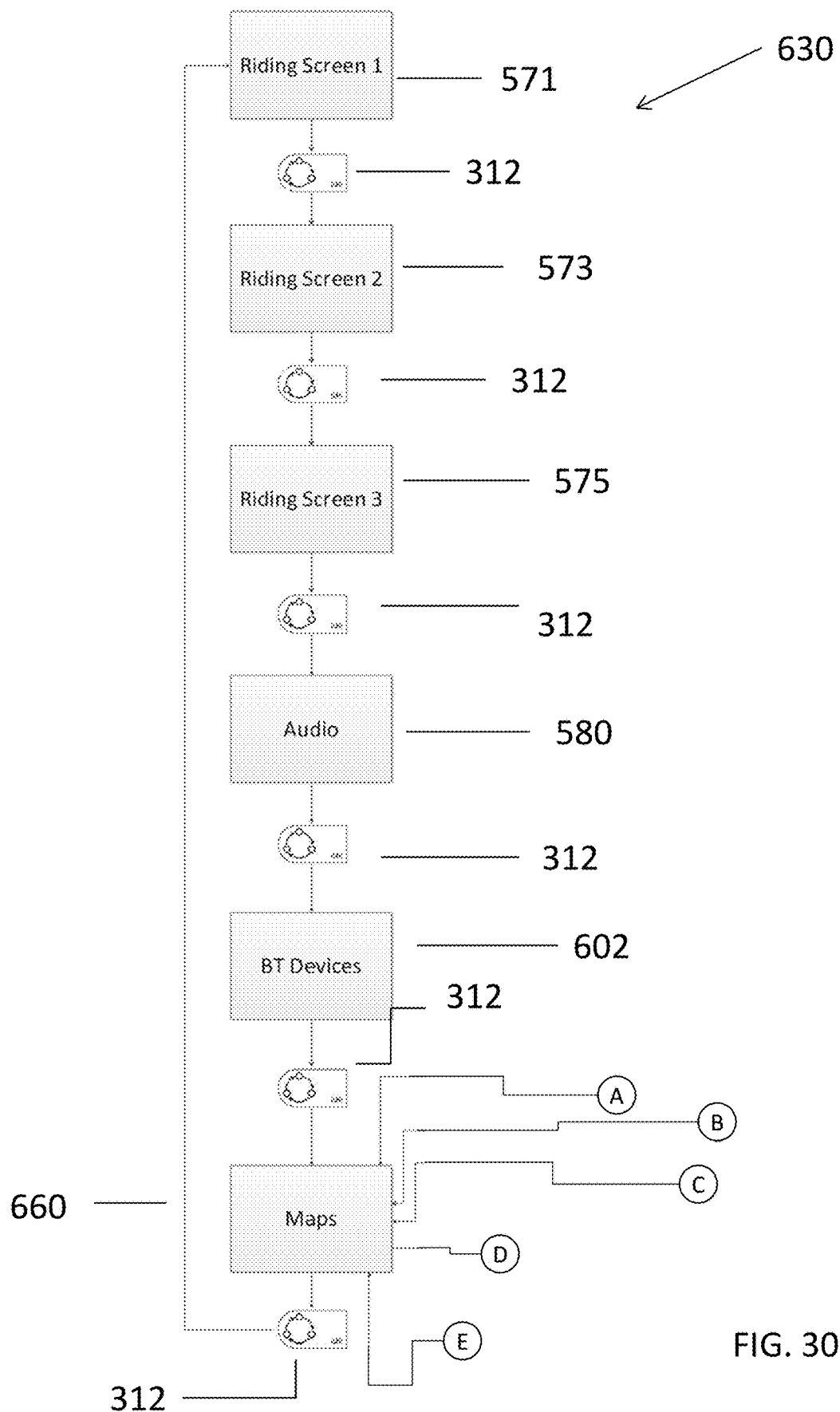
FIG. 30 is an exemplary cycling sequence stored on a non-transitory computer readable media accessible by the controller associated with the user interface system of FIG. 8.

Referring to FIG. 30, an exemplary processing sequence of one or more of the controllers of vehicle 200 is shown. As indicated in FIG. 30, an operator of vehicle 200 may cycle through sequentially first riding screen layout 571, second riding screen layout 573, third riding screen layout 575, audio screen layout 580, connectivity screen layout 602, and map/navigation screen layout 620 by repeatedly selecting left-hand trigger input button 312 of second portion 274 of user interface assembly 270. In this manner an operator may view each screen without having to remove his or her hands from handlebar 256. It is of further note that with this arrangement motorcycle 200 does not include a home screen but rather provides easy navigation between a plurality of different screen layouts. In one embodiment, connectivity screen layout 602 may be omitted.

Figure 31:
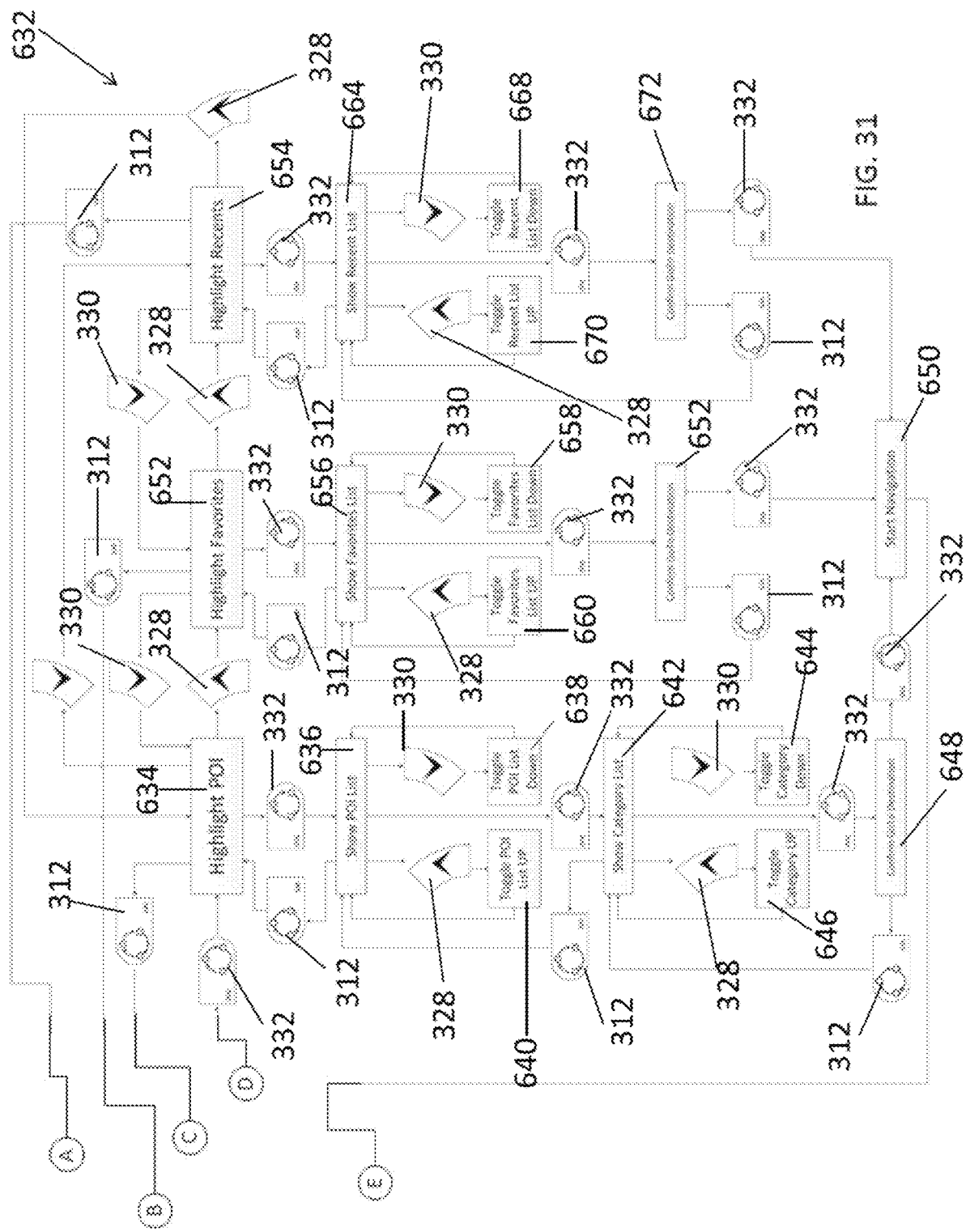
FIG. 31 is an exemplary navigation sequence relative to a map screen layout stored on a non-transitory computer readable media accessible by the controller associated with the user interface system of FIG. 8.

When map/navigation screen layout 620 is presented on display 280, an operator of motorcycle 200 may select other features of map/navigation screen layout 620 as detailed in the processing sequence 632 illustrated in FIG. 31. The operator of vehicle 200 enters the sub-features of map/navigation screen layout 620 through actuation of right-hand trigger input button 332 of third portion 276. Upon actuation of right-hand trigger input button 332, the point of interest input is highlighted as represented by block 634. By actuating right-hand trigger input button 332 a second time, a point of interest listing is displayed as represented by block 636, such as gas stations, restaurants, campgrounds, etc. The points of interest option also may allow an operator to identify favorite points of interests and may store those locations by name, geographic information (e.g., geographic coordinates), or any other identifying information for easy access to the operator when searching for a favorite point of interest. An operator may toggle down the point of interest list through the actuation of toggle input 330 as indicated by block 638 or toggle up the point of interest list through the actuation of toggle input 328 as indicated by block 640. Alternatively, an operator may return to the main map screen to the highlighted points of interest input through actuation of left-hand trigger input button 312 or bring up a category listing through actuation of right-hand trigger input button 332 as represented by block 642. Once a category listing is displayed, an operator may toggle down categories through actuation of toggle down input 330 as represented by block 644 and toggle up the category listing through actuation of toggle up input 328 as represented by block 646. Alternatively, an operator may select a destination through actuation of input 332 as represented by block 648. A further actuation of input 332 results in navigation instructions to be initiated as represented by block 650. The navigation instructions provide one or more of audio and visual cues to direct an operator of vehicle 200 to the destination based on a current location of vehicle 200. Alternatively, an operator may return to the category listing through actuation of input 312.

Returning to block 634, an operator may select to return to map/navigation screen layout 620 through actuation of left-hand trigger input button 312 or to advance to highlighting a favorites listing through the selection of toggle up input 328 as represented by block 652. In one embodiment the favorites include user selected destinations that are stored in memory associated with one or more controllers of vehicle 200. From block 652 an operator can return to block 634 through an actuation of toggle down input 330, return to map/navigation screen layout 620 through an actuation of left-hand trigger input button 312, or advance to highlight a recent destinations option through actuation of toggle up input 328 as represented by block 654. In one embodiment the recent destinations option includes destinations that vehicle 200 has recently visited. From block 654 an operator can advance to block 634 through an actuation of toggle up input 328, return to block 352 through an actuation of toggle down input 330, or return to map/navigation screen layout 620 through an actuation of left-hand trigger input button 312. Returning to block 652, a user may choose to display a favorites list through the actuation of right-hand trigger input button 332 as represented by block 656. A user may toggle down the list of favorites through an actuation of toggle down input 330 as represented in block 658 or toggle up the list of favorites through an actuation of input 328 as represented by block 660. Alternatively, a user can return to block 652 through actuation of left-hand trigger input button 312 or select a highlighted favorite through the actuation of right-hand trigger input button 332 as represented by block 662. From block 662 an operator may return to the favorites listing through the actuation of left-hand trigger input button 312 or begin navigation to the selected destination through actuation of right-hand trigger input button 332.

Returning to block 654, an operator may elect to display a listing of recent destinations through the actuation of right-hand trigger input button 332 as represented by block 664. An operator may toggle down a listing of recent destinations through the actuation of input 330 as represented by block 668 or toggle up a listing of recent destinations through the actuation of input 328 as represented by block 670. Alternatively, an operator may return to block 654 through the actuation of input 312 or select a recent destination through the actuation of right-hand trigger input button 332 as represented by block 672. The operator can select to begin navigation through the actuation of right-hand trigger input button 332 or return to the listing of recent destinations through the actuation of input 312. Once navigation has been selected as represented by block 650, display 280 returns to map/navigation screen layout 620 to provide updates on the location of vehicle 200 and instructions to the selected destination.

It may be appreciated that the user can toggle through information on display 280 by actuating input buttons 312, 332 in a predetermined manner. For example, the user may depress or otherwise actuate input button 312 and/or input button 332 one or more times (e.g., at least two times) to toggle through information or options shown on display 280. Alternatively, the user may press and hold input button 312 and/or input button 332 for a predetermined length of time to also effect a change on display 280 (e.g., to toggle through information on display 280). In one embodiment, pressing and holding input button 312 and/or input button 332 for a predetermined length of time may be defined as multiple inputs or actuations on inputs 312, 332. For example, pressing and holding input button 312 for a first time period may be considered a first actuation and holding for a second time period may be considered a second actuation, the second time period being longer than the first time period.

Figure 32:
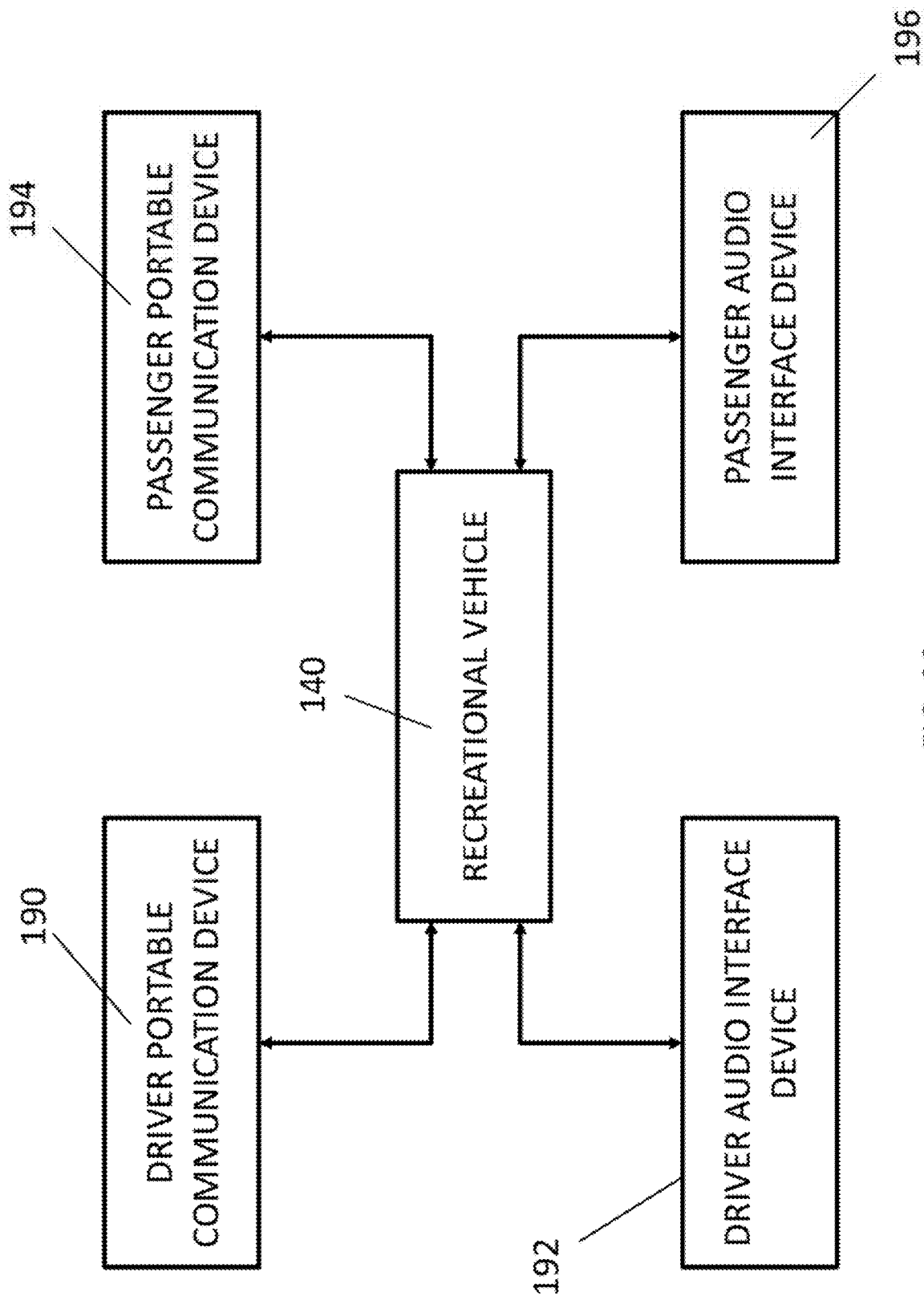
FIG. 32 is a representative view of the connectivity arrangement of the vehicle of FIG. 2.

Referring to FIG. 32, a representation of motorcycle 200, driver portable communication device 190, driver audio interface device 192, passenger portable communication device 194, and passenger audio interface device 196. Driver portable communication device 190, driver audio interface device 192, passenger portable communication device 194, and passenger audio interface device 196 may be connected to motorcycle 200 through one or more wired connections or through one or more wireless connections. Each of driver audio interface device 192 and passenger audio interface device 196 includes at least one microphone and at least one speaker. Exemplary wired connections include through one or more USB inputs on motorcycle 200. Exemplary wireless connections include through a BLUETOOTH protocol over a radio frequency network. In one embodiment, each of driver portable communication device 190, driver audio interface device 192, passenger portable communication device 194, and passenger audio interface device 196 are paired with motorcycle 200 through a BLUETOOTH protocol over a radio frequency network. In one embodiment, vehicle controller 140 of motorcycle 200 is configured to communicate with at least three of driver portable communication device 190, driver audio interface device 192, passenger portable communication device 194, and 196 through a wireless network. In one embodiment, vehicle controller 140 of motorcycle 200 is configured to communicate with each of driver portable communication device 190, driver audio interface device 192, passenger portable communication device 194, and 196 through a wireless network.

Figure 33:
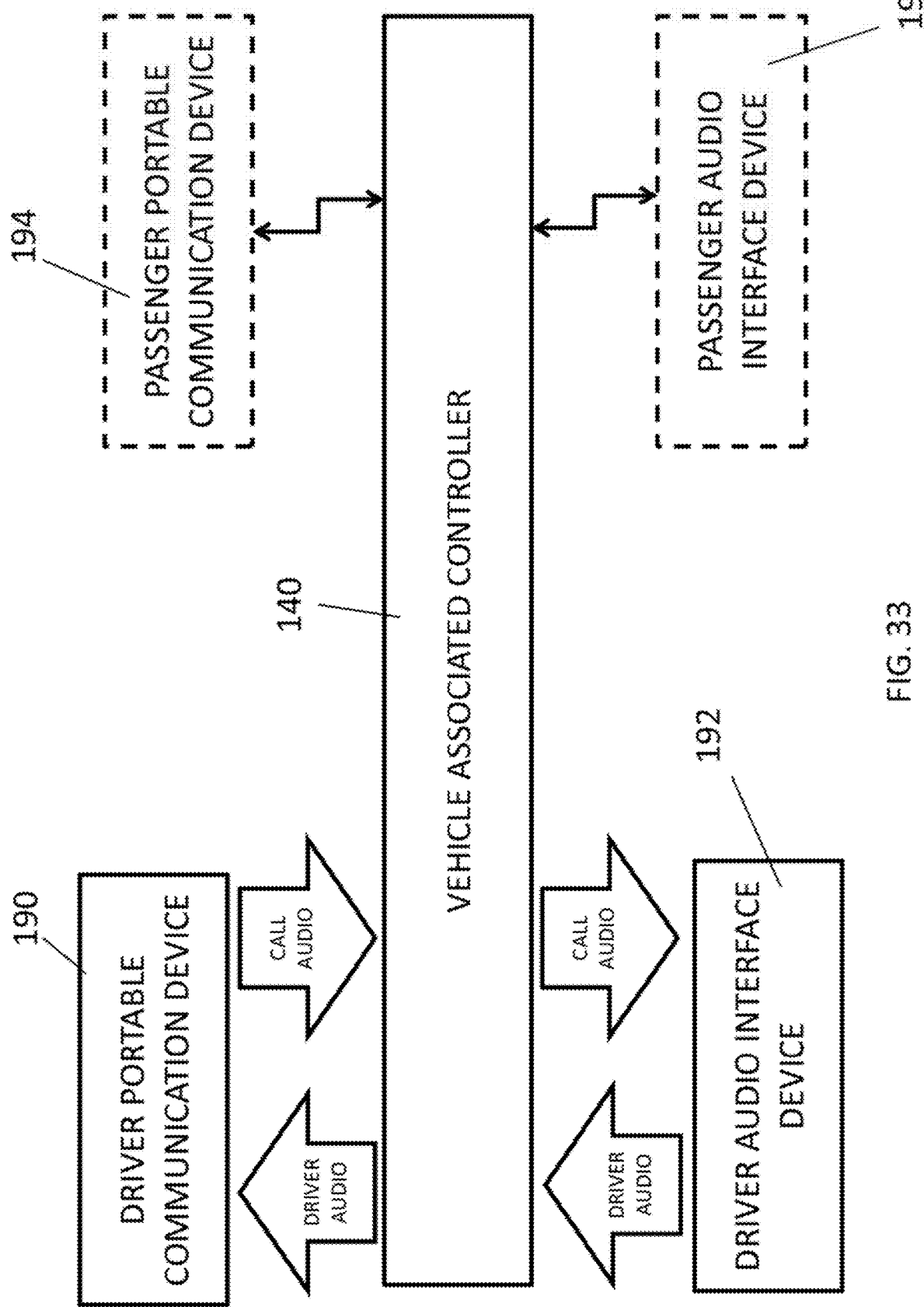
FIG. 33 is an audio flow representative view of the arrangement of FIG. 32 illustrating the passing of audio information between a driver portable communication device and a driver audio interface device through a controller of the vehicle.
Figure 34:
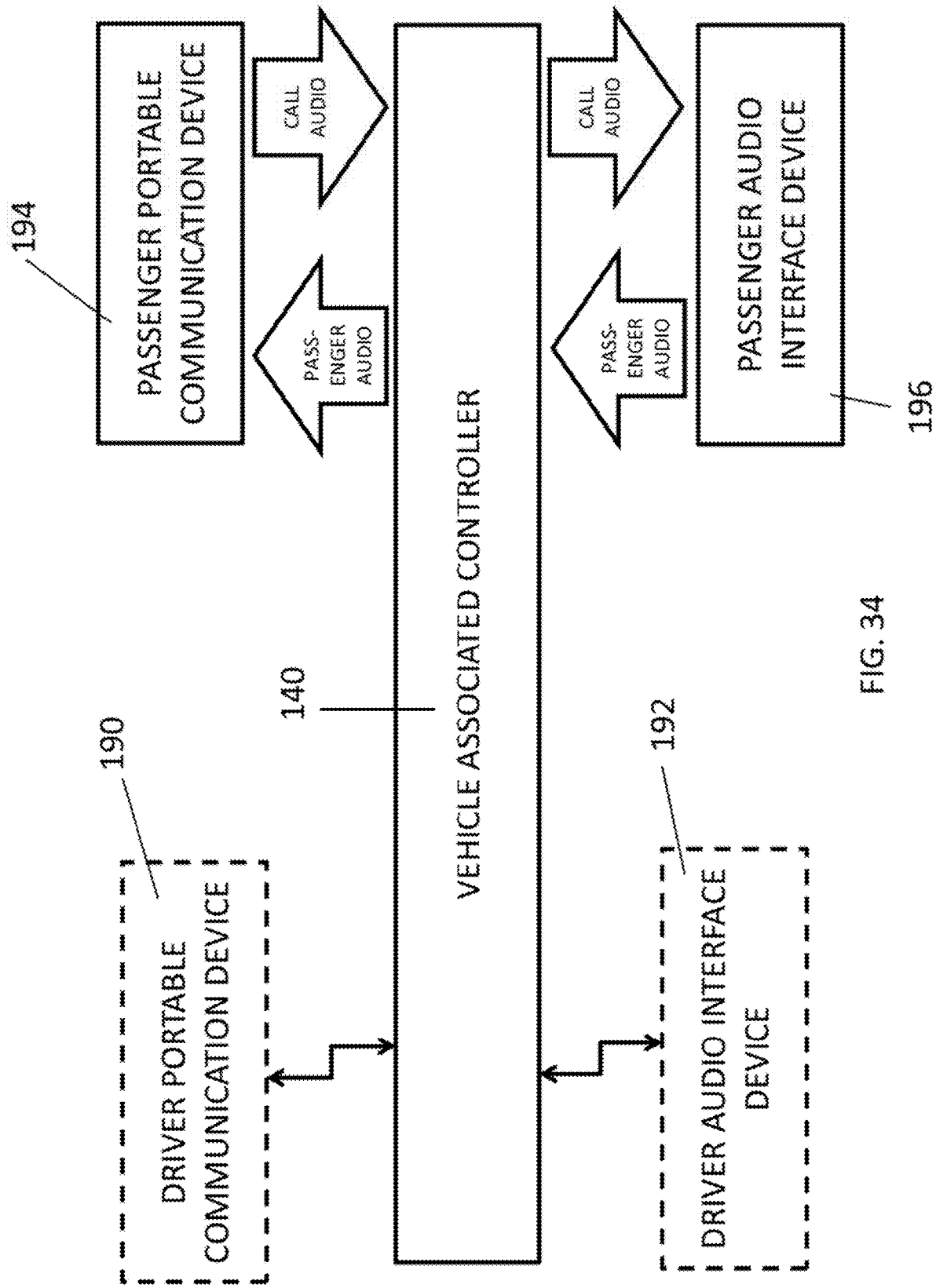
FIG. 34 is an audio flow representative view of the arrangement of FIG. 32 illustrating the passing of audio information between a passenger portable communication device and a passenger audio interface device through a controller of the vehicle.

Referring to FIG. 33, vehicle controller 140 is configured to communicate with each of driver portable communication device 190, driver audio interface device 192, passenger portable communication device 194, and passenger audio interface device 196 through a wireless network. When a call is either initiated by driver portable communication device 190 or received by driver portable communication device 190, vehicle controller 140 routes the audio information received from driver portable communication device 190 to driver audio interface device 192 through motorcycle 200 and the audio information received from driver audio interface device 192 to driver portable communication device 190 through motorcycle 200. The audio information is not routed to either of passenger portable communication device 194 or passenger audio interface device 196. Referring to FIG. 34, when a call is either initiated by passenger portable communication device 194 or received by passenger portable communication device 194, vehicle controller 140 routes the audio information received from passenger portable communication device 194 to passenger audio interface device 196 through motorcycle 200 and the audio information received from passenger audio interface device 196 to passenger portable communication device 194 through motorcycle 200. The audio information is not routed to either of driver portable communication device 190 or driver audio interface device 192.

Figure 35:
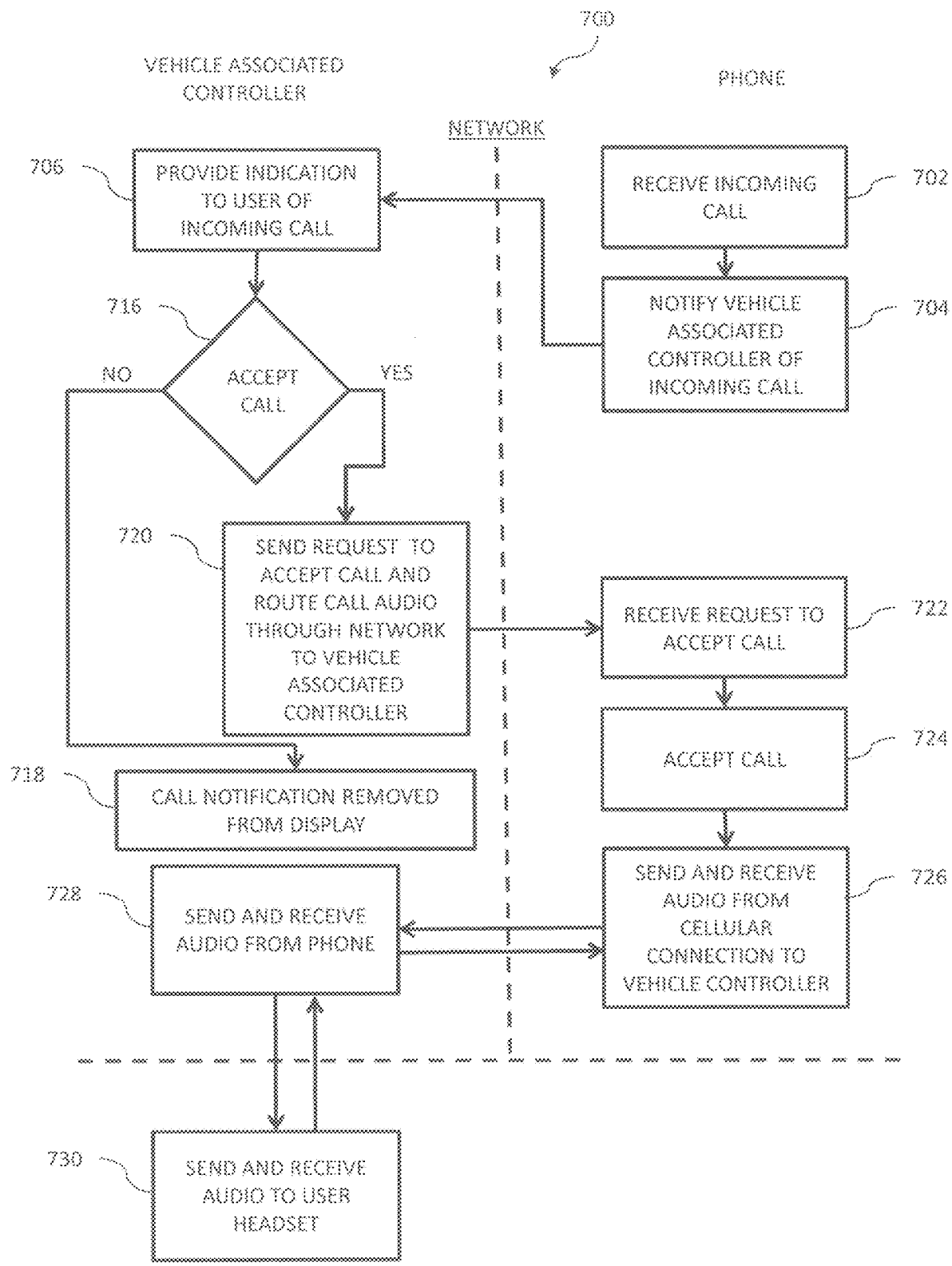
FIG. 35 is an exemplary sequence stored on a non-transitory computer readable media accessible by the controller associated with the user interface system of FIG. 8 for routing audio information from an incoming call.

Referring to FIG. 35, an exemplary processing sequence 700 is illustrated for handling an incoming call by vehicle associated controller 140. The processing sequence 700 will be described with reference to driver portable communication device 190 and driver audio interface device 192 although it is equally applicable to passenger portable communication device 194 and passenger audio interface device 196. Driver portable communication device 190 receives an incoming call as represented by block 702. Driver portable communication device 190 then notifies vehicle controller 140 of the incoming call as represented by block 704. Vehicle controller 140 provides an indication to the user of the incoming call as represented by block 706. Exemplary indications of the incoming call include audio indicators, visual indicators, and tactile indicators.

Figure 36:
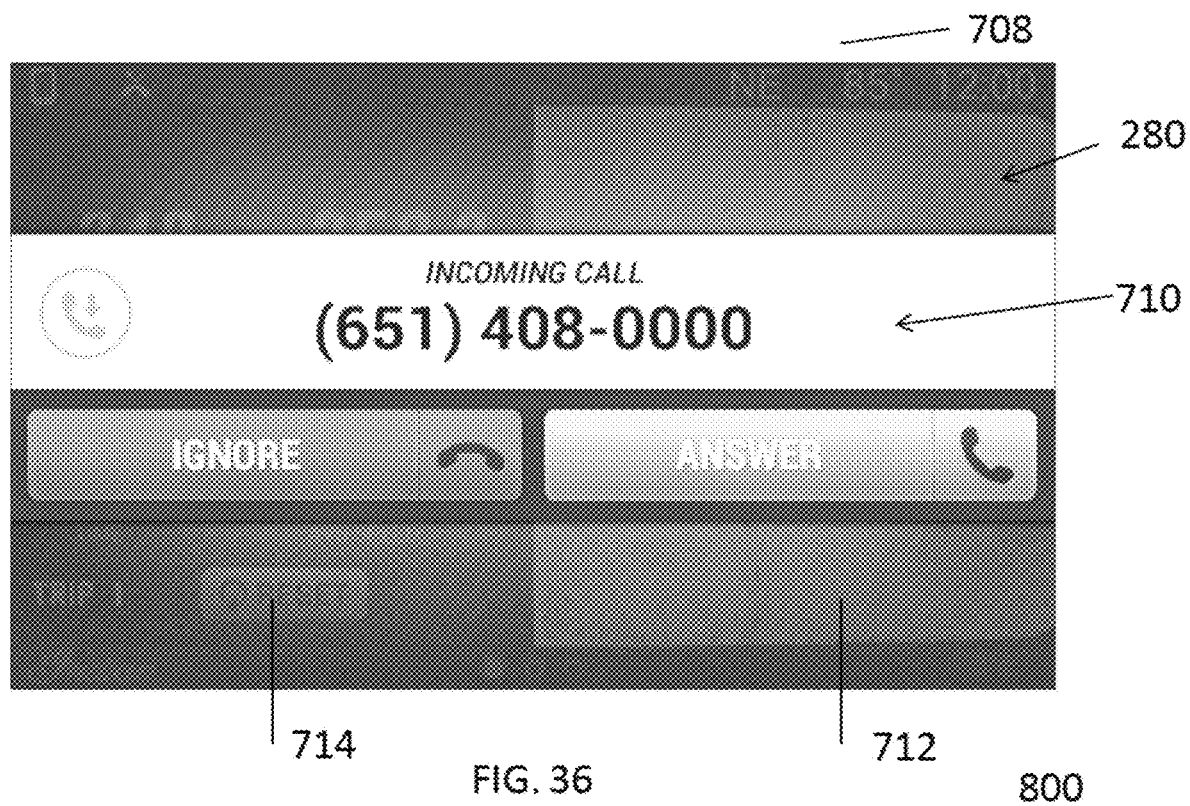
FIG. 36 is an exemplary notification screen layout for a display of user interface system of FIG. 8 for an incoming call.

Referring to FIG. 36, an exemplary visual indicator 708 which is displayed on display 280 is shown. Indicator 708 provides information 710 regarding the incoming call, an answer input 712 to accept incoming call, and an ignore input 714 to deny the incoming call. In one embodiment, an operator may provide either an answer indication or ignore indication through driver audio interface device 192 as a verbal command.

Returning to FIG. 35, a decision is made by the operator to either accept the call or ignore the call as represented by block 716. If the call is not accepted, the call notification indicator 708 is removed from first display 280 as represented by block 718. If the call is accepted, vehicle controller 140 sends a request to accept the call to driver portable communication device 190 and through call audio to the vehicle associated controller as represented by block 720. Driver portable communication device 190 receives the request to accept the call as represented by block 722. Driver portable communication device 190 accepts the call as represented by block 724. Driver portable communication device 190 sends and receives audio information from its cellular connection to vehicle controller 140 as represented by block 726. Vehicle controller 140 sends and receives audio to and from driver portable communication device 190 through the Bluetooth wireless network as represented by block 728. vehicle controller 140 also sends and receives audio from the driver audio interface device 192 as represented by block 730.

Figure 39:
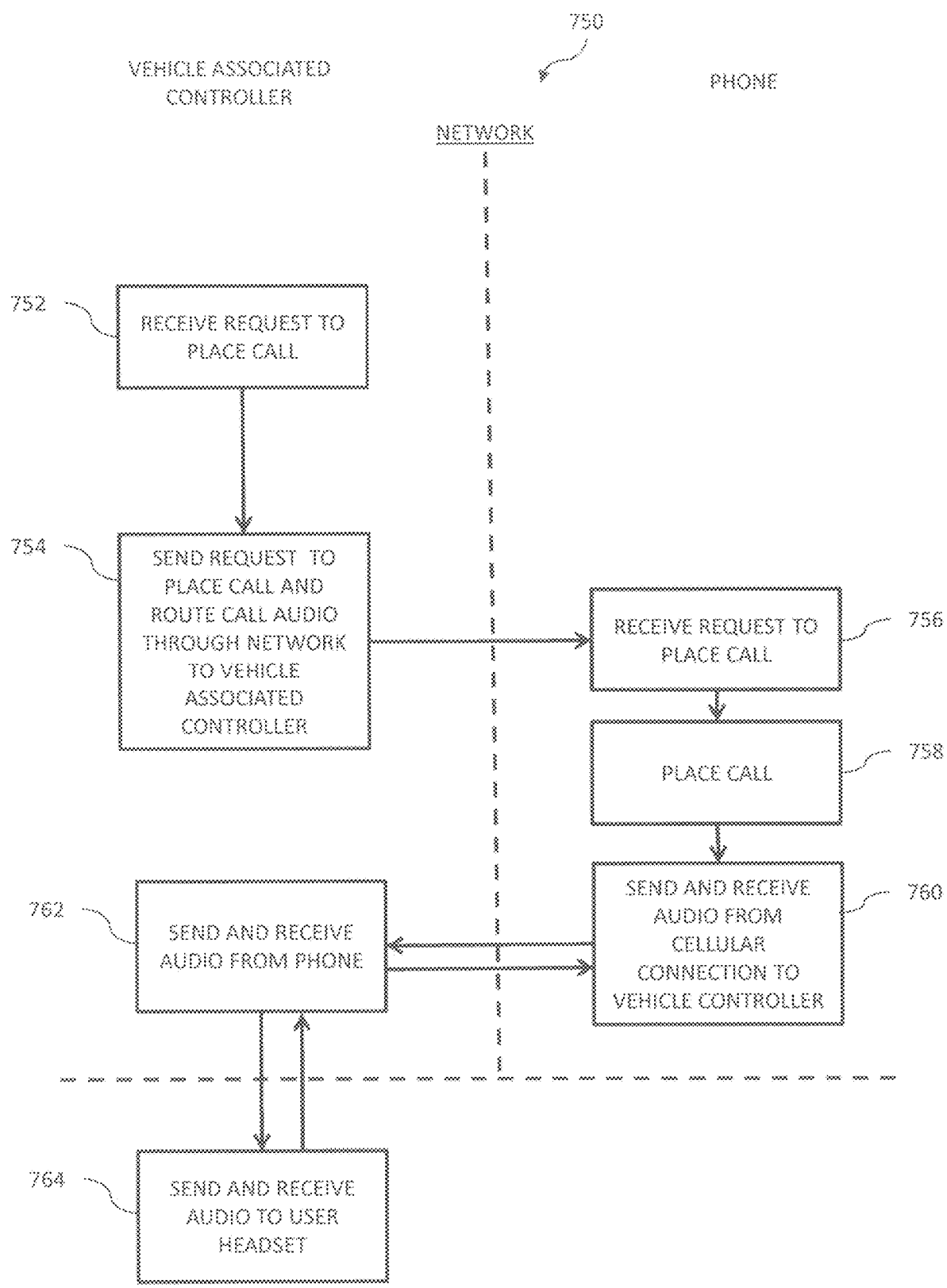
FIG. 39 is an exemplary sequence stored on a non-transitory computer readable media accessible by the controller associated with the user interface system of FIG. 8 for routing audio information from a placed call.

Referring FIG. 39, an exemplary processing sequence 750 for vehicle controller 140 is shown. Processing sequence 750 details how to place a call with driver portable communication device 190. The processing sequence 750 will be described with reference to driver portable communication device 190 and driver audio interface device 192 although it is equally applicable to passenger portable communication device 194 and passenger audio interface device 196. Vehicle controller 140 receives a request to place a call as represented by block 752. In one embodiment, the request to place a call is received through first display 280. In one embodiment, the request to place a call is a voice command received from driver audio interface device 192. Vehicle controller 140 sends a request to place a call to driver portable communication device 190 and a request to route audio back to vehicle controller 140 as represented by block 754. Driver portable communication device 190 receives the request to place the call as represented by block 756. Driver portable communication device 190 places the call as represented by block 758. Driver portable communication device 190 sends and receives audio from its cellular connection to vehicle controller 140 as represented by block 760. Vehicle controller 140 sends and receives audio from driver portable communication device 190 through the BLUETOOTH wireless network as represented by block 762. Further, vehicle controller 140 sends and receives audio to driver audio interface device 192 through the BLUETOOTH network as represented by block 764.

Figure 38:
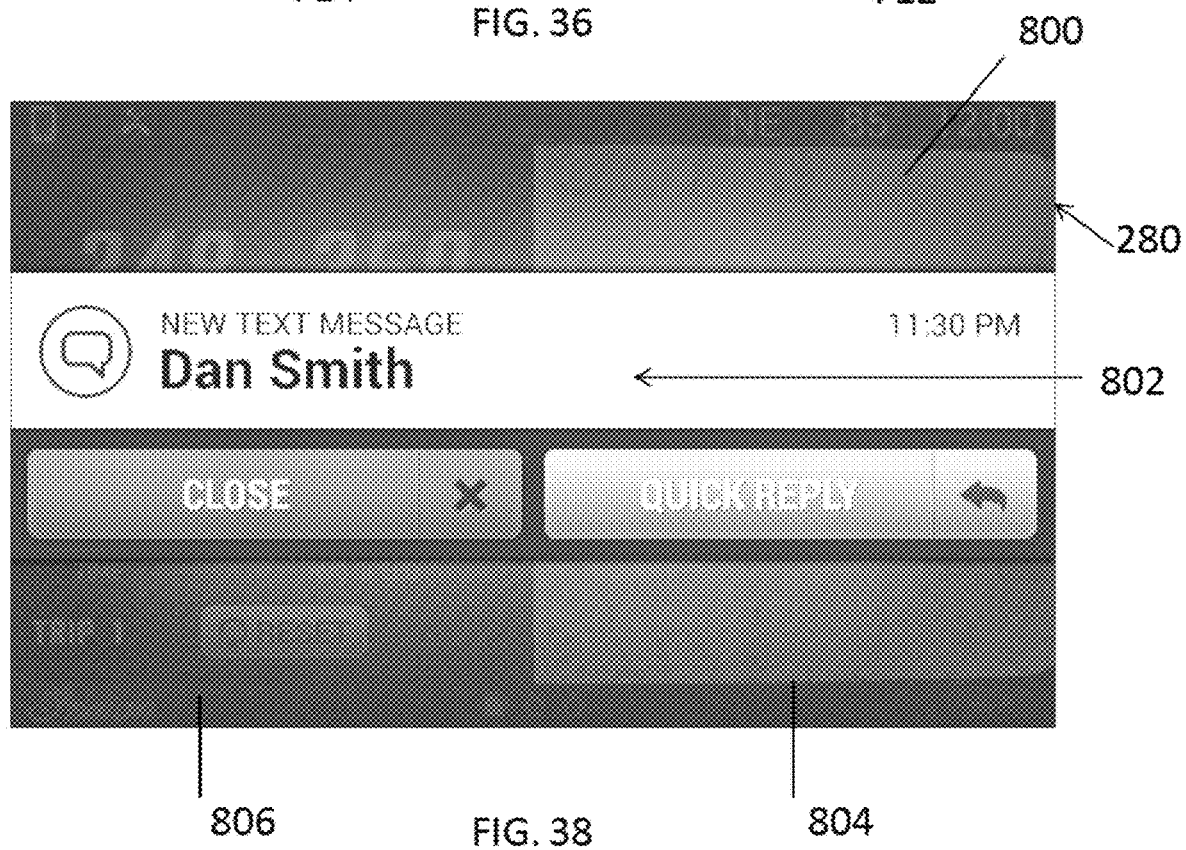
FIG. 38 is an exemplary notification screen layout for a display of user interface system of FIG. 8 for an incoming text.

Referring to FIG. 38, an incoming text notification indicator 800 is shown on display 280. Incoming text notification indicator 800 provides information regarding the sender of the text and information 802 of the sender of the text. The operator may select either a quick reply input 804 or a close input 806 provided on display 280.

Figure 37:
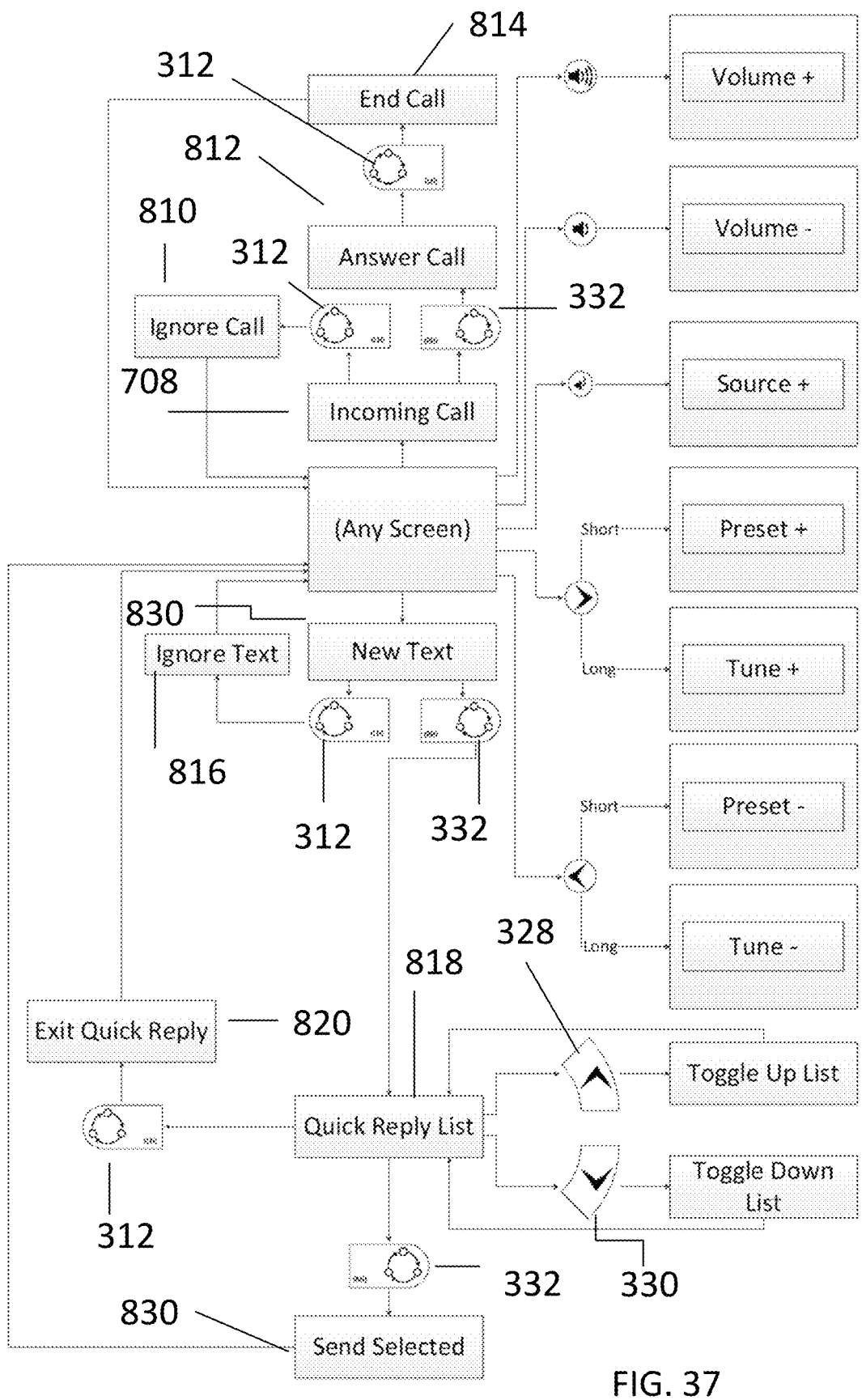
FIG. 37 is an exemplary sequence stored on a non-transitory computer readable media accessible by the controller associated with the user interface system of FIG. 8 for options regarding an incoming call or an incoming text.

As can be seen from FIGS. 36 and 38, exemplary visual indicator 708 and incoming text notification indicator 800 are overlaid over the then currently displayed screen layout of display 280. Referring to FIG. 37, exemplary visual indicator 708 and incoming text notification indicator 800 are displayed regardless of which screen is being shown on display 280. In addition to selecting either answer input 712 or ignore input 714 for call indicator 708 or quick reply input 804 or close input 806 for incoming text notification indicator 800, an operator can utilize the inputs provided in second portion 274 of user interface assembly 270 and third portion 276 of user interface assembly 270. In response to exemplary visual indicator 708, an operator may choose to ignore the call as represented by block 810 by actuating left-hand trigger input button 312 or to answer the call as represented by block 812 through the actuation of right-hand trigger input button 332. If the call has been answered, the operator may end the call as represented by block 814 through the actuation of input 312. In the case of incoming text notification indicator 800 being displayed on first display 280, an operator may select to ignore the text as represented by block 816 through the actuation of input 312 or to activate the quick reply list as represented by block 818 through the actuation of input 332. The operator may exit the quick reply list as represented by block 820 through the actuation of left-hand trigger input button 312. Further, an operator may toggle up the quick reply list as represented by block 822 through actuation of input 328 or toggle down the quick reply list as represented by block 824 through the actuation of input 330. In addition, once an appropriate reply has been selected, the operator may select to send the selected reply as represented by block 830 through the actuation of right-hand trigger input button 332.

Figure 40:
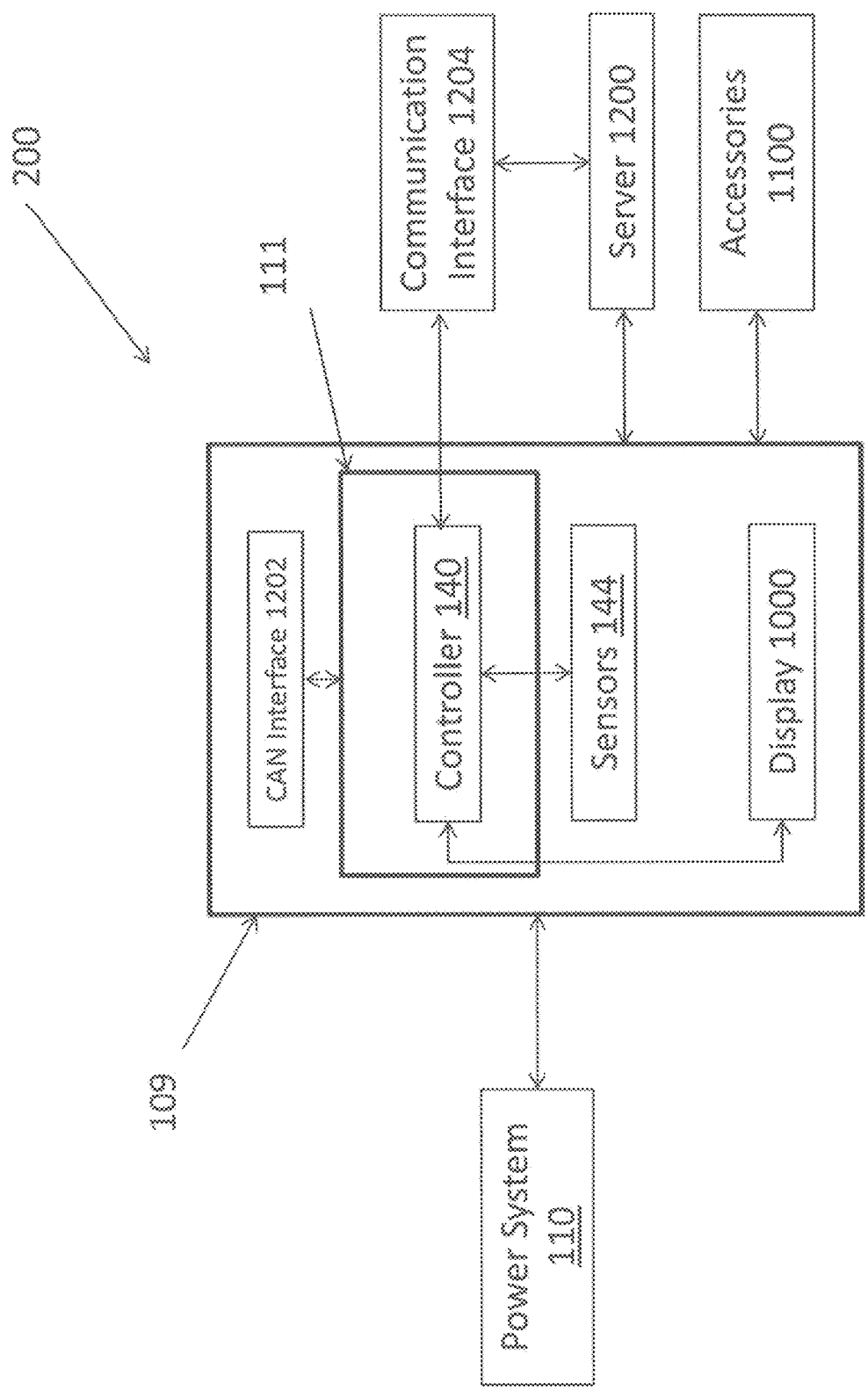
FIG. 40 is a schematic view of the vehicle of FIG. 1.

Referring to FIG. 40, vehicle 200 includes power system 110, electrical system 109, a plurality of accessories 1100, and sensors 144. Electrical system 109 may be electrically coupled to a server system 1200 to store and/or access various information for vehicle 200. Server system 1200 is also accessible via a plurality of other computing devices, such as a mobile device (e.g., a mobile phone or tablet device) and/or a computing device having a web browser installed thereon. Server system 1200, electrical system 109, and any component of vehicle 200 or component or accessory belonging to a user or passenger may be operatively coupled together via any wired or wireless communication system, mechanism, or process, such as through wifi communication, Bluetooth®, cellular system, satellite systems, etc. A plurality of third-party data services may be integrated with the information delivered to an operator of vehicle 200 and owner of the mobile or computer devices. The data services, provided by a data provider, allow for integration of a variety of types of data in a user interface coordinated by server system 1200. In the embodiment shown, the data providers may include a map data provider, a weather data provider, a GIS data provider, and a trail condition data provider. The various data providers are communicatively interconnected with server system 1200 via a network, such as the Internet. Additionally, such a network is used by users of the mobile or computing devices for communicative interconnection to server system 1200, as disclosed in International Patent Application No. PCT/US2014/018638, filed on Feb. 26, 2014, entitled "RECREATIONAL VEHICLE INTERACTIVE TELEMETRY, MAPPING, AND TRIP PLANNING SYSTEM", the complete disclosure of which is expressly incorporated by reference herein.

In one embodiment, as shown in FIG. 40, electrical system 109 includes a controller area network ("CAN") interface 1202 electrically coupled to vehicle control unit ("VCU") 111 which comprises at least an alternative embodiment display 1000, at least one controller 140, and a plurality of sensors 144, such as temperature sensors, speed sensors, pressure sensors, and any other sensor configured to determine a parameter of any component of vehicle 200. As shown in FIG. 40, controller 140 is operably coupled to power system 110, accessories 1100, and display 1000 to receive information from various components of vehicle 200 and transmit information about such components to display 1000 for the operator's review. For example, controller 140 also is coupled to a communication interface 1204 which may a cellular or satellite communication interface connectable to server system 1200. Illustrative display 1000 is configured to provide various data or information about the operating conditions of vehicle 200, ambient conditions, infotainment (e.g., radio), vehicle location via a global positioning system ("GPS") antenna, wireless connectivity, and/or any other information that may be useful to the operator during operation of vehicle 200.

Figure 41:
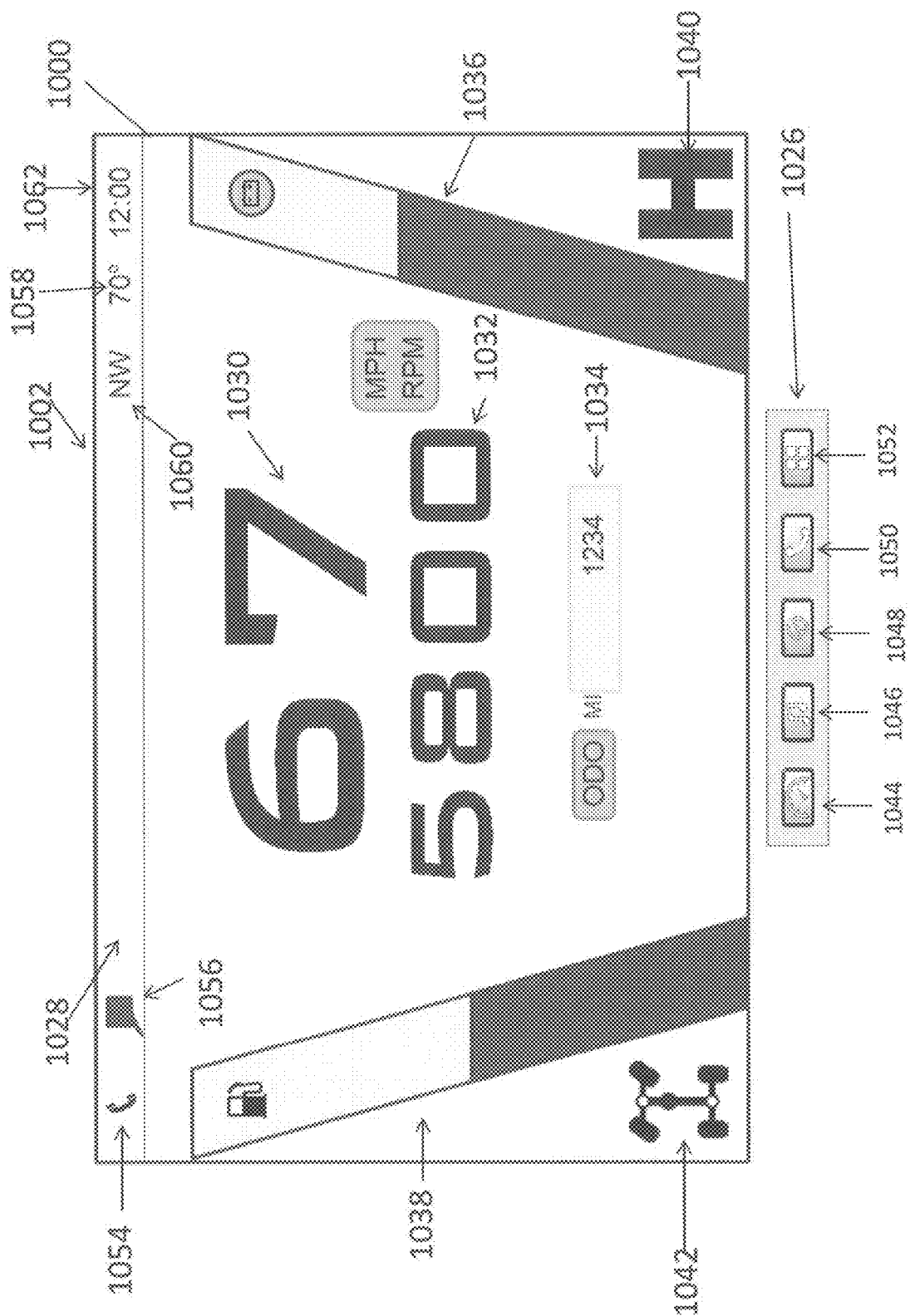
FIG. 41 is an illustrative embodiment of a home screen for an alternative embodiment display for the vehicle of FIG. 1.

In one embodiment, as shown in FIG. 8, display 1000 may be supported on vehicle 200 like display 280 and is positioned longitudinally forward of the operator during operation of vehicle 200, as disclosed in U.S. patent application Ser. No. 14/985,673, filed Dec. 31, 2015, titled "TWO-WHEELED VEHICLE," the complete disclosure of which is expressly incorporated by reference herein. An illustrative embodiment of display 1000 is shown in FIG. 41. Display 1000 may be a color, touch-screen display with a plurality of pixels configured to change in response to an operator input. For example, the operator may use his/her finger to select options on display 1000 and receive information about vehicle 200, ambient conditions, etc. Display 1000 may include a plurality of sensors, such as pressure sensors or capacitive sensors (not shown), to determine the presence of the operator's finger on display 1000. As such, display 1000 is configured to distinguish between the presence of mud, dirt, or debris thereon and the operator's finger such that only the operator's finger on display 1000 accesses the various information and options on display 1000. In one embodiment, the sensors for display 1000 allow touch operation of display 1000 whether the operator is wearing gloves or not.

Additionally, as shown in FIG. 41, display 1000, fairing 244, and/or handlebars 256 may support a plurality of inputs 1026 which also allows the operator to change the information presented on display 1000 and also access various features of vehicle 200 (e.g., a radio, GPS, Bluetooth®, a power input, and other infotainment options). Illustratively, inputs 1026 may define hard or push buttons positioned below display 1000 on fairing 244 (FIG. 8). Inputs 1026 may allow for quick access to specific information by touching inputs 1026 and also may allow the operator to toggle through various screens on display 1000. For example, as shown in FIG. 41, inputs 1026 may include a gauge input 1044 to allow the operator to immediately toggle between the various screens on display 1000, as disclosed herein, an infotainment input 1046 to allow the operator to quickly access music via the radio or other media and provide other entertainment options to the operator, a location input 1048 which allows the operator immediate access to GPS information and maps, as disclosed herein, a connectivity input 1050 to allow the operator to immediately access his/her phone or other communications device via CAN interface 1202, and a settings input 1052 to allow the operator to quickly access the various settings for display 1000 and vehicle 200.

Referring to FIG. 41, display 1000 is configured to display a plurality of screens with various information to the operator and allows the operator to change the output on display 1000 during operation of vehicle 200. In one embodiment, display 1000 includes a main or home screen 1002 which displays current information about the operation of vehicle 200. For example, home screen 1002 includes a plurality of areas configured to display information about vehicle speed, coolant or oil temperature, battery life or voltage, fuel quantity, transmission gear, etc. Illustratively, home screen 1002 includes a speed portion 1030 to output the vehicle to the operator, a tachometer portion 1032, an odometer portion 1034, a battery portion 1036, a fuel quantity portion 1038, a gear portion 1040, and a drive wheel portion 1042 indicating if vehicle 200 is in an all-wheel drive mode, a four-wheel drive mode, or a two-wheel drive mode.

Additionally, as shown in FIG. 41, home screen 1002 includes a status bar 1028 in the upper portion of display 1000. Status bar 1028 may include the status of the operator's phone (i.e., whether the phone is connected to vehicle 200 through Bluetooth® at connectivity portion 1054 and if there is a text message or a missed call at phone notifications portion 1056). Additionally, status bar 1028 also may indicate the ambient temperature at temperature portion 1058, direction of vehicle 200 at compass portion 1060, and the time at clock portion 1062. Any other features, indicators, notifications, or information may be included in status bar 1028 and, in one embodiment, display 1000 is configured for customization by the operator to allow the operator to see any desired information in a given screen of display 1000. Status bar 1028 is configured to be maintained in the upper portion of display 1000 regardless of the screen or output displayed to the operator. As such, status bar 1028 is universally used with all screens on display 1000.

Additionally, when an operator touches and releases or slides his/her finger downward from status bar 1028, display 1000 may provide a plurality of options for the operator, such as options to switch to another screen, see the status of other components, features, or accessories of vehicle 200, and/or review any notifications about vehicle 200 or accessories 1100. In this way, status bar 1028 also may provide a return feature of display 1000 so that the operator may utilize the drop-down type menu in status bar 1028 to access other information on previous screens or advance to other screens. Alternatively, display 1000 may be configured such that when the operator desires to return to a previous screen, for example home screen 1002, the operator may slide his/her finger in a right or left direction along display 1000. In addition to using his/her finger on display 1000, the operator may access other screens on display 1000 by touching inputs on display 1000, fairing 244, and/or handlebars 256.

Figure 42:
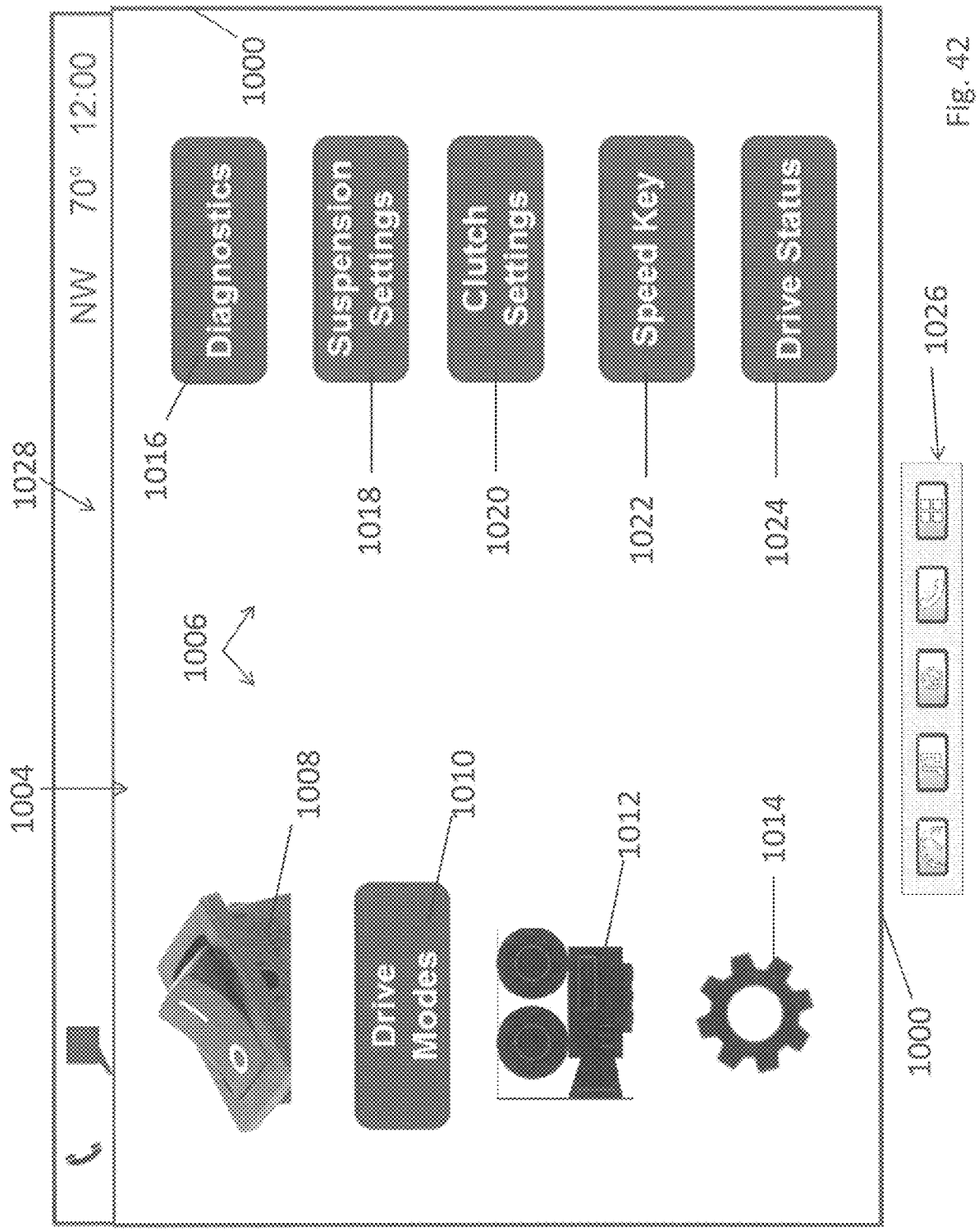
FIG. 42 is an illustrative embodiment of an options screen for the display of FIG. 41.

As shown in FIG. 42, one of the screens provided on display 1000 is an options screen 1004 which is configured to display a plurality of options to the operator regarding various information that may be output on display 1000. For example, options screen 1004 includes a plurality of inputs 1006 which may indicate each specific function or information textually or pictorially through words or visual images. In one embodiment, inputs 1006 listed on options screen 1004 include a power or on/off input 1008, a drive mode input 1010, an accessories input 1012, a settings input 1014, a diagnostics input 1016, a suspension settings input 1018, a clutch settings input 1020, a speed key input 1022, and a drive status input 1024. Once at options screen 1004, the operator may navigate through options screen 1004 to access a variety of information about vehicle 200, accessories, ambient conditions, etc., as disclosed herein and according to FIG. 43.

Display 1000 may be configured to output various information to the operator in a plurality of manners. For example, display 1000 may be configured to display information in a dual analog manner, a digital manner, or a standard manner with a manual or digital scroll bar (not shown) on the left and/or right side of display 1000 to scroll through options on the screen.

It may be appreciated that various illustrative embodiments of the options and information configured to be provided to display 1000 are disclosed herein, however, the operator may be able to customize or otherwise configure display 1000 and/or VCU 111 to provide any information about vehicle 200. As such, the illustrative embodiments disclosed herein are not intended to be exhaustive and merely provide examples of the information the operator may be able to access via display 1000. Additional details of display 1000 and the illustrative embodiments disclosed herein may be disclosed in International Patent Application No. PCT/US2014/018638, filed on Feb. 26, 2014, entitled "RECREATIONAL VEHICLE INTERACTIVE TELEMETRY, MAPPING, AND TRIP PLANNING SYSTEM", the complete disclosure of which is expressly incorporated by reference herein.

Power Input

Figure 43:
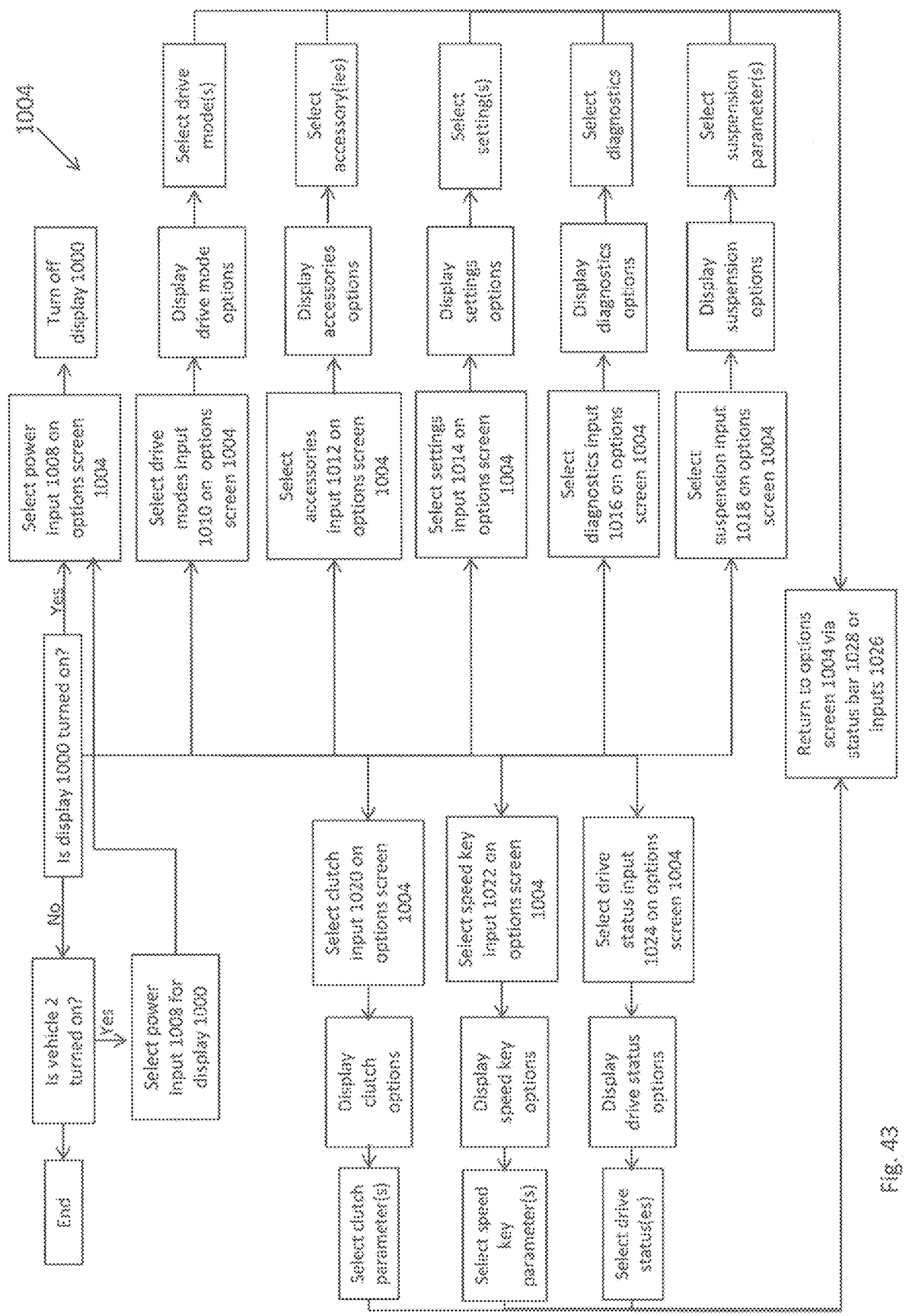
FIG. 43 is a flow chart of the operation of the options screen of FIG. 42.

Referring to FIGS. 42 and 43, display 1000 may automatically turn on when vehicle 200 is turned on via a key, push button, remote starter, security key, fob, or any other device. Alternatively, display 1000 may not turn on until the operator expressly turns on display 1000. For example, when the operator views display 1000, the operator may initially note whether display 1000 is turned on. If vehicle 200 is not turned on, display 1000 also may not be turned on. However, if vehicle 200 is turned on, the operator may turn on display 1000 through power input 1008. In one embodiment, power input 1008 is displayed on options screen 1004, however, display 1000, fairing 244, and/or handlebars 256 also may include a power input (not shown) within inputs 1026 (FIG. 41) to turn on display 1000 when options screen 1004 is not visible.

Referring still to FIG. 42, with display 1000 turned on, the operator may access options screen 1004 by selecting one of inputs 1026, swiping his/her finger left or right on display 1000, and/or accessing the drop-down menu from status bar 1028. For example, when the operator desires to turn off display 1000, the operator may access power input 1008 on options screen 1004 or through inputs 1026 on fairing 244 and/or handlebars 256 to turn off display 1000.

Drive Mode Input

Figure 44:
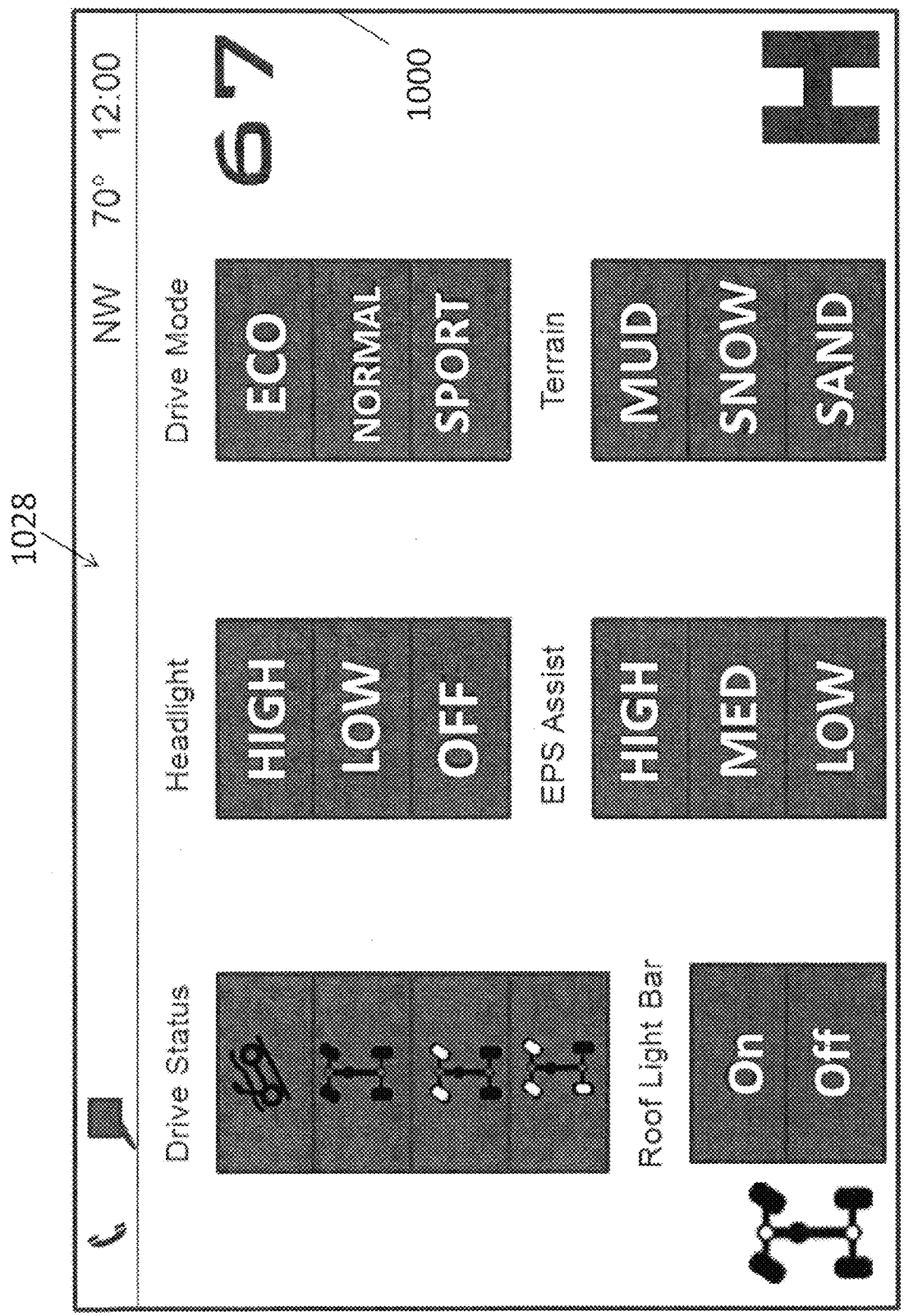
FIG. 44 is an illustrative embodiment of a Drive Mode Input screen for the display of FIG. 41.

With respect to FIGS. 42-44, when display 1000 turned on, the operator may desire to determine and/or change a drive mode of vehicle 200. For example, the operator may access drive modes input 1010 on options screen 1004 or through inputs 1026 on fairing 244 and/or handlebars 256 to display the drive modes available for vehicle 200. In one embodiment, and as shown in FIG. 44, the drive modes for vehicle 200 may be an eco or economy mode to conserve fuel, a normal mode, and/or a sport mode for additional speed and/or power output from power system 110. Additionally, drive modes input 1010 may allow the operator to select the terrain on which vehicle 200 is operating, for example mud terrain, snow terrain, sand terrain, hill climb or ascent, hill decline or descent, and/or any other terrain condition for which vehicle 200 is configured. In one embodiment, drive modes input 1010 also allows the operator to select all-wheel drive, four-wheel drive, or two-wheel drive modes. In this way, the operator may make more than one selection when accessing drive modes input 1010. The operator may select the drive mode(s) desired by touching display 1000 and/or through an input on fairing 244 and/or handlebars 256.

Accessories Input

Figure 45:
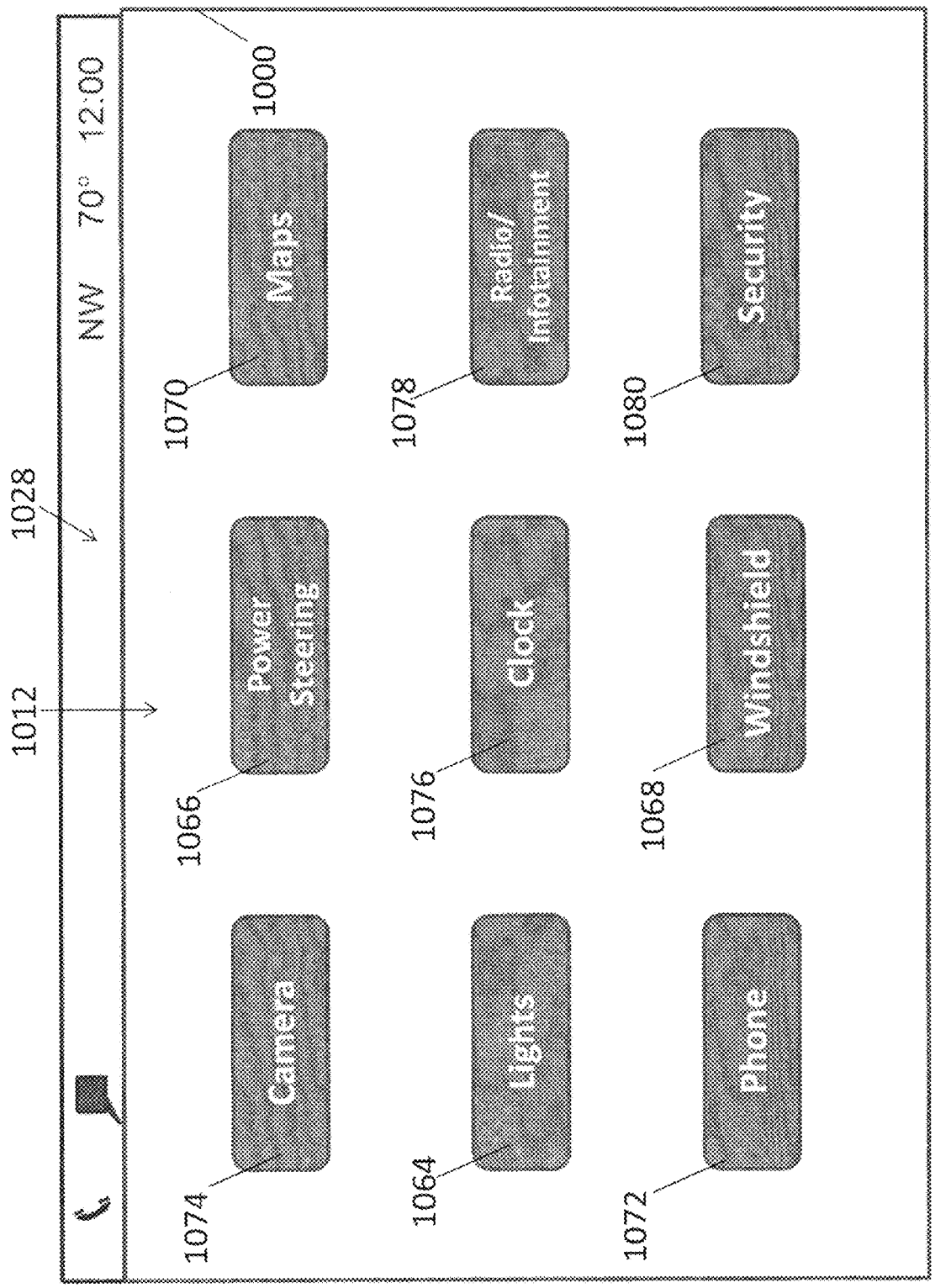
FIG. 45 is an illustrative embodiment of an Accessories Input screen for the display of FIG. 41.

When at options screen 1004 (FIG. 42), the operator may select accessories input 1012 to access accessories 1100 for vehicle 200, as shown in FIGS. 43 and 45. For example, accessories 1100 for vehicle 200 may include a radio, GPS or mapping function, head lights, fog lights, internal lights, electric power steering ("EPS"), Bluetooth®, a camera, saddle bags, a trunk, a windshield, adjustable suspension assemblies, or any other function, feature, component, or device configured for vehicle 200.

Once the operator selects accessories input 1012, the operator may select one or more of accessories 1100 to access. For example, the operator may select an accessory audio or radio function and display 1000 may provide options for fade, balance, and any other inputs to control the accessory audio on vehicle 200.

Additionally, as shown in FIGS. 43-45, the operator may select a lights option 1064 to turn on or off the headlight, ground lights, accent lights, underglow lights, fog lights, or internal lights to illuminate a portion of the operator space (e.g., dome or cabin lights) of vehicle 200. In one embodiment, any of the lights on vehicle 200 may have color-changing LED lights and lights option 1064 may allow the operator to change the color of any of the lights on vehicle 200.

Additionally, the operator may select an EPS option 1066 to utilize the EPS of vehicle 200 in a high, medium, or low mode by accessing the accessories input 1012.

Additionally, as shown in FIG. 45, the operator may access a windshield option 1068 to adjust the position of the windshield for vehicle 200 to move the windshield upward or downward during operation of vehicle 200.

In one embodiment, one of accessories 1100 of vehicle 200 includes a garage door opener which may be electrically coupled to electrical system 109 of vehicle through a wireless or a wired connection and accessed and controlled through accessories input 1012 on display 1000. For example, the operator may position a universal garage door opener on any location of vehicle 200 (e.g., in a storage console) and a CAN or other type of signal may be sent from display 1000 to the garage door opener to allow the operator to control opening and closing of the garage door through display 1000. Alternatively, a garage door opener may be integrated into the vehicle.

Figure 46A:
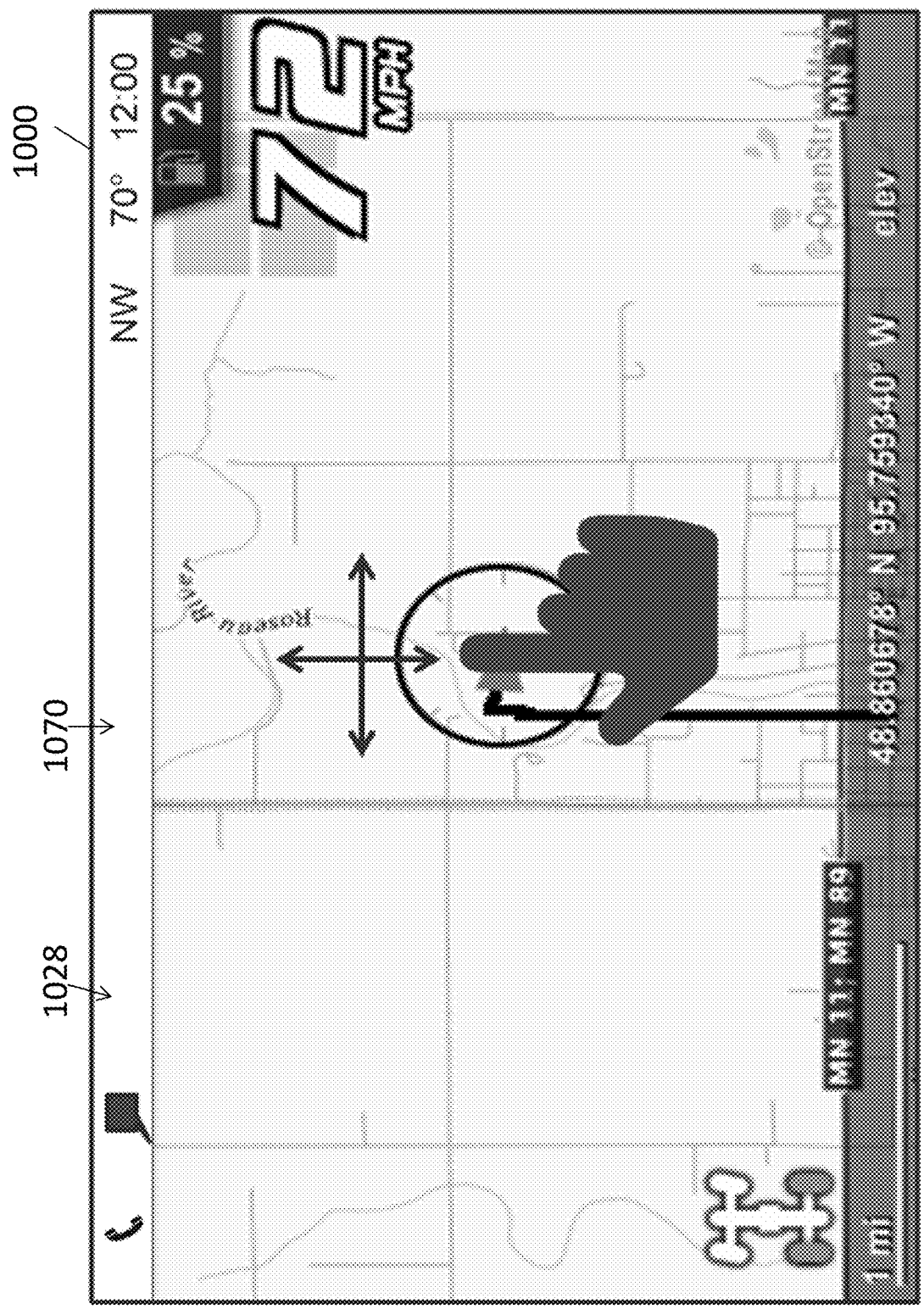
FIG. 46A is an illustrative embodiment of an adjustment of an image accessed via a Map Options screen for the display of FIG. 41.
Figure 46B:
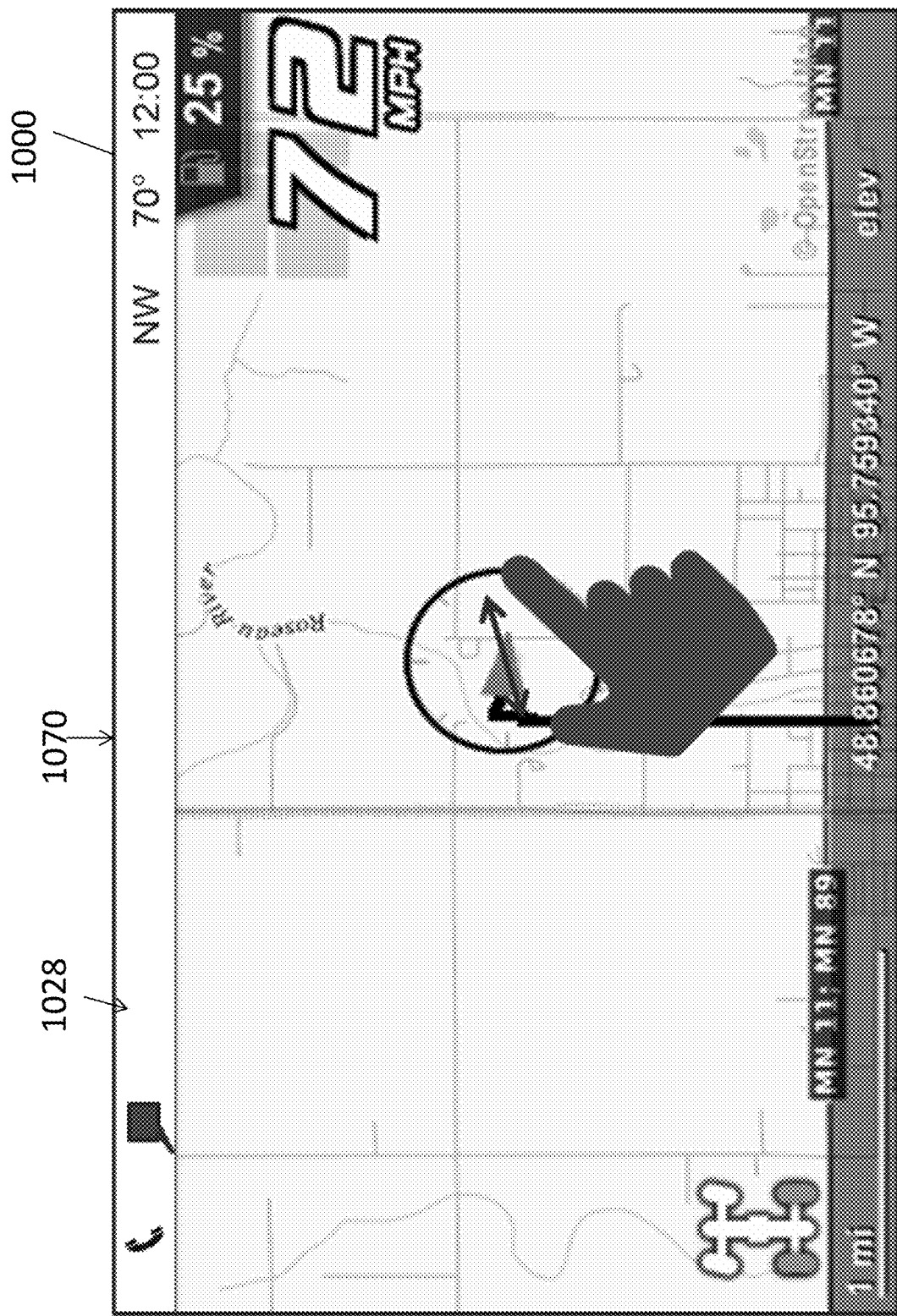
FIG. 46B is a further illustrative embodiment of another adjustment of an image accessed via the Map Options screen of FIG. 46A.

With accessories input 1012 (FIGS. 43 and 45), the operator also may elect to connect to his/her phone, access the radio, access GPS and/or map information for local terrain and/or location of vehicle 200 and/or other riders in the area, etc. For example, as shown in FIGS. 46A and 46B, an illustrative embodiment maps option 1070 provides a map of the location of vehicle 200 which is shown on display 1000. Additionally, maps option 1070 allows for turn-by-turn directions or other navigation features during operation of vehicle 200. In one embodiment, when the map is shown on display 1000, the speed of vehicle 200, the amount of fuel remaining in the fuel tank of vehicle 200, the coordinates of vehicle 200, and other information also may be displayed.

Because display 1000 may be operated by the operator's fingers, the operator may pull his/her fingers apart to zoom in to a particular area of the map (FIG. 46A), push his/her fingers toward each other to zoom out and access more of the location shown on the map (FIG. 46A), and/or move his/her fingers upward, downward, to the right, or to the left to move the viewing portion of the map to a different area (FIG. 46B). Additionally, using GPS coordinates of vehicle 200 through the operator's phone GPS function or GPS on vehicle 200, the map feature of vehicle 200 may allow a rider to pinpoint the current location of vehicle 200 (i.e., "drop a pin" on the map) and subsequently name the location for future ride mapping and/or to provide the current location to other vehicles. In this way, maps option 1070 of vehicle 200 may then trace the route of vehicle 200 and allow the operator to save, name, or otherwise store and identify information about that route for future ride mapping. Additionally, in one embodiment, maps option 1070 of vehicle 200 has a lockout feature that maintains the output of the map on display 1000 and does not allow for changes to the map image provided on display 1000 for at least a period of time or while vehicle 200 is operating at specific speeds.

Figure 47:
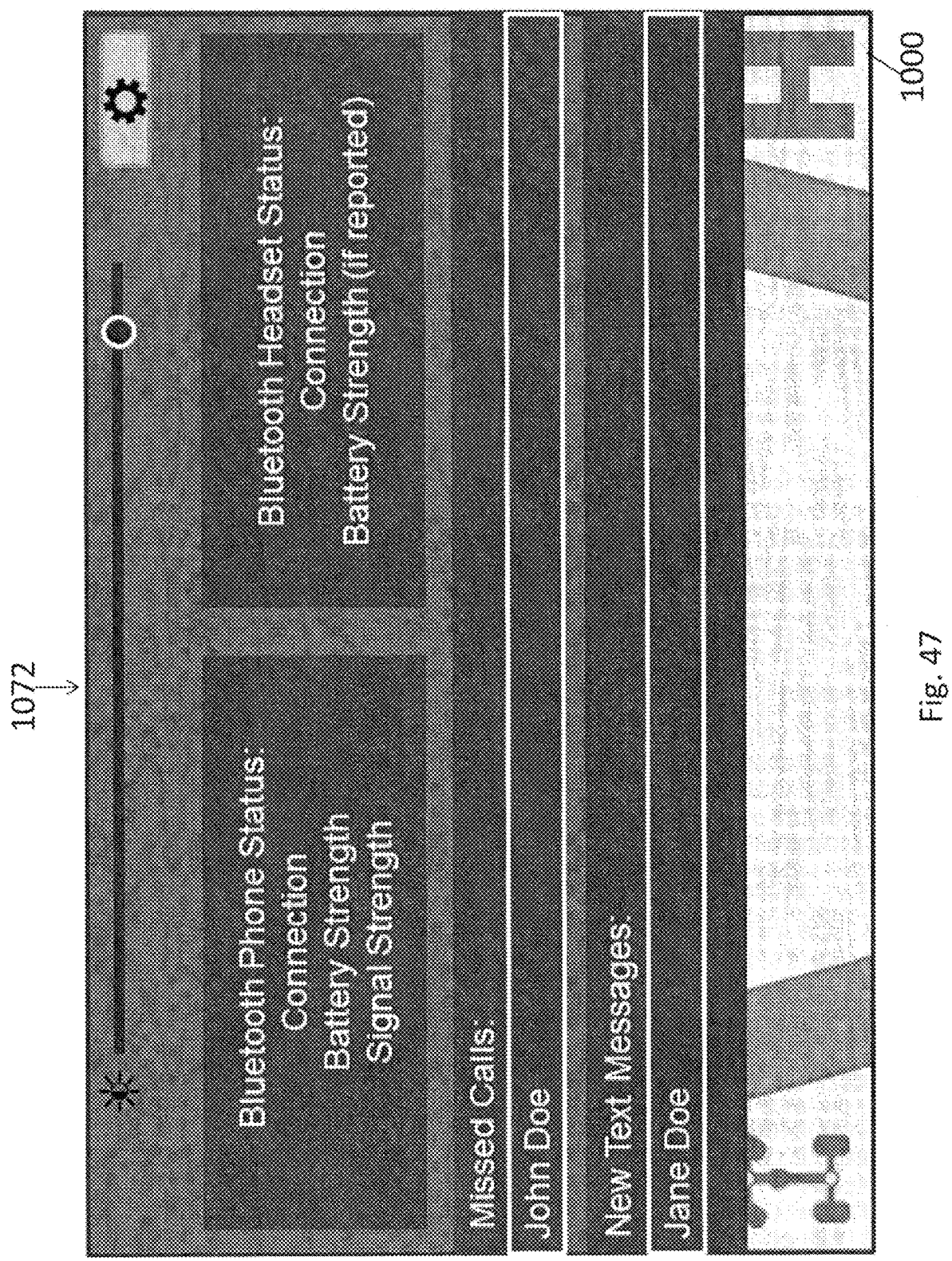
FIG. 47 is an illustrative embodiment of a Phone Options screen for the display of FIG. 41.

Additionally, as shown in FIGS. 45 and 47, accessories input 1012 allows the operator to access his/her phone through a phone option 1072 (FIG. 45). The operator's phone may be connected via Bluetooth®, and through phone option 1072, an illustrative screen as shown in FIG. 47 allows the operator to see the connection status, battery voltage, headset connectivity, and signal strength of the phone. Additionally, the operator is able to see any missed calls and/or text messages received on the phone. The illustrative embodiment of display 1000 allows the operator's phone to be accessed through display 1000 or by audible commands made into a headset that are transmitted through speakers to controller 140 to access the operator's phone. Additionally, more than one headset may be connected to vehicle 200, for example both the driver and a passenger may each connect an individual headset to vehicle 200. In one embodiment, both the driver and passenger headsets may be wirelessly connected to display 1000 through any wireless, such as wifi, connection or may be connected to display 1000 through a wired connection. In this way, vehicle 200 is configured to allow for simultaneous connection of more than one headset to allow more than one person on vehicle 200 to listen to audio, talk to others on vehicle 200, access a phone or other features on or connected to vehicle 200, etc. For example, Additionally, in one embodiment, the headsets may be wirelessly connected to each other to provide the driver and passenger(s) to talk or interconference with each other without going through any connection on vehicle 200. Also, in a further embodiment, electrical system 109 of vehicle 200 may be configured to connect with more than one phone or device, such as a passenger's phone or an iPod® in addition to the operator's phone.

However, VCU 111 of vehicle 200 may be programmed to include specific lockout features for phone options 1072 based on vehicle operating parameters. In one embodiment, phone options 1072 of vehicle 200 may be locked out when vehicle 200 is operating above a predetermined speed. For example, phone options 1072 of vehicle 200 may be temporarily disabled when vehicle 200 is operating above a predetermined speed such that operator is not aware of incoming phone calls or text messages. Alternatively, or in addition to, phone options 1072 may include an "Ignore" option to ignore incoming phone calls and text messages while vehicle 200 is operating and/or a plurality of quick response messages indicating that the operator is not able to currently access his/her phone (e.g., "Driving. Will call/text you later.").

Figure 48B:
FIG. 48B is another illustrative embodiment of options shown on the display of FIG. 41 when the camera on the vehicle is taking static or live images.
Figure 48C:
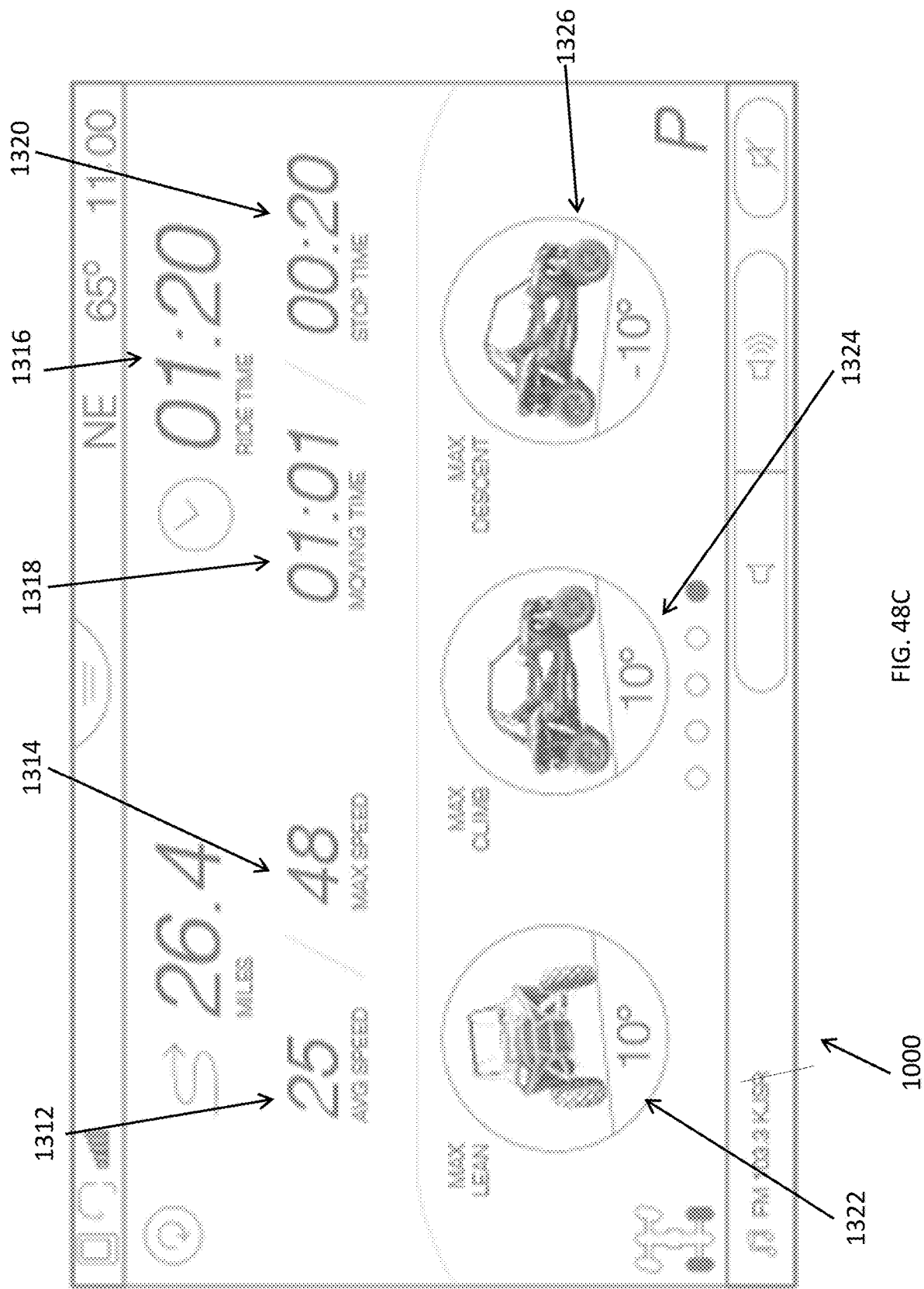
FIG. 48C is an illustrative embodiment of a summary of ride parameters shown on the display of FIG. 41.
Figure 48D:
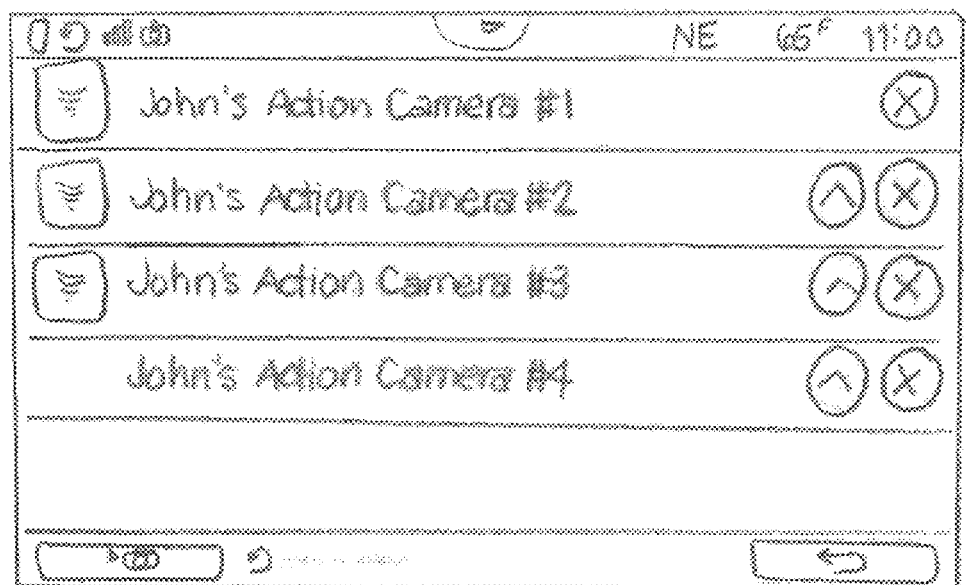
FIG. 48D is an illustrative embodiment of the display showing a plurality of cameras on the vehicle that the operator may choose.

Referring again to FIG. 45, by accessing accessories input 1012, the operator can elect a camera option 1074 to turn on and off a camera (not shown) and direct the viewfinder of the camera in a particular direction. The input from the camera is transmitted via controller 140 to display 1000 such that the images being captured by the camera are displayed to the operator on display 1000. For example, any camera on vehicle 200 may be either directly wired to vehicle 200 (e.g., to the VCU and/or display 1000) or may be wirelessly connected to display 1000 through, for example, a Bluetooth® connection. By connecting the camera(s) to display 1000, various settings for the camera(s) (e.g., resolution, mode, filter, etc.) may be adjusted via display 1000, rather than directly adjusting the settings on the camera itself or through an external device, such as a phone. Additionally, as shown in FIG. 48A, other information, such as vehicle speed shown at 1300, drive mode shown at 1302, gear selection shown at 1304, fuel level (not shown), music and volume (not shown), error codes (not shown), time (not shown), GPS information (not shown), coolant or oil temperature (not shown), and/or battery level (not shown), may be shown on display 1000 when images from the camera also are shown. Display 1000 provides two-way communication between the operator and the camera(s) because display 1000 allows the operator to control any of the cameras on vehicle 200 through inputs associated with display 1000 and the video and/or images captured by the camera(s) are transmitted to display 1000 such that the operator can view the images and/or video taken by the camera(s), as shown in FIG. 48D. In this way, vehicle 200 and display 1000 eliminate the need for the user to operate the camera(s) through his/her phone or other device because the camera(s) are fully integrated into vehicle 200.

In one embodiment, the camera is configured for live photographs and video capabilities. However, once vehicle 200 is operating above a predetermined speed, display 1000 may automatically switch to a different screen such that the complete visual output on display 1000 is not constantly moving while the operator is driving vehicle 200, as is the case when the input from the camera is shown on display 1000.

In one embodiment, at least one camera is provided at the front and/or rear of vehicle 200. In this way, the camera(s) can capture images and video from forward-facing and rearward-facing views. For example, as shown in FIG. 48B, display 1000 may include a camera icon 1310 which allows the user to toggle between any of the cameras on vehicle 200, including a front-facing camera, a rear-facing camera, a side-facing camera, etc. Because the cameras are either directly wired to display 1000 or are wirelessly connected to display 1000 via, for example, a Bluetooth® connection, display 1000 recognizes multiple cameras and allows the user to toggle between the various cameras through icon 1310 on display 1000. As such, a rear camera may be used as a back-up camera for vehicle 200. Additionally, any camera on vehicle 200 may be configured to automatically record video once vehicle 200 is operating a particular speed so that the ride may be automatically recorded without input from the operator and reviewed later by the operator such that the camera acts as a live action or action sports camera to record the ride of vehicle 200. For example, the camera may automatically begin recording when the vehicle is moving and may automatically stop recording when the vehicle stops moving. Alternatively, the user can control when the camera starts and stops recording through an input on display 1000 shown at 1306 in FIG. 48A and also can take a snapshot or static image shown on display 1000 by selecting the input at 1308 in FIG. 48A while the camera continues to record live images. In a further embodiment, the camera may automatically record images and information for a predetermined period of time (e.g., 5 seconds, 10 second, 15 second, 30 seconds, 60 seconds, 90 seconds, etc.) even if the user does not activate the camera. In this instance, the period of time automatically recorded by the camera may be saved as a loop, which the user may then opt to permanently save to a memory or may opt to overwrite to record additional images, video, and information from a subsequent ride.

In one embodiment, vehicle 200 may include any number cameras which may face in any direction into or out of vehicle 200. For example, using a wireless connection (e.g., a Bluetooth® connection) or a USB device, any number of cameras may be connected to vehicle 200. Additionally, once connected to vehicle 200, the camera(s) are known to display 1000 such that the operator select any/all of the cameras and can take static images and/or record video on any of the cameras by selecting an input on display 1000. Additionally, any of the cameras may provide additional information to the operator, such as if a person is approaching vehicle 200 quickly, if another vehicle is a "blind spot" of vehicle 200, etc.

When the camera(s) records live video or taking static images, the information and images captured by the camera may be recorded to a memory of vehicle 200, display 1000, or the camera itself. More particularly, the memory associated with the camera may be accessed through a USB port on vehicle 200 or remotely through Bluetooth® or wireless connectivity to a device. In one embodiment, all of the cameras on vehicle 200 may record images, video, and other information to a single memory location of vehicle 200 to consolidate the information from the cameras into a single location. Additionally, the images, video, and information captured by the camera(s) may be shared on social media, sent to contacts in a user's phone, or uploaded to a cloud when vehicle 200 is connected to a wife, Bluetooth®, or any other wireless network or system. The images obtained from the camera may be reviewed either on an external device (e.g., a phone) or on display 1000 via a playback function accessible through display 1000. Also, a summary screen may be shown on display 1000, as shown in FIG. 48C, to provide trip information to the rider after the camera has stopped recording a certain portion of the ride, when vehicle 200 is in Park, when engine 214 has stopped, or when any other parameter has been met. Additionally, the illustrative summary screen shown in FIG. 48C may be transmitted to a cloud, a memory, social media, or contacts of the rider to display information such as average speed at 1312, maximum speed at 1314, riding time at 1316, moving time at 1318, stop time at 1320, maximum lean of vehicle 200 at 1322, maximum climb or elevation of vehicle 200 at 1324, and maximum descent of vehicle 200 at 1326.

In a further embodiment, the camera(s) may be supported on a mechanically or electrically-controlled mount on vehicle 200 such that the user can manually adjust the position of the viewfinder of the camera or, through display 1000, the user may remotely adjust the position of the viewfinder.

Referring still to FIG. 45, the operator can also adjust the output of the clock feature through a clock option 1076. Also, the operator can turn on and off the radio, change the station played by the radio, and/or access other media, such as iPod® devices, mp3 players, USB connections, etc. by accessing a radio/infotainment option 1078 within accessories input 1012. In one embodiment, radio/infotainment option 1078 may include a "discoverable" mode which would "learn" the operator's genre, artist, and song preferences and then predetermine playlists, artists, or genres that the operator may wish to listen to during a subsequent ride on vehicle 200. Additionally, radio/infotainment option 1078 may allow for preset favorites, such as preset radio or satellite stations.

Other of accessories 1100 of vehicle 200 may include a security system for vehicle 200. For example, by accessing a security option 1080, as shown in FIG. 45, the operator may be able to lock saddle bags, a trunk, or any other storage compartment of vehicle 200. Additionally, the operator may be able to input or change a security key, access security settings, and/or view all other security features of vehicle 200. Additional features of a security system for vehicle 200 may be disclosed in U.S. patent application Ser. No. 14/667, 172, filed on Mar. 34, 2015, and entitled "VEHICLE SECURITY SYSTEM," the complete disclosure of which is expressly incorporated by reference herein.

Figure 49:
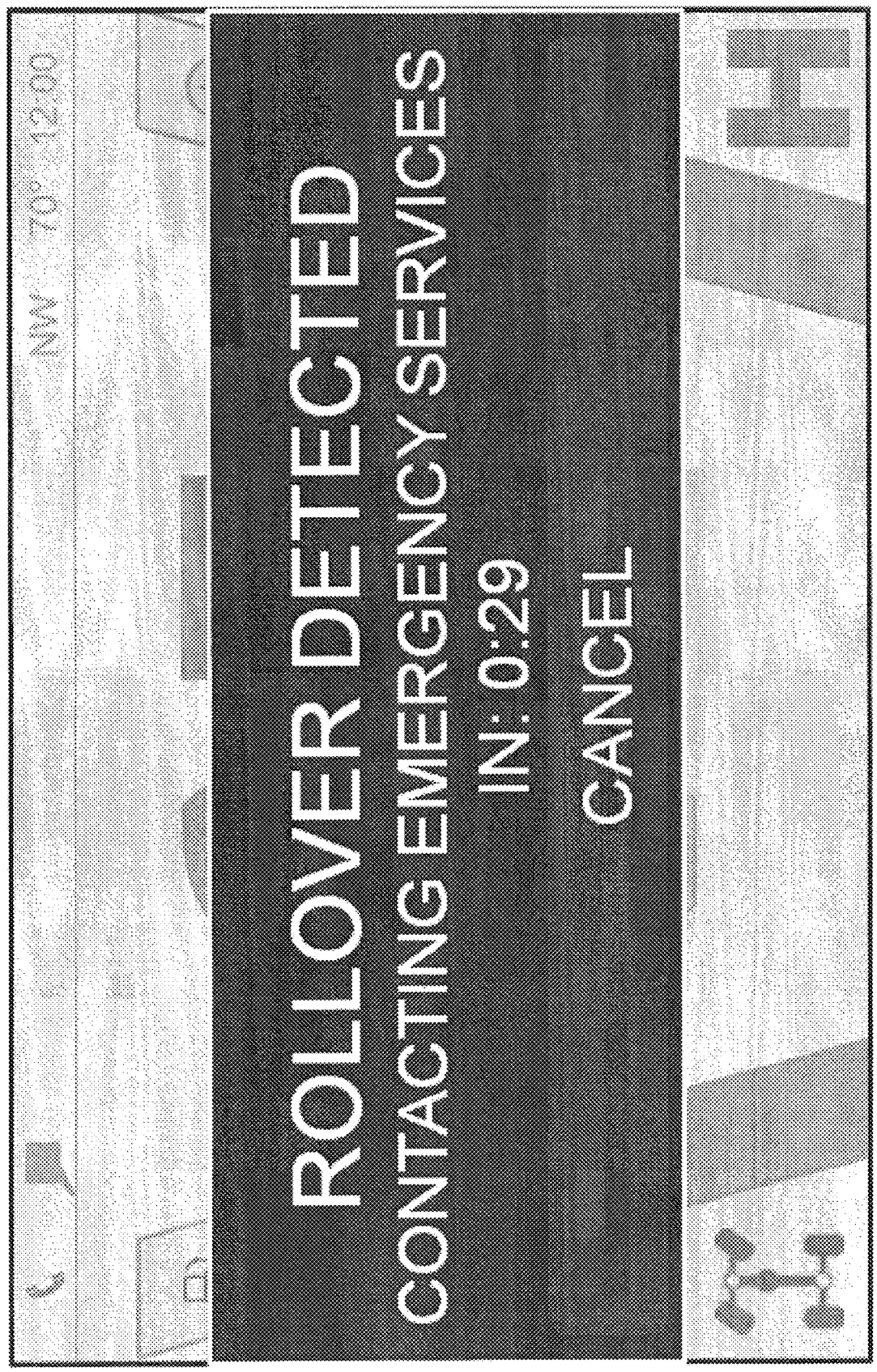
FIG. 49 is an illustrative embodiment of a security alert for a Security Options screen for the display of FIG. 41.

Additionally, the security features of vehicle 200 may be configured to determine if an accident occurred or if vehicle 200 is in a roll-over situation. For example, as shown in FIG. 49, if vehicle 200 is hit by another vehicle or in a roll-over situation, a sensor (e.g., a position sensor) may be triggered or otherwise determine that the roll-over or accident has occurred. The sensor or other feature of vehicle 200 may then transmit a signal to controller 140 in order for security option 1080 to allow for an automatic call for help. In one embodiment, a call may be placed to 911 or to a local emergency services unit to alert that vehicle 200 has rolled over. Additionally, a call may be placed to a person in the operator's contact list or phone book if an accident or roll-over has occurred. In one embodiment, a call or alert may be provided to any vehicle in the local area based on the proximity of other vehicles to vehicle 200. As such, the security system or security features of vehicle 200 is configured to communicate or transmit a signal to the operator's phone which in turn then communicates or places a call to a third-party, such as an emergency services unit, other vehicles in the area, a contact within the user's phonebook, etc.

During the call or through an alert, information about the operator, vehicle 200, and/or the location of vehicle 200 may be communicated so that others can go to vehicle 200 to assist with the accident situation. However, if an accident or roll-over is not an emergency, security option 1080 on display 1000 provides a "CANCEL" input for the operator to cancel the emergency call or alert. In one embodiment, a timer is provided that displays the time in which an emergency call or alert will be placed unless the operator cancels the call or alert by touching the "CANCEL" input. If an operator is injured and not able to cancel the call, the call or alert will proceed to provide assistance to the operator.

Settings Input

Figure 50:
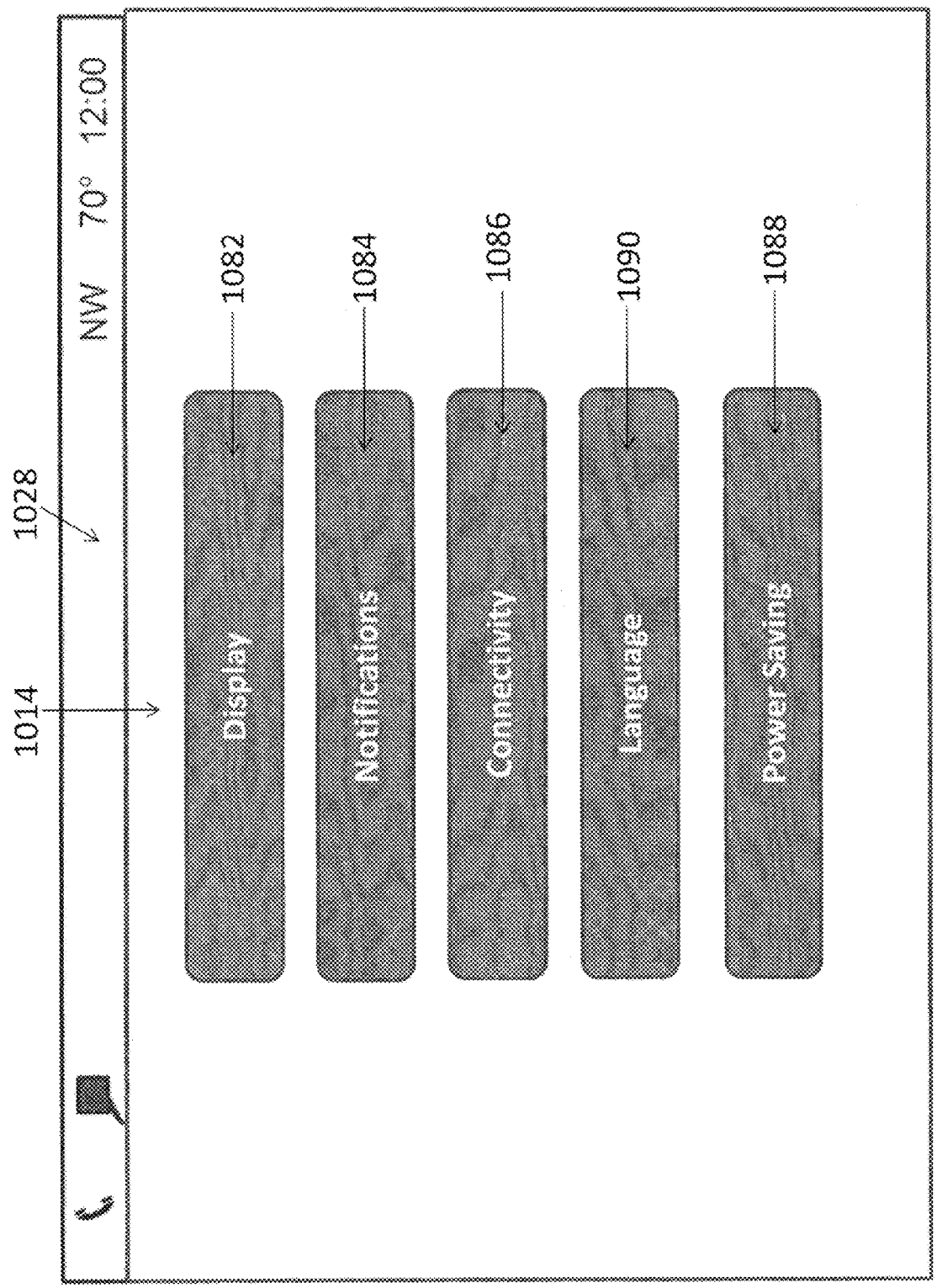
FIG. 50 is an illustrative embodiment of a Settings Input screen for the display of FIG. 41.

When at options screen 1004 (FIGS. 42 and 43), the operator may select settings input 1014 to change the settings for display 1000 and/or other components of vehicle 200. For example, as shown in FIG. 50, the operator may change the default brightness or resolution of display 1000 through a display option 1082 (also see FIG. 37). Additionally, when accessing settings input 1014, the operator may change notifications through a notifications option 1084, Bluetooth® or phone connectivity settings through a connectivity option 1086, power saving settings through a power savings option 1088, language settings through a language option 1090, and other settings for display 1000 and/or vehicle 200.

Diagnostics Input

Figure 51:
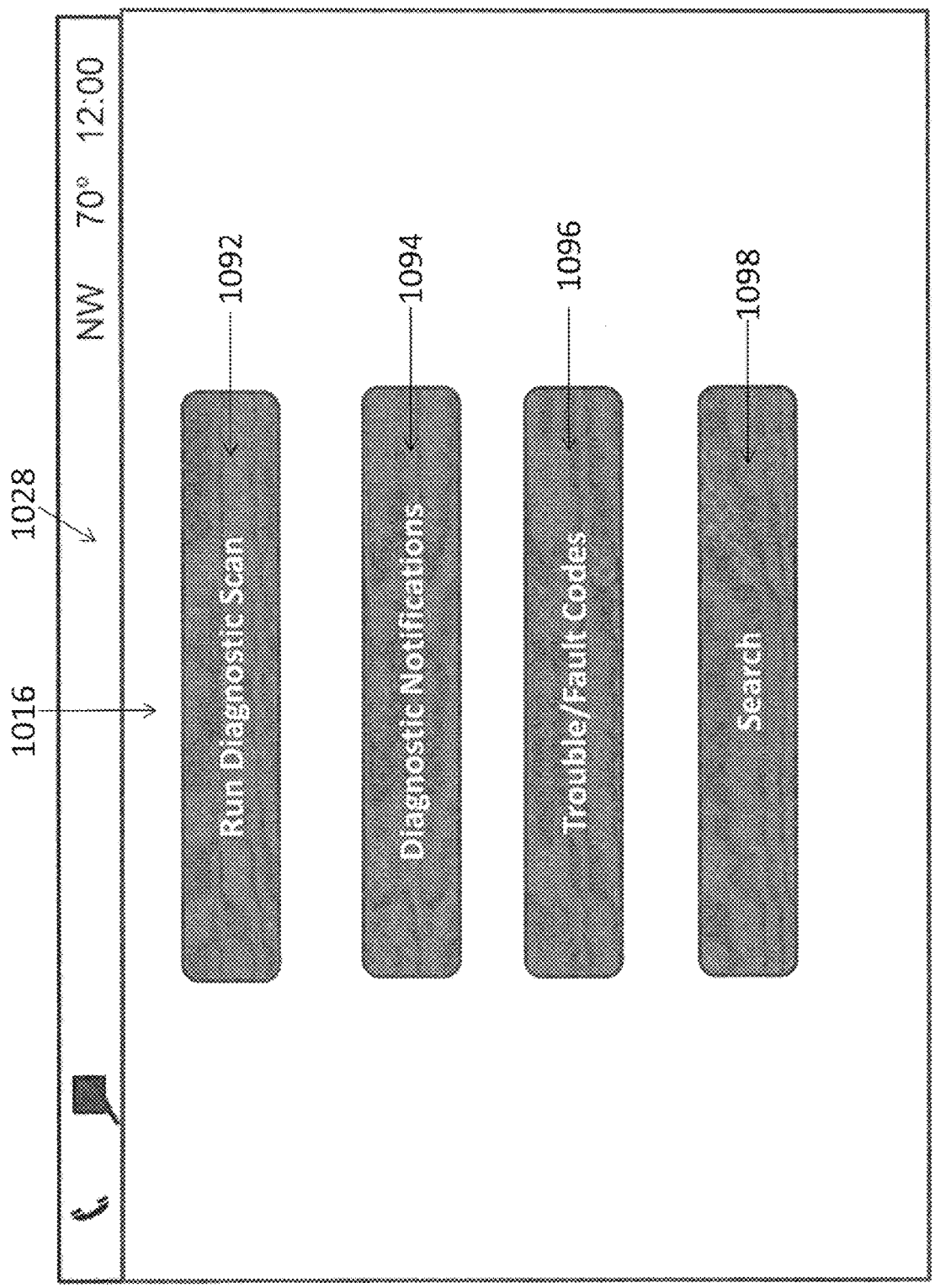
FIG. 51 is an illustrative embodiment of a Diagnostics Input screen for the display of FIG. 41.

Referring to FIG. 51, when at options screen 1004 (FIGS. 42 and 43), the operator may select diagnostics input 1016 to run a diagnostics scan of vehicle 200 via a diagnostic scan option 1092 or access diagnostic or repair information about vehicle 200 via a diagnostic notifications option 1094. For example, as shown in FIG. 51, diagnostics input 1016 may provide trouble codes via a trouble/fault codes option 1096 to the operator in the event of a needed repair to vehicle 200. More particularly, notifications option 1094 may provide a notification to the operator which is displayed on display 1000 indicating a trouble or fault has occurred and identifying the fault by a code. When vehicle 200 has stopped moving, the operator may be able to look up the fault code through trouble/fault codes option 1096 of diagnostics input 1016 to understand the issue with vehicle 200.

Alternatively, or in addition to, diagnostics input 1016 may allow the operator to search for common repairs to display tools and procedures for repairing a specific component of vehicle 200 via a search option 1098. In one embodiment, search option 1098 of diagnostics input 1016 may allow the operator to type a specific keyword or access a menu of common repair procedures to fix a belt, change a tire, change the oil, add coolant, etc.

Suspension Settings Input

Figure 52:
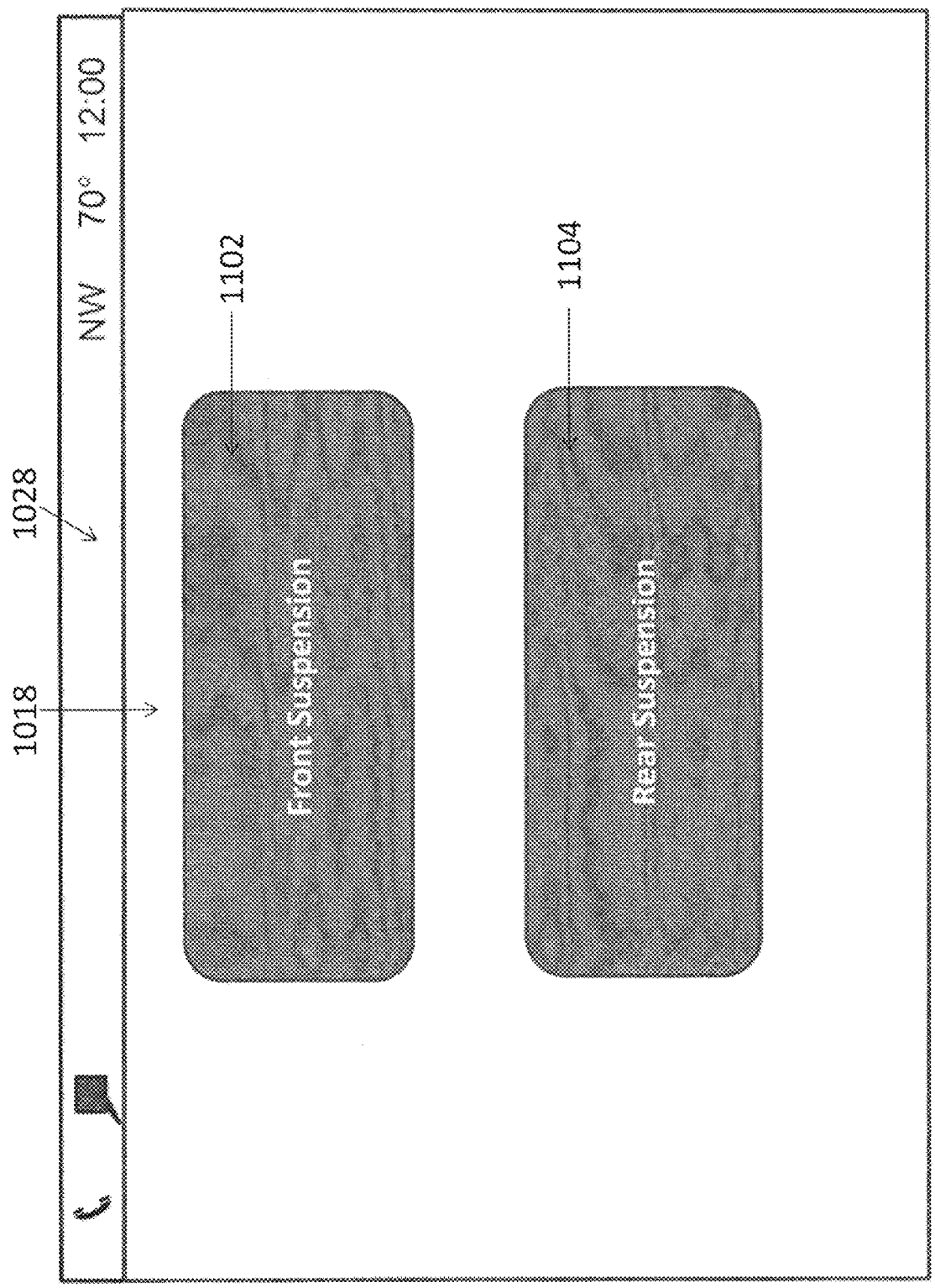
FIG. 52 is an illustrative embodiment of a Suspension Settings Input screen for the display of FIG. 41.

Referring to FIG. 52, when at options screen 1004 (FIGS. 42 and 43), the operator may select suspension settings input 1018 to change the parameters of the suspension assemblies of vehicle 200. For example, as shown in FIG. 52, the vehicle may include an electronically-controlled front suspension and/or rear suspension. From suspension settings input 1018, the operator may able to change various parameters of the front and/or rear suspension of vehicle 200, such as the spring tension to adjust the stiffness in the suspension, by accessing front suspension options 1102 and/or rear suspension options 1104

Additional details of the suspension assemblies may be disclosed in U.S. patent application Ser. No. 14/074,340, filed Nov. 7, 2013, and entitled "VEHICLE HAVING SUSPENSION WITH CONTINUOUS DAMPING CONTROL" and U.S. patent application Ser. No. 14/507,355, filed Oct. 6, 2014, and entitled "VEHICLE HAVING SUSPENSION WITH CONTINUOUS DAMPING CONTROL", the complete disclosures of which are expressly incorporated by reference herein.

Clutch Settings Input

Figure 53:
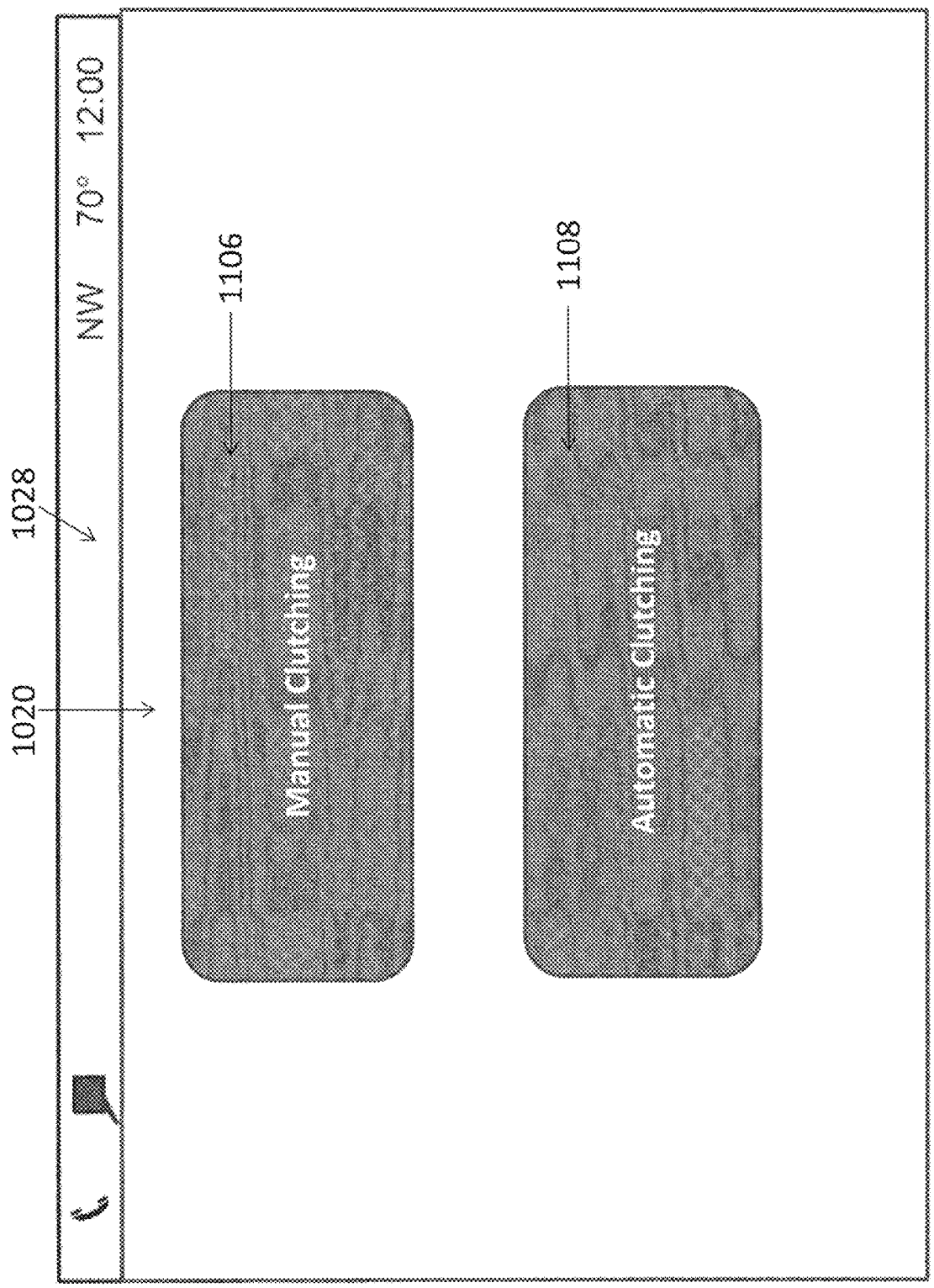
FIG. 53 is an illustrative embodiment of a Clutch Settings Input screen for the display of FIG. 41.

Referring to FIG. 53, when at options screen 1004 (FIGS. 42 and 43), the operator may select clutch settings input 1020 to change the parameters of the clutch assembly (not shown) or other aspects of power system 110 of vehicle 200. For example, as shown in FIG. 53, the operator may able to switch between manual and automatic clutch controls via a manual clutching option 1106 and an automatic clutching option 1108. Additionally, clutch settings input 1020 may display information to the operator about the current clutch settings, such as a fluid level in a clutch master cylinder or parameters of a clutch linkage so that the operator can change such parameters when vehicle 200 is not operating, if desired.

Additional details of power system 110, including the transmission, may be disclosed in U.S. Pat. No. 8,534,413, filed Feb. 17, 2012, and entitled "PRIMARY CLUTCH ELECTRONIC CVT", the complete disclosure of which is expressly incorporated by reference herein.

Speed Key Input

Figure 54:
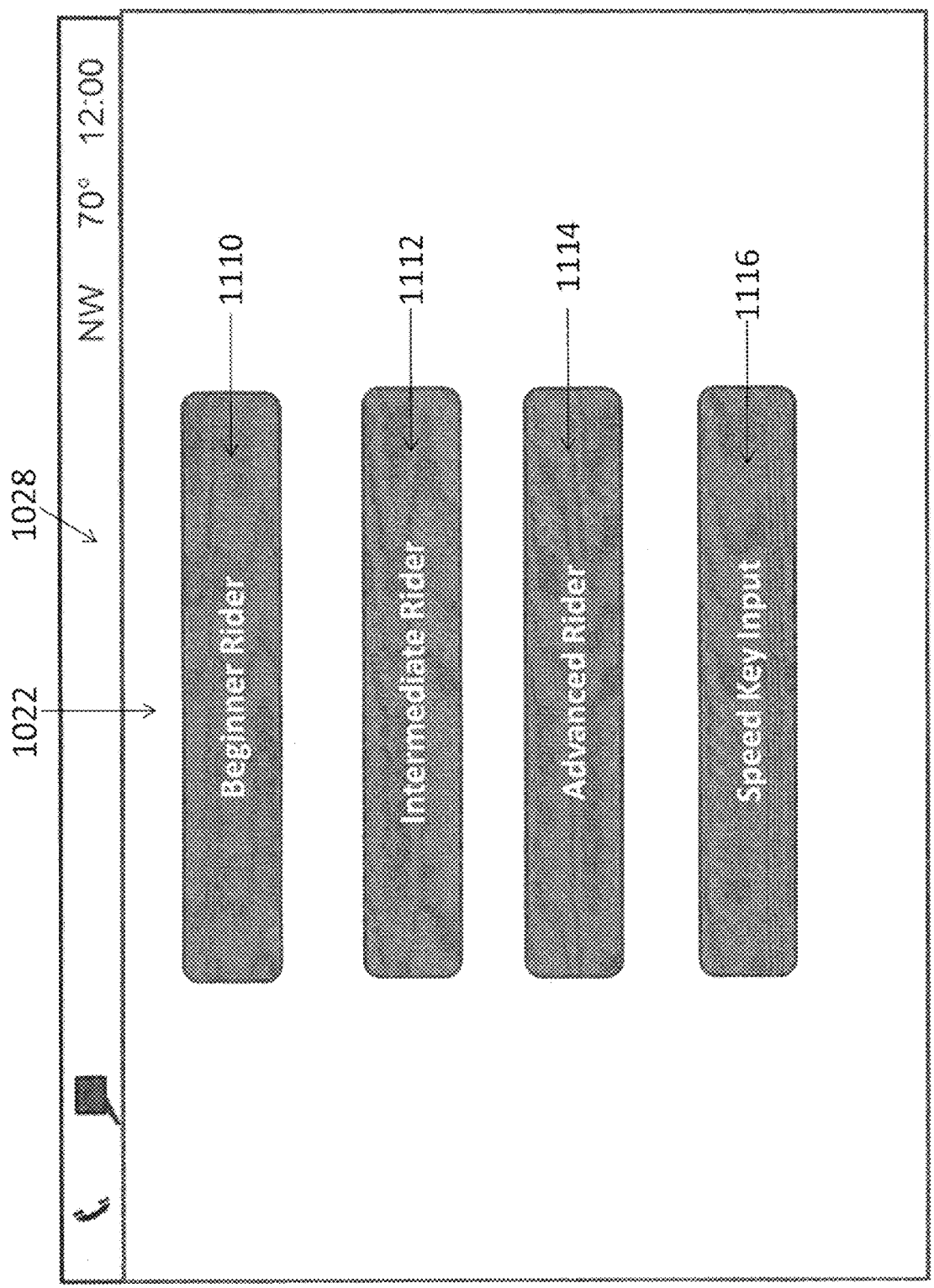
FIG. 54 is an illustrative embodiment of a Speed Key Input screen for the display of FIG. 41.

With respect to FIG. 54, when at options screen 1004 (FIGS. 42 and 43), the operator may select speed key input 1022 to change the parameters of the speed key of vehicle 200. For example, as shown in FIG. 54, the operator may select the speeds at which vehicle 200 may operate for a given rider and the input required to change the speed key parameters (fob, speed limitations, security key, etc.) via a speed key input option 1116. In this way, the operator may control operation of vehicle 200 when another person is operating vehicle 200 based on the person's age, ability, and experience with vehicle 200. For example, speed key input 1022 may allow the operator to set or change the parameters for a Beginner Rider level via a beginner rider option 1110, an Intermediate Rider level via an intermediate rider option 1112, and an Advanced Rider level via an advanced rider option 1114.

Additionally, speed key input 1022 may be accessed remotely via a signal or input sent over a wireless network or Bluetooth® to remotely control or change the parameters of the speed key of vehicle 200. For example, speed key input 1022 may be accessed by the manager of a fleet of vehicles 200 to allow for fleet management of vehicles 200 from any location at or away from vehicles 200.

Additional details of the speed key of vehicle 200 may be disclosed in U.S. Pat. No. 7,822,514, issued on Oct. 26, 2010, and entitled "SYSTEM FOR CONTROLLING VEHICLE PARAMETERS" and U.S. Pat. No. 8,948,926, issued on Feb. 3, 2015, and entitled "SYSTEM FOR CONTROLLING VEHICLE PARAMETERS", the complete disclosures of which are expressly incorporated by reference herein.

Drive Status Input

Figure 55:
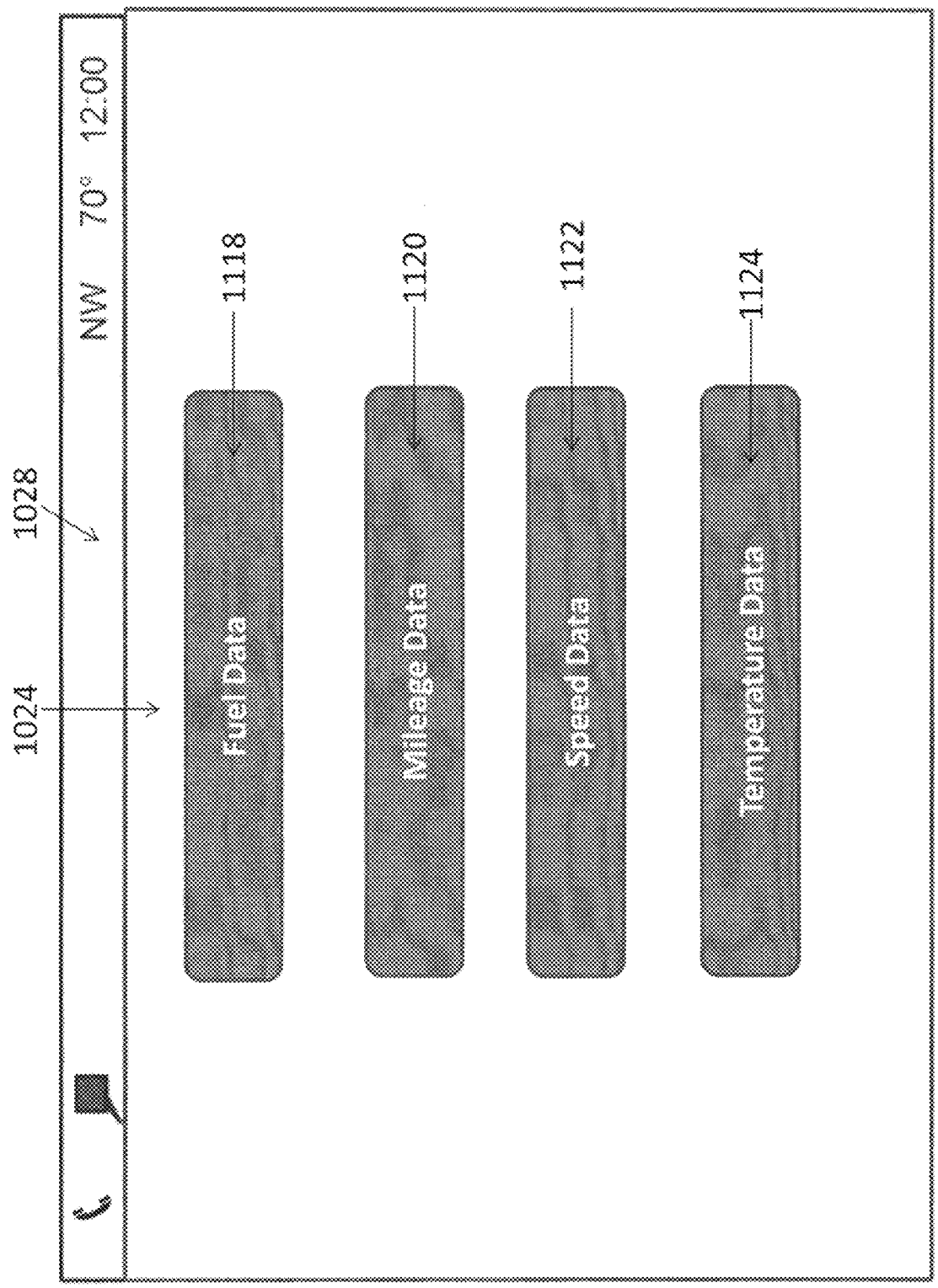
FIG. 55 is an illustrative embodiment of a Drive Status Input screen for the display of FIG. 41.

Referring to FIG. 55, when at options screen 1004 (FIGS. 42 and 43), the operator may select drive status input 1024 to view the status of the driving conditions and/or the status of various components of vehicle 200. For example, as shown in FIG. 55, the operator may view details about the speed via a speed data option 1122, fuel usage via a fuel data option 1118, mileage via a mileage data option 1120, and coolant, oil, exhaust, or other temperature information via a temperature data option 1124. In one embodiment, each parameter selected by the operator may provide historical, current, and average data to the operator. Alternatively, an output similar to home screen 1002 (FIG. 41) may be provided to the operator such that the operator can view a plurality of parameters at once.

It may be appreciated that any of the features and functions disclosed herein are applicable to both on-road and off-road vehicles.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A recreational vehicle for use by a driver and at least a first passenger, the driver having a driver portable communication device and a driver audio interface device having a microphone and a speaker, the first passenger having a first passenger portable communication device and a first passenger audio interface device having a microphone and a speaker, the recreational vehicle comprising:
- a plurality of ground engaging members;
- a frame supported by the plurality of ground engaging members;
- a prime mover supported by the frame and operatively coupled to at least one of the plurality of ground engaging members to power movement of the recreational vehicle;
- a steering system supported by the frame and operatively coupled to at least a portion of the plurality of ground engaging members to move the portion of the plurality of ground engaging members relative to the frame, the steering system including a steering member adapted to be grasped by the operator of the recreational vehicle, the steering member being movable relative to the frame; and
- at least one controller supported by the frame, the at least one controller being adapted to be operatively coupled to the driver portable communication device, the driver audio interface device, the passenger portable communication device, and the passenger audio interface device, the at least one controller being configured to communicate audio information between the driver portable communication device and the driver audio interface device through the at least one controller and to communicate audio information between the passenger portable communication device and the passenger audio interface device through the at least one controller.

2. The recreational vehicle of claim 1, wherein the at least one controller is adapted to be operatively coupled to at least three of the driver portable communication device, the driver audio interface device, the passenger portable communication device, and the passenger audio interface device through a wireless network.

3. The recreational vehicle of claim 1, wherein the at least one controller is adapted to be operatively coupled to each of the driver portable communication device, the driver audio interface device, the passenger portable communication device, and the passenger audio interface device through a wireless network.

4. A method of communicating information to a driver and at least a first passenger of a recreational vehicle, the driver having a driver portable communication device and a driver audio interface device having a microphone and a speaker, the first passenger having a first passenger portable communication device and a first passenger audio interface device having a microphone and a speaker, the method comprising the steps of:
- operatively coupling at least one controller of the recreational vehicle with the driver portable communication device, the driver audio interface device, the first passenger portable communication device, and the first passenger audio interface device;
- routing audio information through the at least one controller of the recreational vehicle between one of (a) the driver portable communication device and the driver audio interface device and (b) the first passenger portable communication device and the passenger audio interface device, wherein audio information is routed between the driver portable communication device and the driver audio interface device in response to a driver call being established with the driver portable communication device and wherein audio information is routed between the first passenger portable communication device and the first passenger audio interface device in response to a first passenger call being established with the first passenger portable communication device.

* * * * *